US012563438B2

(12) United States Patent
Srinivasan et al.

(10) Patent No.: US 12,563,438 B2
(45) Date of Patent: Feb. 24, 2026

(54) DISTRIBUTED GATEWAYS FOR MULTI-REGIONAL LARGE SCALE DEPLOYMENTS

(71) Applicant: VeloCloud Networks, LLC, Santa Clara, CA (US)

(72) Inventors: Arun Kumar Srinivasan, Waterloo (CA); Navaneeth Krishnan Ramaswamy, Chennai (IN); Sumit Mundhra, Burnaby (CA); Saravanan Kandasamy, Coimbatore (IN); Balaji Shanmugam, Bengaluru (IN)

(73) Assignee: VeloCloud Networks, LLC, Santa Clara, CA (US)

( * ) Notice: Subject to any disclaimer, the term of this patent is extended or adjusted under 35 U.S.C. 154(b) by 320 days.

(21) Appl. No.: 18/234,372

(22) Filed: Aug. 16, 2023

(65) Prior Publication Data

US 2025/0063420 A1     Feb. 20, 2025

(51) Int. Cl.
*H04W 28/02*          (2009.01)
(52) U.S. Cl.
CPC .............................. *H04W 28/0268* (2013.01)
(58) Field of Classification Search
CPC ........................... H04W 28/0268; H04L 45/64
USPC ........................................................ 709/224
See application file for complete search history.

(56) References Cited

U.S. PATENT DOCUMENTS 5,652,751 A      7/1997 Sharony
5,909,553 A      6/1999 Campbell et al.

6,154,465 A      11/2000 Pickett
6,157,648 A      12/2000 Voit et al.
6,201,810 B1      3/2001 Masuda et al.
6,363,378 B1      3/2002 Conklin et al.
(Continued)

FOREIGN PATENT DOCUMENTS

CN          1483270 A      3/2004
CN          1926809 A      3/2007
(Continued)

OTHER PUBLICATIONS

Non-Published Commonly Owned Related U.S. Appl. No. 18/234,377 with similar specification, filed Aug. 16, 2023, 100 pages, VMware, Inc.

(Continued)

*Primary Examiner* — Karen C Tang
(74) *Attorney, Agent, or Firm* — BainwoodHuang

(57)          ABSTRACT

Some embodiments of the invention provide a method for implementing an SD-WAN connecting multiple sites at multiple physical locations. The method is performed at a first hub router of the SD-WAN. The method establishes, with a first edge router of a first site in a first region, a new connection for the first hub router to use to connect the first edge router to a second edge router of a second site in the first region. The method determines that a peer-connection notification regarding the newly connected first edge router has to be sent to a first route reflector (RR) that does not connect directly with the first edge router but connects to routers in a second region. The method sends the peer-connection notification to the first RR to analyze and determine whether to obtain routes associated with the first edge router for advertising to routers in the second region.

25 Claims, 33 Drawing Sheets

(56)                References Cited

U.S. PATENT DOCUMENTS

| | | |
|---|---|---|
| 6,445,682 B1 | 9/2002 | Weitz |
| 6,744,775 B1 | 6/2004 | Beshai et al. |
| 6,976,087 B1 | 12/2005 | Westfall et al. |
| 7,003,481 B2 | 2/2006 | Banka et al. |
| 7,280,476 B2 | 10/2007 | Anderson |
| 7,313,629 B1 | 12/2007 | Nucci et al. |
| 7,320,017 B1 | 1/2008 | Kurapati et al. |
| 7,373,660 B1 | 5/2008 | Guichard et al. |
| 7,581,022 B1 | 8/2009 | Griffin et al. |
| 7,680,925 B2 | 3/2010 | Sathyanarayana et al. |
| 7,681,236 B2 | 3/2010 | Tamura et al. |
| 7,751,409 B1 | 7/2010 | Carolan |
| 7,962,458 B2 | 6/2011 | Holenstein et al. |
| 8,051,185 B2 | 11/2011 | Lee et al. |
| 8,094,575 B1 | 1/2012 | Vadlakonda et al. |
| 8,094,659 B1 | 1/2012 | Arad |
| 8,111,692 B2 | 2/2012 | Ray |
| 8,141,156 B1 | 3/2012 | Mao et al. |
| 8,224,971 B1 | 7/2012 | Miller et al. |
| 8,228,928 B2 | 7/2012 | Parandekar et al. |
| 8,243,589 B1 | 8/2012 | Trost et al. |
| 8,259,566 B2 | 9/2012 | Chen et al. |
| 8,274,891 B2 | 9/2012 | Averi et al. |
| 8,301,749 B1 | 10/2012 | Finklestein et al. |
| 8,385,227 B1 | 2/2013 | Downey |
| 8,516,129 B1 | 8/2013 | Skene |
| 8,566,452 B1 | 10/2013 | Goodwin, III et al. |
| 8,588,066 B2 | 11/2013 | Goel et al. |
| 8,630,291 B2 | 1/2014 | Shaffer et al. |
| 8,661,295 B1 | 2/2014 | Khanna et al. |
| 8,724,456 B1 | 5/2014 | Hong et al. |
| 8,724,503 B2 | 5/2014 | Johnsson et al. |
| 8,745,177 B1 | 6/2014 | Kazerani et al. |
| 8,769,129 B2 | 7/2014 | Watsen et al. |
| 8,797,874 B2 | 8/2014 | Yu et al. |
| 8,799,504 B2 | 8/2014 | Capone et al. |
| 8,804,745 B1 | 8/2014 | Sinn |
| 8,806,482 B1 | 8/2014 | Nagargadde et al. |
| 8,855,071 B1 | 10/2014 | Sankaran et al. |
| 8,856,339 B2 | 10/2014 | Mestery et al. |
| 8,964,548 B1 | 2/2015 | Keralapura et al. |
| 8,989,199 B1 | 3/2015 | Sella et al. |
| 9,009,217 B1 | 4/2015 | Nagargadde et al. |
| 9,015,299 B1 | 4/2015 | Shah |
| 9,019,837 B2 | 4/2015 | Lue et al. |
| 9,055,000 B1 | 6/2015 | Ghosh et al. |
| 9,060,025 B2 | 6/2015 | Xu |
| 9,071,607 B2 | 6/2015 | Twitchell, Jr. |
| 9,075,771 B1 | 7/2015 | Gawali et al. |
| 9,100,329 B1 | 8/2015 | Jiang et al. |
| 9,135,037 B1 | 9/2015 | Petrescu-Prahova et al. |
| 9,137,334 B2 | 9/2015 | Zhou |
| 9,154,327 B1 | 10/2015 | Marino et al. |
| 9,203,764 B2 | 12/2015 | Shirazipour et al. |
| 9,225,591 B2 | 12/2015 | Beheshti-Zavareh et al. |
| 9,258,212 B2 | 2/2016 | Pfeifer et al. |
| 9,306,949 B1 | 4/2016 | Richard et al. |
| 9,323,561 B2 | 4/2016 | Ayala et al. |
| 9,336,040 B2 | 5/2016 | Dong et al. |
| 9,354,983 B1 | 5/2016 | Yenamandra et al. |
| 9,356,943 B1 | 5/2016 | Lopilato et al. |
| 9,379,981 B1 | 6/2016 | Zhou et al. |
| 9,413,724 B2 | 8/2016 | Xu |
| 9,419,878 B2 | 8/2016 | Hsiao et al. |
| 9,432,245 B1 | 8/2016 | Sorenson, III et al. |
| 9,438,566 B2 | 9/2016 | Zhang et al. |
| 9,450,817 B1 | 9/2016 | Bahadur et al. |
| 9,450,852 B1 | 9/2016 | Chen et al. |
| 9,462,010 B1 | 10/2016 | Stevenson |
| 9,467,478 B1 | 10/2016 | Khan et al. |
| 9,485,163 B1 | 11/2016 | Fries et al. |
| 9,521,067 B2 | 12/2016 | Michael et al. |
| 9,525,564 B2 | 12/2016 | Lee |
| 9,542,219 B1 | 1/2017 | Bryant et al. |
| 9,559,951 B1 | 1/2017 | Sajassi et al. |
| 9,563,423 B1 | 2/2017 | Pittman |
| 9,602,389 B1 | 3/2017 | Maveli et al. |
| 9,608,917 B1 | 3/2017 | Anderson et al. |
| 9,608,962 B1 | 3/2017 | Chang |
| 9,614,748 B1 | 4/2017 | Battersby et al. |
| 9,621,460 B2 | 4/2017 | Mehta et al. |
| 9,641,551 B1 | 5/2017 | Kariyanahalli |
| 9,648,547 B1 | 5/2017 | Hart et al. |
| 9,665,432 B2 | 5/2017 | Kruse et al. |
| 9,686,127 B2 | 6/2017 | Ramachandran et al. |
| 9,692,714 B1 | 6/2017 | Nair et al. |
| 9,715,401 B2 | 7/2017 | Devine et al. |
| 9,717,021 B2 | 7/2017 | Hughes et al. |
| 9,722,815 B2 | 8/2017 | Mukundan et al. |
| 9,747,249 B2 | 8/2017 | Cherian et al. |
| 9,755,965 B1 | 9/2017 | Yadav et al. |
| 9,787,559 B1 | 10/2017 | Schroeder |
| 9,807,004 B2 | 10/2017 | Koley et al. |
| 9,819,540 B1 | 11/2017 | Bahadur et al. |
| 9,819,565 B2 | 11/2017 | Djukic et al. |
| 9,825,822 B1 | 11/2017 | Holland |
| 9,825,911 B1 | 11/2017 | Brandwine |
| 9,825,992 B2 | 11/2017 | Xu |
| 9,832,128 B1 | 11/2017 | Ashner et al. |
| 9,832,205 B2 | 11/2017 | Santhi et al. |
| 9,875,355 B1 | 1/2018 | Williams |
| 9,906,401 B1 | 2/2018 | Rao |
| 9,923,826 B2 | 3/2018 | Murgia |
| 9,930,011 B1 | 3/2018 | Clemons, Jr. et al. |
| 9,935,829 B1 | 4/2018 | Miller et al. |
| 9,942,787 B1 | 4/2018 | Tillotson |
| 9,996,370 B1 | 6/2018 | Khafizov et al. |
| 10,038,601 B1 | 7/2018 | Becker et al. |
| 10,057,183 B2 | 8/2018 | Salle et al. |
| 10,057,294 B2 | 8/2018 | Xu |
| 10,116,593 B1 | 10/2018 | Sinn et al. |
| 10,135,789 B2 | 11/2018 | Mayya et al. |
| 10,142,226 B1 | 11/2018 | Wu et al. |
| 10,178,032 B2 | 1/2019 | Freitas |
| 10,178,037 B2 | 1/2019 | Appleby et al. |
| 10,187,289 B1 | 1/2019 | Chen et al. |
| 10,200,264 B2 | 2/2019 | Menon et al. |
| 10,229,017 B1 | 3/2019 | Zou et al. |
| 10,237,123 B2 | 3/2019 | Dubey et al. |
| 10,250,498 B1 | 4/2019 | Bales et al. |
| 10,263,832 B1 | 4/2019 | Ghosh |
| 10,263,848 B2 | 4/2019 | Wolting |
| 10,320,664 B2 | 6/2019 | Nainar et al. |
| 10,320,691 B1 | 6/2019 | Matthews et al. |
| 10,326,830 B1 | 6/2019 | Singh |
| 10,348,767 B1 | 7/2019 | Lee et al. |
| 10,355,989 B1 | 7/2019 | Panchal et al. |
| 10,425,382 B2 | 9/2019 | Mayya et al. |
| 10,454,708 B2 | 10/2019 | Mibu |
| 10,454,714 B2 | 10/2019 | Mayya et al. |
| 10,461,993 B2 | 10/2019 | Turabi et al. |
| 10,498,652 B2 | 12/2019 | Mayya et al. |
| 10,511,546 B2 | 12/2019 | Singarayan et al. |
| 10,523,539 B2 | 12/2019 | Mayya et al. |
| 10,550,093 B2 | 2/2020 | Ojima et al. |
| 10,554,538 B2 | 2/2020 | Spohn et al. |
| 10,560,431 B1 | 2/2020 | Chen et al. |
| 10,565,464 B2 | 2/2020 | Tan et al. |
| 10,567,519 B1 | 2/2020 | Mukhopadhyaya et al. |
| 10,574,482 B2 | 2/2020 | Oré et al. |
| 10,574,528 B2 | 2/2020 | Mayya et al. |
| 10,594,516 B2 | 3/2020 | Cidon et al. |
| 10,594,591 B2 | 3/2020 | Houjyo et al. |
| 10,594,659 B2 | 3/2020 | El-Moussa et al. |
| 10,608,844 B2 | 3/2020 | Cidon et al. |
| 10,630,505 B2 | 4/2020 | Rubenstein et al. |
| 10,637,889 B2 | 4/2020 | Ermagan et al. |
| 10,666,460 B2 | 5/2020 | Cidon et al. |
| 10,666,497 B2 | 5/2020 | Tahhan et al. |
| 10,686,625 B2 | 6/2020 | Cidon et al. |
| 10,693,679 B2 | 6/2020 | Lin et al. |
| 10,693,739 B1 | 6/2020 | Naseri et al. |
| 10,708,144 B2 | 7/2020 | Mohan et al. |
| 10,715,382 B2 | 7/2020 | Guan et al. |

(56)                References Cited

U.S. PATENT DOCUMENTS

| | | | |
|---|---|---|---|
| 10,715,427 | B2 | 7/2020 | Raj et al. |
| 10,749,711 | B2 | 8/2020 | Mukundan et al. |
| 10,778,466 | B2 | 9/2020 | Cidon et al. |
| 10,778,528 | B2 | 9/2020 | Mayya et al. |
| 10,778,557 | B2 | 9/2020 | Ganichev et al. |
| 10,805,114 | B2 | 10/2020 | Cidon et al. |
| 10,805,272 | B2 | 10/2020 | Mayya et al. |
| 10,819,564 | B2 | 10/2020 | Turabi et al. |
| 10,826,775 | B1 | 11/2020 | Moreno et al. |
| 10,841,131 | B2 | 11/2020 | Cidon et al. |
| 10,911,374 | B1 | 2/2021 | Kumar et al. |
| 10,917,330 | B1 | 2/2021 | Szarecki et al. |
| 10,924,388 | B1 | 2/2021 | Burns et al. |
| 10,938,693 | B2 | 3/2021 | Mayya et al. |
| 10,951,529 | B2 | 3/2021 | Duan et al. |
| 10,958,479 | B2 | 3/2021 | Cidon et al. |
| 10,959,098 | B2 | 3/2021 | Cidon et al. |
| 10,992,558 | B1 | 4/2021 | Silva et al. |
| 10,992,568 | B2 | 4/2021 | Michael et al. |
| 10,999,100 | B2 | 5/2021 | Cidon et al. |
| 10,999,137 | B2 | 5/2021 | Cidon et al. |
| 10,999,165 | B2 | 5/2021 | Cidon et al. |
| 10,999,197 | B2 | 5/2021 | Hooda et al. |
| 11,005,684 | B2 | 5/2021 | Cidon |
| 11,018,995 | B2 | 5/2021 | Cidon et al. |
| 11,044,190 | B2 | 6/2021 | Ramaswamy et al. |
| 11,050,588 | B2 | 6/2021 | Mayya et al. |
| 11,050,644 | B2 | 6/2021 | Hegde et al. |
| 11,071,005 | B2 | 7/2021 | Shen et al. |
| 11,089,111 | B2 | 8/2021 | Markuze et al. |
| 11,095,612 | B1 | 8/2021 | Oswal et al. |
| 11,102,032 | B2 | 8/2021 | Cidon et al. |
| 11,108,595 | B2 | 8/2021 | Knutsen et al. |
| 11,108,851 | B1 | 8/2021 | Kurmala et al. |
| 11,115,347 | B2 | 9/2021 | Gupta et al. |
| 11,115,426 | B1 | 9/2021 | Pazhyannur et al. |
| 11,115,480 | B2 * | 9/2021 | Markuze ............... H04L 69/326 |
| 11,121,962 | B2 | 9/2021 | Michael et al. |
| 11,121,985 | B2 | 9/2021 | Cidon et al. |
| 11,128,492 | B2 | 9/2021 | Sethi et al. |
| 11,146,632 | B2 | 10/2021 | Rubenstein |
| 11,153,230 | B2 | 10/2021 | Cidon et al. |
| 11,171,885 | B2 | 11/2021 | Cidon et al. |
| 11,212,140 | B2 | 12/2021 | Mukundan et al. |
| 11,212,238 | B2 | 12/2021 | Cidon et al. |
| 11,223,514 | B2 | 1/2022 | Mayya et al. |
| 11,245,641 | B2 | 2/2022 | Ramaswamy et al. |
| 11,252,079 | B2 | 2/2022 | Michael et al. |
| 11,252,105 | B2 | 2/2022 | Cidon et al. |
| 11,252,106 | B2 | 2/2022 | Cidon et al. |
| 11,258,728 | B2 | 2/2022 | Cidon et al. |
| 11,310,170 | B2 | 4/2022 | Cidon et al. |
| 11,323,307 | B2 | 5/2022 | Mayya et al. |
| 11,349,722 | B2 | 5/2022 | Mayya et al. |
| 11,363,124 | B2 | 6/2022 | Markuze et al. |
| 11,374,904 | B2 | 6/2022 | Mayya et al. |
| 11,375,005 | B1 | 6/2022 | Rolando et al. |
| 11,381,474 | B1 | 7/2022 | Kumar et al. |
| 11,381,499 | B1 | 7/2022 | Ramaswamy et al. |
| 11,388,086 | B1 | 7/2022 | Ramaswamy et al. |
| 11,394,640 | B2 | 7/2022 | Ramaswamy et al. |
| 11,418,997 | B2 | 8/2022 | Devadoss et al. |
| 11,438,789 | B2 | 9/2022 | Devadoss et al. |
| 11,444,865 | B2 | 9/2022 | Ramaswamy et al. |
| 11,444,872 | B2 | 9/2022 | Mayya et al. |
| 11,477,127 | B2 | 10/2022 | Ramaswamy et al. |
| 11,489,720 | B1 | 11/2022 | Kempanna et al. |
| 11,489,783 | B2 | 11/2022 | Ramaswamy et al. |
| 11,509,571 | B1 | 11/2022 | Ramaswamy et al. |
| 11,516,049 | B2 | 11/2022 | Cidon et al. |
| 11,522,780 | B1 | 12/2022 | Wallace et al. |
| 11,526,434 | B1 | 12/2022 | Brooker et al. |
| 11,533,248 | B2 | 12/2022 | Mayya et al. |
| 11,552,874 | B1 | 1/2023 | Pragada et al. |
| 11,575,591 | B2 | 2/2023 | Ramaswamy et al. |
| 11,575,600 | B2 | 2/2023 | Markuze et al. |
| 11,582,144 | B2 | 2/2023 | Ramaswamy et al. |
| 11,582,298 | B2 | 2/2023 | Hood et al. |
| 11,601,356 | B2 | 3/2023 | Gandhi et al. |
| 11,606,225 | B2 | 3/2023 | Cidon et al. |
| 11,606,286 | B2 | 3/2023 | Michael et al. |
| 11,606,314 | B2 | 3/2023 | Cidon et al. |
| 11,606,712 | B2 | 3/2023 | Devadoss et al. |
| 11,611,507 | B2 | 3/2023 | Ramaswamy et al. |
| 11,637,768 | B2 | 4/2023 | Ramaswamy et al. |
| 11,677,720 | B2 | 6/2023 | Mayya et al. |
| 11,689,959 | B2 | 6/2023 | Devadoss et al. |
| 11,700,196 | B2 | 7/2023 | Michael et al. |
| 11,706,126 | B2 | 7/2023 | Silva et al. |
| 11,706,127 | B2 | 7/2023 | Michael et al. |
| 11,709,710 | B2 | 7/2023 | Markuze et al. |
| 11,716,286 | B2 | 8/2023 | Ramaswamy et al. |
| 11,722,925 | B2 | 8/2023 | Devadoss et al. |
| 11,729,065 | B2 * | 8/2023 | Ramaswamy ...... H04L 43/0882 709/224 |
| 12,355,613 | B1 * | 7/2025 | Kalintsev ............ H04L 41/0659 |
| 12,362,987 | B1 * | 7/2025 | Purvis ................. H04L 41/0631 |
| 12,368,717 | B1 * | 7/2025 | Cheethirala ........... H04L 63/104 |
| 2002/0049687 | A1 | 4/2002 | Helsper et al. |
| 2002/0075542 | A1 | 6/2002 | Kumar et al. |
| 2002/0085488 | A1 | 7/2002 | Kobayashi |
| 2002/0087716 | A1 | 7/2002 | Mustafa |
| 2002/0152306 | A1 | 10/2002 | Tuck |
| 2002/0186682 | A1 | 12/2002 | Kawano et al. |
| 2002/0198840 | A1 | 12/2002 | Banka et al. |
| 2003/0050061 | A1 | 3/2003 | Wu et al. |
| 2003/0061269 | A1 | 3/2003 | Hathaway et al. |
| 2003/0088697 | A1 | 5/2003 | Matsuhira |
| 2003/0112766 | A1 | 6/2003 | Riedel et al. |
| 2003/0112808 | A1 | 6/2003 | Solomon |
| 2003/0126468 | A1 | 7/2003 | Markham |
| 2003/0161313 | A1 | 8/2003 | Jinmei et al. |
| 2003/0161321 | A1 | 8/2003 | Karam et al. |
| 2003/0189919 | A1 | 10/2003 | Gupta et al. |
| 2003/0202506 | A1 | 10/2003 | Perkins et al. |
| 2003/0219030 | A1 | 11/2003 | Gubbi |
| 2004/0059831 | A1 | 3/2004 | Chu et al. |
| 2004/0068668 | A1 | 4/2004 | Lor et al. |
| 2004/0165601 | A1 | 8/2004 | Liu et al. |
| 2004/0224771 | A1 | 11/2004 | Chen et al. |
| 2005/0078690 | A1 | 4/2005 | DeLangis |
| 2005/0149604 | A1 | 7/2005 | Navada |
| 2005/0154790 | A1 | 7/2005 | Nagata et al. |
| 2005/0172161 | A1 | 8/2005 | Cruz et al. |
| 2005/0195754 | A1 | 9/2005 | Nosella |
| 2005/0210479 | A1 | 9/2005 | Andjelic |
| 2005/0265255 | A1 | 12/2005 | Kodialam et al. |
| 2006/0002291 | A1 | 1/2006 | Alicherry et al. |
| 2006/0034335 | A1 | 2/2006 | Karaoguz et al. |
| 2006/0114838 | A1 | 6/2006 | Mandavilli et al. |
| 2006/0171365 | A1 | 8/2006 | Borella |
| 2006/0182034 | A1 | 8/2006 | Klinker et al. |
| 2006/0182035 | A1 | 8/2006 | Vasseur |
| 2006/0193247 | A1 | 8/2006 | Naseh et al. |
| 2006/0193252 | A1 | 8/2006 | Naseh et al. |
| 2006/0195605 | A1 | 8/2006 | Sundarrajan et al. |
| 2006/0245414 | A1 | 11/2006 | Susai et al. |
| 2007/0050594 | A1 | 3/2007 | Augsburg et al. |
| 2007/0064604 | A1 | 3/2007 | Chen et al. |
| 2007/0064702 | A1 | 3/2007 | Bates et al. |
| 2007/0083727 | A1 | 4/2007 | Johnston et al. |
| 2007/0091794 | A1 | 4/2007 | Filsfils et al. |
| 2007/0103548 | A1 | 5/2007 | Carter |
| 2007/0115812 | A1 | 5/2007 | Hughes |
| 2007/0121486 | A1 | 5/2007 | Guichard et al. |
| 2007/0130325 | A1 | 6/2007 | Lesser |
| 2007/0162619 | A1 | 7/2007 | Aloni et al. |
| 2007/0162639 | A1 | 7/2007 | Chu et al. |
| 2007/0177511 | A1 | 8/2007 | Das et al. |
| 2007/0195797 | A1 | 8/2007 | Patel et al. |
| 2007/0237081 | A1 | 10/2007 | Kodialam et al. |
| 2007/0260746 | A1 | 11/2007 | Mirtorabi et al. |
| 2007/0268882 | A1 | 11/2007 | Breslau et al. |
| 2008/0002670 | A1 | 1/2008 | Bugenhagen et al. |

(56)         References Cited

U.S. PATENT DOCUMENTS

| | | |
|---|---|---|
| 2008/0049621 A1 | 2/2008 | McGuire et al. |
| 2008/0055241 A1 | 3/2008 | Goldenberg et al. |
| 2008/0080509 A1 | 4/2008 | Khanna et al. |
| 2008/0095187 A1 | 4/2008 | Jung et al. |
| 2008/0117930 A1 | 5/2008 | Chakareski et al. |
| 2008/0144532 A1 | 6/2008 | Chamarajanagar et al. |
| 2008/0168086 A1 | 7/2008 | Miller et al. |
| 2008/0175150 A1 | 7/2008 | Bolt et al. |
| 2008/0181116 A1 | 7/2008 | Kavanaugh et al. |
| 2008/0219276 A1 | 9/2008 | Shah |
| 2008/0240121 A1 | 10/2008 | Xiong et al. |
| 2008/0263218 A1 | 10/2008 | Beerends et al. |
| 2009/0013210 A1 | 1/2009 | McIntosh et al. |
| 2009/0028092 A1 | 1/2009 | Rothschild |
| 2009/0125617 A1 | 5/2009 | Klessig et al. |
| 2009/0141642 A1 | 6/2009 | Sun |
| 2009/0154463 A1 | 6/2009 | Hines et al. |
| 2009/0182874 A1 | 7/2009 | Morford et al. |
| 2009/0247204 A1 | 10/2009 | Sennett et al. |
| 2009/0268605 A1 | 10/2009 | Campbell et al. |
| 2009/0274045 A1 | 11/2009 | Meier et al. |
| 2009/0276657 A1 | 11/2009 | Wetmore et al. |
| 2009/0303880 A1 | 12/2009 | Maltz et al. |
| 2010/0008361 A1 | 1/2010 | Guichard et al. |
| 2010/0017802 A1 | 1/2010 | Lojewski |
| 2010/0040069 A1 | 2/2010 | Johri et al. |
| 2010/0046532 A1 | 2/2010 | Okita |
| 2010/0061379 A1 | 3/2010 | Parandekar et al. |
| 2010/0080129 A1 | 4/2010 | Strahan et al. |
| 2010/0088440 A1 | 4/2010 | Banks et al. |
| 2010/0091782 A1 | 4/2010 | Hiscock |
| 2010/0091823 A1 | 4/2010 | Retana et al. |
| 2010/0098092 A1 | 4/2010 | Luo et al. |
| 2010/0100768 A1 | 4/2010 | Yamamoto et al. |
| 2010/0107162 A1 | 4/2010 | Edwards et al. |
| 2010/0118727 A1 | 5/2010 | Draves et al. |
| 2010/0118886 A1 | 5/2010 | Saavedra |
| 2010/0128600 A1 | 5/2010 | Srinivasmurthy et al. |
| 2010/0165985 A1 | 7/2010 | Sharma et al. |
| 2010/0191884 A1 | 7/2010 | Holenstein et al. |
| 2010/0223621 A1 | 9/2010 | Joshi et al. |
| 2010/0226246 A1 | 9/2010 | Proulx |
| 2010/0290422 A1 | 11/2010 | Haigh et al. |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0001604 A1 | 1/2011 | Ludlow et al. |
| 2011/0007752 A1 | 1/2011 | Silva et al. |
| 2011/0032939 A1 | 2/2011 | Nozaki et al. |
| 2011/0035187 A1 | 2/2011 | DeJori et al. |
| 2011/0040814 A1 | 2/2011 | Higgins |
| 2011/0075674 A1 | 3/2011 | Li et al. |
| 2011/0078783 A1 | 3/2011 | Duan et al. |
| 2011/0107139 A1 | 5/2011 | Middlecamp et al. |
| 2011/0110370 A1 | 5/2011 | Moreno et al. |
| 2011/0141877 A1 | 6/2011 | Xu et al. |
| 2011/0142041 A1 | 6/2011 | Imai |
| 2011/0153909 A1 | 6/2011 | Dong |
| 2011/0235509 A1 | 9/2011 | Szymanski |
| 2011/0255397 A1 | 10/2011 | Kadakia et al. |
| 2011/0302663 A1 | 12/2011 | Prodan et al. |
| 2012/0008630 A1 | 1/2012 | Ould-Brahim |
| 2012/0027013 A1 | 2/2012 | Napierala |
| 2012/0039309 A1 | 2/2012 | Evans et al. |
| 2012/0099601 A1 | 4/2012 | Haddad et al. |
| 2012/0136697 A1 | 5/2012 | Peles et al. |
| 2012/0140935 A1 | 6/2012 | Kruglick |
| 2012/0157068 A1 | 6/2012 | Eichen et al. |
| 2012/0173694 A1 | 7/2012 | Yan et al. |
| 2012/0173919 A1 | 7/2012 | Patel et al. |
| 2012/0182940 A1 | 7/2012 | Taleb et al. |
| 2012/0221955 A1 | 8/2012 | Raleigh et al. |
| 2012/0227093 A1 | 9/2012 | Shatzkamer et al. |
| 2012/0240185 A1 | 9/2012 | Kapoor et al. |
| 2012/0250682 A1 | 10/2012 | Vincent et al. |
| 2012/0250686 A1 | 10/2012 | Vincent et al. |
| 2012/0266026 A1 | 10/2012 | Chikkalingaiah et al. |
| 2012/0281706 A1 | 11/2012 | Agarwal et al. |
| 2012/0287818 A1 | 11/2012 | Corti et al. |
| 2012/0300615 A1 | 11/2012 | Kempf et al. |
| 2012/0307659 A1 | 12/2012 | Yamada |
| 2012/0317270 A1 | 12/2012 | Vrbaski et al. |
| 2012/0317291 A1 | 12/2012 | Wolfe |
| 2013/0007505 A1 | 1/2013 | Spear |
| 2013/0019005 A1 | 1/2013 | Hui et al. |
| 2013/0021968 A1 | 1/2013 | Reznik et al. |
| 2013/0044764 A1 | 2/2013 | Casado et al. |
| 2013/0051237 A1 | 2/2013 | Ong |
| 2013/0051399 A1 | 2/2013 | Zhang et al. |
| 2013/0054763 A1 | 2/2013 | Merwe et al. |
| 2013/0086267 A1 | 4/2013 | Gelenbe et al. |
| 2013/0097304 A1 | 4/2013 | Asthana et al. |
| 2013/0103729 A1 | 4/2013 | Cooney et al. |
| 2013/0103834 A1 | 4/2013 | Dzerve et al. |
| 2013/0117530 A1 | 5/2013 | Kim et al. |
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128757 A1 | 5/2013 | Chowdhary et al. |
| 2013/0128889 A1 | 5/2013 | Mathur et al. |
| 2013/0142201 A1 | 6/2013 | Kim et al. |
| 2013/0170354 A1 | 7/2013 | Takashima et al. |
| 2013/0173768 A1 | 7/2013 | Kundu et al. |
| 2013/0173788 A1 | 7/2013 | Song |
| 2013/0182712 A1 | 7/2013 | Aguayo et al. |
| 2013/0185446 A1 | 7/2013 | Zeng et al. |
| 2013/0185729 A1 | 7/2013 | Vasic et al. |
| 2013/0191688 A1 | 7/2013 | Agarwal et al. |
| 2013/0223226 A1 | 8/2013 | Narayanan et al. |
| 2013/0223454 A1 | 8/2013 | Dunbar et al. |
| 2013/0235870 A1 | 9/2013 | Tripathi et al. |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0258847 A1 | 10/2013 | Zhang et al. |
| 2013/0258939 A1 | 10/2013 | Wang |
| 2013/0266015 A1 | 10/2013 | Qu et al. |
| 2013/0266019 A1 | 10/2013 | Qu et al. |
| 2013/0283364 A1 | 10/2013 | Chang et al. |
| 2013/0286846 A1 | 10/2013 | Atlas et al. |
| 2013/0297611 A1 | 11/2013 | Moritz et al. |
| 2013/0297770 A1 | 11/2013 | Zhang |
| 2013/0301469 A1 | 11/2013 | Suga |
| 2013/0301642 A1 | 11/2013 | Radhakrishnan et al. |
| 2013/0308444 A1 | 11/2013 | Sem-Jacobsen et al. |
| 2013/0315242 A1 | 11/2013 | Wang et al. |
| 2013/0315243 A1 | 11/2013 | Huang et al. |
| 2013/0329548 A1 | 12/2013 | Nakil et al. |
| 2013/0329601 A1 | 12/2013 | Yin et al. |
| 2013/0329734 A1 | 12/2013 | Chesla et al. |
| 2013/0346470 A1 | 12/2013 | Obstfeld et al. |
| 2014/0016464 A1 | 1/2014 | Shirazipour et al. |
| 2014/0019604 A1 | 1/2014 | Twitchell, Jr. |
| 2014/0019750 A1 | 1/2014 | Dodgson et al. |
| 2014/0040975 A1 | 2/2014 | Raleigh et al. |
| 2014/0064283 A1 | 3/2014 | Balus et al. |
| 2014/0071832 A1 | 3/2014 | Johnsson et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0122559 A1 | 5/2014 | Branson et al. |
| 2014/0123135 A1 | 5/2014 | Huang et al. |
| 2014/0126418 A1 | 5/2014 | Brendel et al. |
| 2014/0156818 A1 | 6/2014 | Hunt |
| 2014/0156823 A1 | 6/2014 | Liu et al. |
| 2014/0157363 A1 | 6/2014 | Banerjee |
| 2014/0160935 A1 | 6/2014 | Zecharia et al. |
| 2014/0164560 A1 | 6/2014 | Ko et al. |
| 2014/0164617 A1 | 6/2014 | Jalan et al. |
| 2014/0164718 A1 | 6/2014 | Schaik et al. |
| 2014/0173113 A1 | 6/2014 | Vemuri et al. |

(56)  References Cited

U.S. PATENT DOCUMENTS

| | | |
|---|---|---|
| 2014/0173331 A1 | 6/2014 | Martin et al. |
| 2014/0181824 A1 | 6/2014 | Saund et al. |
| 2014/0189074 A1 | 7/2014 | Parker |
| 2014/0201642 A1 | 7/2014 | Vicat-Blanc |
| 2014/0208317 A1 | 7/2014 | Nakagawa |
| 2014/0219135 A1 | 8/2014 | Li et al. |
| 2014/0223507 A1 | 8/2014 | Xu |
| 2014/0226664 A1 | 8/2014 | Chen et al. |
| 2014/0229210 A1 | 8/2014 | Sharifian et al. |
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0310282 A1 | 10/2014 | Sprague et al. |
| 2014/0317440 A1 | 10/2014 | Biermayr et al. |
| 2014/0321277 A1 | 10/2014 | Lynn, Jr. et al. |
| 2014/0337500 A1 | 11/2014 | Lee |
| 2014/0337674 A1 | 11/2014 | Ivancic et al. |
| 2014/0341109 A1 | 11/2014 | Cartmell et al. |
| 2014/0351394 A1 | 11/2014 | Elisha |
| 2014/0355441 A1 | 12/2014 | Jain |
| 2014/0365834 A1 | 12/2014 | Stone et al. |
| 2014/0372582 A1 | 12/2014 | Ghanwani et al. |
| 2015/0003240 A1 | 1/2015 | Drwiega et al. |
| 2015/0016249 A1 | 1/2015 | Mukundan et al. |
| 2015/0029864 A1 | 1/2015 | Raileanu et al. |
| 2015/0039744 A1 | 2/2015 | Niazi et al. |
| 2015/0046572 A1 | 2/2015 | Cheng et al. |
| 2015/0052247 A1 | 2/2015 | Threefoot et al. |
| 2015/0052517 A1 | 2/2015 | Raghu et al. |
| 2015/0056960 A1 | 2/2015 | Egner et al. |
| 2015/0058917 A1 | 2/2015 | Xu |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0100958 A1 | 4/2015 | Banavalikar et al. |
| 2015/0106809 A1 | 4/2015 | Reddy et al. |
| 2015/0124603 A1 | 5/2015 | Ketheesan et al. |
| 2015/0134777 A1 | 5/2015 | Onoue |
| 2015/0139238 A1 | 5/2015 | Pourzandi et al. |
| 2015/0146539 A1 | 5/2015 | Mehta et al. |
| 2015/0163152 A1 | 6/2015 | Li |
| 2015/0169340 A1 | 6/2015 | Haddad et al. |
| 2015/0172121 A1 | 6/2015 | Farkas et al. |
| 2015/0172169 A1 | 6/2015 | DeCusatis et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Veres et al. |
| 2015/0244617 A1 | 8/2015 | Nakil et al. |
| 2015/0249644 A1 | 9/2015 | Xu |
| 2015/0257081 A1 | 9/2015 | Ramanujan et al. |
| 2015/0264055 A1 | 9/2015 | Budhani et al. |
| 2015/0271056 A1 | 9/2015 | Chunduri et al. |
| 2015/0271104 A1 | 9/2015 | Chikkamath et al. |
| 2015/0271303 A1 | 9/2015 | Neginhal et al. |
| 2015/0281004 A1 | 10/2015 | Kakadia et al. |
| 2015/0312142 A1 | 10/2015 | Barabash et al. |
| 2015/0312760 A1 | 10/2015 | O'Toole |
| 2015/0317169 A1 | 11/2015 | Sinha et al. |
| 2015/0326426 A1 | 11/2015 | Luo et al. |
| 2015/0334025 A1 | 11/2015 | Rader |
| 2015/0334696 A1 | 11/2015 | Gu et al. |
| 2015/0341271 A1 | 11/2015 | Gomez |
| 2015/0349978 A1 | 12/2015 | Wu et al. |
| 2015/0350907 A1 | 12/2015 | Timariu et al. |
| 2015/0358232 A1 | 12/2015 | Chen et al. |
| 2015/0358236 A1 | 12/2015 | Roach et al. |
| 2015/0363221 A1 | 12/2015 | Terayama et al. |
| 2015/0363733 A1 | 12/2015 | Brown |
| 2015/0365323 A1 | 12/2015 | Duminuco et al. |
| 2015/0372943 A1 | 12/2015 | Hasan et al. |
| 2015/0372982 A1 | 12/2015 | Herle et al. |
| 2015/0381407 A1 | 12/2015 | Wang et al. |
| 2015/0381462 A1 | 12/2015 | Choi et al. |
| 2015/0381493 A1 | 12/2015 | Bansal et al. |
| 2016/0019317 A1 | 1/2016 | Pawar et al. |
| 2016/0020844 A1 | 1/2016 | Hart et al. |
| 2016/0021597 A1 | 1/2016 | Hart et al. |
| 2016/0035183 A1 | 2/2016 | Buchholz et al. |
| 2016/0036924 A1 | 2/2016 | Koppolu et al. |
| 2016/0036938 A1 | 2/2016 | Aviles et al. |
| 2016/0037434 A1 | 2/2016 | Gopal et al. |
| 2016/0072669 A1 | 3/2016 | Saavedra |
| 2016/0072684 A1 | 3/2016 | Manuguri et al. |
| 2016/0080268 A1 | 3/2016 | Anand et al. |
| 2016/0080502 A1 | 3/2016 | Yadav et al. |
| 2016/0105353 A1 | 4/2016 | Cociglio |
| 2016/0105392 A1 | 4/2016 | Thakkar et al. |
| 2016/0105471 A1 | 4/2016 | Nunes et al. |
| 2016/0105488 A1 | 4/2016 | Thakkar et al. |
| 2016/0117185 A1 | 4/2016 | Fang et al. |
| 2016/0134461 A1 | 5/2016 | Sampath et al. |
| 2016/0134527 A1 | 5/2016 | Kwak et al. |
| 2016/0134528 A1 | 5/2016 | Lin et al. |
| 2016/0134591 A1 | 5/2016 | Liao et al. |
| 2016/0142373 A1 | 5/2016 | Ossipov |
| 2016/0147607 A1 | 5/2016 | Dornemann et al. |
| 2016/0150055 A1 | 5/2016 | Choi |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0191374 A1 | 6/2016 | Singh et al. |
| 2016/0192403 A1 | 6/2016 | Gupta et al. |
| 2016/0197834 A1 | 7/2016 | Luft |
| 2016/0197835 A1 | 7/2016 | Luft |
| 2016/0198003 A1 | 7/2016 | Luft |
| 2016/0205071 A1 | 7/2016 | Cooper et al. |
| 2016/0210209 A1 | 7/2016 | Verkaik et al. |
| 2016/0212773 A1 | 7/2016 | Kanderholm et al. |
| 2016/0218947 A1 | 7/2016 | Hughes et al. |
| 2016/0218951 A1 | 7/2016 | Vasseur et al. |
| 2016/0234099 A1 | 8/2016 | Jiao |
| 2016/0234161 A1 | 8/2016 | Banerjee et al. |
| 2016/0255169 A1 | 9/2016 | Kovvuri et al. |
| 2016/0255542 A1 | 9/2016 | Hughes et al. |
| 2016/0261493 A1 | 9/2016 | Li |
| 2016/0261495 A1 | 9/2016 | Xia et al. |
| 2016/0261506 A1 | 9/2016 | Hegde et al. |
| 2016/0261639 A1 | 9/2016 | Xu |
| 2016/0269298 A1 | 9/2016 | Li et al. |
| 2016/0269926 A1 | 9/2016 | Sundaram |
| 2016/0285736 A1 | 9/2016 | Gu |
| 2016/0299775 A1 | 10/2016 | Madapurath et al. |
| 2016/0301471 A1 | 10/2016 | Kunz et al. |
| 2016/0308762 A1 | 10/2016 | Teng et al. |
| 2016/0315912 A1 | 10/2016 | Mayya et al. |
| 2016/0323377 A1 | 11/2016 | Einkauf et al. |
| 2016/0328159 A1 | 11/2016 | Coddington et al. |
| 2016/0330111 A1 | 11/2016 | Manghirmalani et al. |
| 2016/0337202 A1 | 11/2016 | Ben-Itzhak et al. |
| 2016/0352588 A1 | 12/2016 | Subbarayan et al. |
| 2016/0353268 A1 | 12/2016 | Senarath et al. |
| 2016/0359738 A1 | 12/2016 | Sullenberger et al. |
| 2016/0366187 A1 | 12/2016 | Kamble |
| 2016/0371153 A1 | 12/2016 | Dornemann |
| 2016/0378527 A1 | 12/2016 | Zamir |
| 2016/0380886 A1 | 12/2016 | Blair et al. |
| 2016/0380906 A1 | 12/2016 | Hodique et al. |
| 2017/0005986 A1 | 1/2017 | Bansal et al. |
| 2017/0006499 A1 | 1/2017 | Hampel et al. |
| 2017/0012870 A1 | 1/2017 | Blair et al. |
| 2017/0019428 A1 | 1/2017 | Cohn |
| 2017/0024260 A1 | 1/2017 | Chandrasekaran et al. |
| 2017/0026273 A1 | 1/2017 | Yao et al. |
| 2017/0026283 A1 | 1/2017 | Williams et al. |
| 2017/0026355 A1 | 1/2017 | Mathaiyan et al. |

(56)                    References Cited

U.S. PATENT DOCUMENTS

| | | |
|---|---|---|
| 2017/0034046 A1 | 2/2017 | Cai et al. |
| 2017/0034052 A1 | 2/2017 | Chanda et al. |
| 2017/0034129 A1 | 2/2017 | Sawant et al. |
| 2017/0048296 A1 | 2/2017 | Ramalho et al. |
| 2017/0053258 A1 | 2/2017 | Carney et al. |
| 2017/0055131 A1 | 2/2017 | Kong et al. |
| 2017/0063674 A1 | 3/2017 | Maskalik et al. |
| 2017/0063782 A1 | 3/2017 | Jain et al. |
| 2017/0063783 A1 | 3/2017 | Yong et al. |
| 2017/0063794 A1 | 3/2017 | Jain et al. |
| 2017/0064005 A1 | 3/2017 | Lee |
| 2017/0075710 A1 | 3/2017 | Prasad et al. |
| 2017/0093625 A1 | 3/2017 | Pera et al. |
| 2017/0097841 A1 | 4/2017 | Chang et al. |
| 2017/0104653 A1 | 4/2017 | Badea et al. |
| 2017/0104755 A1 | 4/2017 | Arregoces et al. |
| 2017/0109212 A1 | 4/2017 | Gaurav et al. |
| 2017/0118067 A1 | 4/2017 | Vedula |
| 2017/0118173 A1 | 4/2017 | Arramreddy et al. |
| 2017/0123939 A1 | 5/2017 | Maheshwari et al. |
| 2017/0126475 A1 | 5/2017 | Mahkonen et al. |
| 2017/0126516 A1 | 5/2017 | Tiagi et al. |
| 2017/0126564 A1 | 5/2017 | Mayya et al. |
| 2017/0134186 A1 | 5/2017 | Mukundan et al. |
| 2017/0134520 A1 | 5/2017 | Abbasi et al. |
| 2017/0139789 A1 | 5/2017 | Fries et al. |
| 2017/0142000 A1 | 5/2017 | Cai et al. |
| 2017/0149637 A1 | 5/2017 | Banikazemi et al. |
| 2017/0155557 A1 | 6/2017 | Desai et al. |
| 2017/0155566 A1 | 6/2017 | Martinsen et al. |
| 2017/0155590 A1 | 6/2017 | Dillon et al. |
| 2017/0163473 A1 | 6/2017 | Sadana et al. |
| 2017/0171024 A1 | 6/2017 | Anerousis et al. |
| 2017/0171310 A1 | 6/2017 | Gardner |
| 2017/0180220 A1 | 6/2017 | Leckey et al. |
| 2017/0181210 A1 | 6/2017 | Nadella et al. |
| 2017/0195161 A1 | 7/2017 | Ruel et al. |
| 2017/0195169 A1 | 7/2017 | Mills et al. |
| 2017/0201568 A1 | 7/2017 | Hussam et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0223117 A1 | 8/2017 | Messerli et al. |
| 2017/0236060 A1 | 8/2017 | Ignatyev |
| 2017/0237710 A1 | 8/2017 | Mayya et al. |
| 2017/0242784 A1 | 8/2017 | Heorhiadi et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279741 A1 | 9/2017 | Elias et al. |
| 2017/0279803 A1 | 9/2017 | Desai et al. |
| 2017/0280474 A1 | 9/2017 | Vesterinen et al. |
| 2017/0288987 A1 | 10/2017 | Pasupathy et al. |
| 2017/0289002 A1 | 10/2017 | Ganguli et al. |
| 2017/0289027 A1 | 10/2017 | Ratnasingham |
| 2017/0295264 A1 | 10/2017 | Touitou et al. |
| 2017/0302501 A1 | 10/2017 | Shi et al. |
| 2017/0302565 A1 | 10/2017 | Ghobadi et al. |
| 2017/0310641 A1 | 10/2017 | Jiang et al. |
| 2017/0310691 A1 | 10/2017 | Vasseur et al. |
| 2017/0317945 A1 | 11/2017 | Guo et al. |
| 2017/0317954 A1 | 11/2017 | Masurekar et al. |
| 2017/0317969 A1 | 11/2017 | Masurekar et al. |
| 2017/0317974 A1 | 11/2017 | Masurekar et al. |
| 2017/0324628 A1 | 11/2017 | Dhanabalan |
| 2017/0337086 A1 | 11/2017 | Zhu et al. |
| 2017/0339022 A1 | 11/2017 | Hegde et al. |
| 2017/0339054 A1 | 11/2017 | Yadav et al. |
| 2017/0339070 A1 | 11/2017 | Chang et al. |
| 2017/0346722 A1 | 11/2017 | Smith et al. |
| 2017/0364419 A1 | 12/2017 | Lo |
| 2017/0366445 A1 | 12/2017 | Nemirovsky et al. |
| 2017/0366467 A1 | 12/2017 | Martin et al. |
| 2017/0373950 A1 | 12/2017 | Szilagyi et al. |
| 2017/0374174 A1 | 12/2017 | Evens et al. |
| 2018/0006995 A1 | 1/2018 | Bickhart et al. |
| 2018/0007005 A1 | 1/2018 | Chanda et al. |
| 2018/0007123 A1 | 1/2018 | Cheng et al. |
| 2018/0013636 A1 | 1/2018 | Seetharamaiah et al. |
| 2018/0014051 A1 | 1/2018 | Phillips et al. |
| 2018/0020035 A1 | 1/2018 | Boggia et al. |
| 2018/0034668 A1 | 2/2018 | Mayya et al. |
| 2018/0041425 A1 | 2/2018 | Zhang |
| 2018/0041470 A1 | 2/2018 | Schultz et al. |
| 2018/0062875 A1 | 3/2018 | Tumuluru |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063193 A1 | 3/2018 | Chandrashekhar et al. |
| 2018/0063233 A1 | 3/2018 | Park |
| 2018/0063743 A1 | 3/2018 | Tumuluru et al. |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Xu |
| 2018/0084081 A1 | 3/2018 | Kuchibhotla et al. |
| 2018/0091370 A1 | 3/2018 | Arai |
| 2018/0097725 A1 | 4/2018 | Wood et al. |
| 2018/0114569 A1 | 4/2018 | Strachan et al. |
| 2018/0123910 A1 | 5/2018 | Fitzgibbon |
| 2018/0123946 A1 | 5/2018 | Ramachandran et al. |
| 2018/0131608 A1 | 5/2018 | Jiang et al. |
| 2018/0131615 A1 | 5/2018 | Zhang |
| 2018/0131720 A1 | 5/2018 | Hobson et al. |
| 2018/0145899 A1 | 5/2018 | Rao |
| 2018/0159796 A1 | 6/2018 | Wang et al. |
| 2018/0159856 A1 | 6/2018 | Gujarathi |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0176252 A1 | 6/2018 | Nimmagadda et al. |
| 2018/0181423 A1 | 6/2018 | Gunda et al. |
| 2018/0205746 A1 | 7/2018 | Boutnaru et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0248790 A1 | 8/2018 | Tan et al. |
| 2018/0260125 A1 | 9/2018 | Botes et al. |
| 2018/0261085 A1 | 9/2018 | Liu et al. |
| 2018/0262468 A1 | 9/2018 | Kumar et al. |
| 2018/0270104 A1 | 9/2018 | Zheng et al. |
| 2018/0278541 A1 | 9/2018 | Wu et al. |
| 2018/0287907 A1 | 10/2018 | Kulshreshtha et al. |
| 2018/0295101 A1 | 10/2018 | Gehrmann |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0307851 A1 | 10/2018 | Lewis |
| 2018/0316606 A1 | 11/2018 | Sung et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |
| 2018/0359323 A1 | 12/2018 | Madden |
| 2018/0367445 A1 | 12/2018 | Bajaj |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2018/0375967 A1 | 12/2018 | Pithawala et al. |
| 2019/0013883 A1 | 1/2019 | Vargas et al. |
| 2019/0014038 A1 | 1/2019 | Ritchie |
| 2019/0020588 A1 | 1/2019 | Twitchell, Jr. |
| 2019/0020627 A1 | 1/2019 | Yuan |
| 2019/0021085 A1 | 1/2019 | Mochizuki et al. |
| 2019/0028378 A1 | 1/2019 | Houjyo et al. |
| 2019/0028552 A1 | 1/2019 | Johnson et al. |
| 2019/0036808 A1 | 1/2019 | Shenoy et al. |
| 2019/0036810 A1 | 1/2019 | Michael et al. |
| 2019/0036813 A1 | 1/2019 | Shenoy et al. |
| 2019/0046056 A1 | 2/2019 | Khachaturian et al. |

(56)         References Cited

U.S. PATENT DOCUMENTS

| | | |
|---|---|---|
| 2019/0058657 A1 | 2/2019 | Chunduri et al. |
| 2019/0058709 A1 | 2/2019 | Kempf et al. |
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |
| 2019/0081894 A1 | 3/2019 | Yousaf et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0109769 A1 | 4/2019 | Jain et al. |
| 2019/0132221 A1 | 5/2019 | Boutros et al. |
| 2019/0132234 A1 | 5/2019 | Dong et al. |
| 2019/0132322 A1 | 5/2019 | Song et al. |
| 2019/0140889 A1 | 5/2019 | Mayya et al. |
| 2019/0140890 A1 | 5/2019 | Mayya et al. |
| 2019/0149525 A1 | 5/2019 | Gunda et al. |
| 2019/0158371 A1 | 5/2019 | Dillon et al. |
| 2019/0158605 A1* | 5/2019 | Markuze ............ H04L 12/4641 |
| 2019/0199539 A1 | 6/2019 | Deng et al. |
| 2019/0220703 A1 | 7/2019 | Prakash et al. |
| 2019/0222499 A1 | 7/2019 | Chen et al. |
| 2019/0238364 A1 | 8/2019 | Boutros et al. |
| 2019/0238446 A1 | 8/2019 | Barzik et al. |
| 2019/0238449 A1 | 8/2019 | Michael et al. |
| 2019/0238450 A1 | 8/2019 | Michael et al. |
| 2019/0238483 A1 | 8/2019 | Marichetty et al. |
| 2019/0238497 A1 | 8/2019 | Tourrilhes et al. |
| 2019/0268421 A1 | 8/2019 | Markuze et al. |
| 2019/0268973 A1 | 8/2019 | Bull et al. |
| 2019/0278631 A1 | 9/2019 | Bernat et al. |
| 2019/0280962 A1 | 9/2019 | Michael et al. |
| 2019/0280963 A1 | 9/2019 | Michael et al. |
| 2019/0280964 A1 | 9/2019 | Michael et al. |
| 2019/0288875 A1 | 9/2019 | Shen et al. |
| 2019/0306197 A1 | 10/2019 | Degioanni |
| 2019/0306282 A1 | 10/2019 | Masputra et al. |
| 2019/0313278 A1 | 10/2019 | Liu |
| 2019/0313907 A1 | 10/2019 | Khachaturian et al. |
| 2019/0319847 A1 | 10/2019 | Nahar et al. |
| 2019/0319881 A1 | 10/2019 | Maskara et al. |
| 2019/0327109 A1 | 10/2019 | Guichard et al. |
| 2019/0334786 A1 | 10/2019 | Dutta et al. |
| 2019/0334813 A1 | 10/2019 | Raj et al. |
| 2019/0334820 A1 | 10/2019 | Zhao |
| 2019/0342201 A1 | 11/2019 | Singh |
| 2019/0342219 A1 | 11/2019 | Liu et al. |
| 2019/0356736 A1 | 11/2019 | Narayanaswamy et al. |
| 2019/0364099 A1 | 11/2019 | Thakkar et al. |
| 2019/0364456 A1 | 11/2019 | Yu |
| 2019/0372888 A1 | 12/2019 | Michael et al. |
| 2019/0372889 A1 | 12/2019 | Michael et al. |
| 2019/0372890 A1 | 12/2019 | Michael et al. |
| 2019/0394081 A1 | 12/2019 | Tahhan et al. |
| 2020/0014609 A1 | 1/2020 | Hockett et al. |
| 2020/0014615 A1 | 1/2020 | Michael et al. |
| 2020/0014616 A1 | 1/2020 | Michael et al. |
| 2020/0014661 A1 | 1/2020 | Mayya et al. |
| 2020/0014663 A1 | 1/2020 | Chen et al. |
| 2020/0021514 A1 | 1/2020 | Michael et al. |
| 2020/0021515 A1 | 1/2020 | Michael et al. |
| 2020/0036624 A1 | 1/2020 | Michael et al. |
| 2020/0044943 A1 | 2/2020 | Bor-Yaliniz et al. |
| 2020/0044969 A1 | 2/2020 | Hao et al. |
| 2020/0059420 A1 | 2/2020 | Abraham |
| 2020/0059457 A1 | 2/2020 | Raza et al. |
| 2020/0059459 A1 | 2/2020 | Abraham et al. |
| 2020/0067831 A1 | 2/2020 | Spraggins et al. |
| 2020/0092207 A1 | 3/2020 | Sipra et al. |
| 2020/0097327 A1 | 3/2020 | Beyer et al. |
| 2020/0099625 A1 | 3/2020 | Yigit et al. |
| 2020/0099659 A1 | 3/2020 | Cometto et al. |
| 2020/0106696 A1 | 4/2020 | Michael et al. |
| 2020/0106706 A1 | 4/2020 | Mayya et al. |
| 2020/0119952 A1 | 4/2020 | Mayya et al. |
| 2020/0127905 A1 | 4/2020 | Mayya et al. |
| 2020/0127911 A1 | 4/2020 | Gilson et al. |
| 2020/0153701 A1 | 5/2020 | Mohan et al. |
| 2020/0153736 A1 | 5/2020 | Liebherr et al. |
| 2020/0159661 A1 | 5/2020 | Keymolen et al. |
| 2020/0162407 A1 | 5/2020 | Tillotson |
| 2020/0169473 A1 | 5/2020 | Rimar et al. |
| 2020/0177503 A1 | 6/2020 | Hooda et al. |
| 2020/0177550 A1 | 6/2020 | Valluri et al. |
| 2020/0177629 A1 | 6/2020 | Hooda et al. |
| 2020/0186471 A1 | 6/2020 | Shen et al. |
| 2020/0195557 A1 | 6/2020 | Duan et al. |
| 2020/0204452 A1* | 6/2020 | Bhat .................. H04L 41/0645 |
| 2020/0204460 A1 | 6/2020 | Schneider et al. |
| 2020/0213212 A1 | 7/2020 | Dillon et al. |
| 2020/0213224 A1 | 7/2020 | Cheng et al. |
| 2020/0218558 A1 | 7/2020 | Sreenath et al. |
| 2020/0235990 A1 | 7/2020 | Janakiraman et al. |
| 2020/0235999 A1 | 7/2020 | Mayya et al. |
| 2020/0236046 A1 | 7/2020 | Jain et al. |
| 2020/0241927 A1 | 7/2020 | Yang et al. |
| 2020/0244721 A1 | 7/2020 | S et al. |
| 2020/0252234 A1 | 8/2020 | Ramamoorthi et al. |
| 2020/0259700 A1 | 8/2020 | Bhalla et al. |
| 2020/0267184 A1 | 8/2020 | Vera-Schockner |
| 2020/0267203 A1 | 8/2020 | Jindal et al. |
| 2020/0280587 A1 | 9/2020 | Janakiraman et al. |
| 2020/0287819 A1 | 9/2020 | Theogaraj et al. |
| 2020/0287976 A1 | 9/2020 | Theogaraj et al. |
| 2020/0296011 A1 | 9/2020 | Jain et al. |
| 2020/0296026 A1 | 9/2020 | Michael et al. |
| 2020/0301764 A1 | 9/2020 | Thoresen et al. |
| 2020/0314006 A1 | 10/2020 | Mackie et al. |
| 2020/0314614 A1 | 10/2020 | Moustafa et al. |
| 2020/0322230 A1 | 10/2020 | Natal et al. |
| 2020/0322287 A1 | 10/2020 | Connor et al. |
| 2020/0336336 A1 | 10/2020 | Sethi et al. |
| 2020/0344089 A1 | 10/2020 | Motwani et al. |
| 2020/0344143 A1 | 10/2020 | Faseela et al. |
| 2020/0344163 A1 | 10/2020 | Gupta et al. |
| 2020/0351188 A1 | 11/2020 | Arora et al. |
| 2020/0358878 A1 | 11/2020 | Bansal et al. |
| 2020/0366530 A1 | 11/2020 | Mukundan et al. |
| 2020/0366562 A1 | 11/2020 | Mayya et al. |
| 2020/0382345 A1 | 12/2020 | Zhao et al. |
| 2020/0382387 A1 | 12/2020 | Pasupathy et al. |
| 2020/0403821 A1 | 12/2020 | Dev et al. |
| 2020/0412483 A1 | 12/2020 | Tan et al. |
| 2020/0412576 A1 | 12/2020 | Kondapavuluru et al. |
| 2020/0413283 A1 | 12/2020 | Shen et al. |
| 2021/0006482 A1 | 1/2021 | Hwang et al. |
| 2021/0006490 A1 | 1/2021 | Michael et al. |
| 2021/0021538 A1 | 1/2021 | Meck et al. |
| 2021/0029019 A1 | 1/2021 | Kottapalli |
| 2021/0029088 A1 | 1/2021 | Mayya et al. |
| 2021/0036888 A1 | 2/2021 | Makkalla et al. |
| 2021/0036987 A1 | 2/2021 | Mishra et al. |
| 2021/0037159 A1 | 2/2021 | Shimokawa |
| 2021/0049191 A1 | 2/2021 | Masson et al. |
| 2021/0067372 A1 | 3/2021 | Cidon et al. |
| 2021/0067373 A1 | 3/2021 | Cidon et al. |
| 2021/0067374 A1 | 3/2021 | Cidon et al. |
| 2021/0067375 A1 | 3/2021 | Cidon et al. |
| 2021/0067407 A1 | 3/2021 | Cidon et al. |
| 2021/0067427 A1 | 3/2021 | Cidon et al. |
| 2021/0067442 A1 | 3/2021 | Sundararajan et al. |
| 2021/0067461 A1 | 3/2021 | Cidon et al. |

(56) References Cited

U.S. PATENT DOCUMENTS

| 2021/0067464 A1 | 3/2021 | Cidon et al. |
| 2021/0067467 A1 | 3/2021 | Cidon et al. |
| 2021/0067468 A1 | 3/2021 | Cidon et al. |
| 2021/0073001 A1 | 3/2021 | Rogers et al. |
| 2021/0092062 A1 | 3/2021 | Dhanabalan et al. |
| 2021/0099360 A1 | 4/2021 | Parsons et al. |
| 2021/0105199 A1 | 4/2021 | H et al. |
| 2021/0111998 A1 | 4/2021 | Saavedra |
| 2021/0112034 A1 | 4/2021 | Sundararajan et al. |
| 2021/0126830 A1 | 4/2021 | R. et al. |
| 2021/0126853 A1 | 4/2021 | Ramaswamy et al. |
| 2021/0126854 A1 | 4/2021 | Guo et al. |
| 2021/0126860 A1 | 4/2021 | Ramaswamy et al. |
| 2021/0144091 A1 | 5/2021 | H et al. |
| 2021/0160169 A1 | 5/2021 | Shen et al. |
| 2021/0160813 A1 | 5/2021 | Gupta et al. |
| 2021/0176255 A1 | 6/2021 | Hill et al. |
| 2021/0184952 A1 | 6/2021 | Mayya et al. |
| 2021/0184966 A1 | 6/2021 | Ramaswamy et al. |
| 2021/0184983 A1 | 6/2021 | Ramaswamy et al. |
| 2021/0194814 A1 | 6/2021 | Roux et al. |
| 2021/0226880 A1 | 7/2021 | Ramamoorthy et al. |
| 2021/0234728 A1 | 7/2021 | Cidon et al. |
| 2021/0234775 A1 | 7/2021 | Devadoss et al. |
| 2021/0234786 A1 | 7/2021 | Devadoss et al. |
| 2021/0234804 A1 | 7/2021 | Devadoss et al. |
| 2021/0234805 A1 | 7/2021 | Devadoss et al. |
| 2021/0235312 A1 | 7/2021 | Devadoss et al. |
| 2021/0235313 A1 | 7/2021 | Devadoss et al. |
| 2021/0266262 A1 | 8/2021 | Subramanian et al. |
| 2021/0279069 A1 | 9/2021 | Salgaonkar et al. |
| 2021/0314289 A1 | 10/2021 | Chandrashekhar et al. |
| 2021/0314385 A1 | 10/2021 | Pande et al. |
| 2021/0328835 A1 | 10/2021 | Mayya et al. |
| 2021/0336880 A1 | 10/2021 | Gupta et al. |
| 2021/0377109 A1 | 12/2021 | Shrivastava et al. |
| 2021/0377156 A1 | 12/2021 | Michael et al. |
| 2021/0392060 A1 | 12/2021 | Silva et al. |
| 2021/0392070 A1 | 12/2021 | Tootaghaj et al. |
| 2021/0392171 A1 | 12/2021 | Srinivas et al. |
| 2021/0399920 A1 | 12/2021 | Sundararajan et al. |
| 2021/0399978 A9 | 12/2021 | Michael et al. |
| 2021/0400113 A1 | 12/2021 | Markuze et al. |
| 2021/0400512 A1 | 12/2021 | Agarwal et al. |
| 2021/0409277 A1 | 12/2021 | Jeuk et al. |
| 2022/0006726 A1 | 1/2022 | Michael et al. |
| 2022/0006751 A1 | 1/2022 | Ramaswamy et al. |
| 2022/0006756 A1 | 1/2022 | Ramaswamy et al. |
| 2022/0029902 A1 | 1/2022 | Shemer et al. |
| 2022/0035673 A1 | 2/2022 | Markuze et al. |
| 2022/0038370 A1 | 2/2022 | Vasseur et al. |
| 2022/0038557 A1 | 2/2022 | Markuze et al. |
| 2022/0045927 A1 | 2/2022 | Liu et al. |
| 2022/0052928 A1 | 2/2022 | Sundararajan et al. |
| 2022/0061059 A1 | 2/2022 | Dunsmore et al. |
| 2022/0086035 A1 | 3/2022 | Devaraj et al. |
| 2022/0094644 A1 | 3/2022 | Cidon et al. |
| 2022/0123961 A1 | 4/2022 | Mukundan et al. |
| 2022/0131740 A1 | 4/2022 | Mayya et al. |
| 2022/0131807 A1 | 4/2022 | Srinivas et al. |
| 2022/0131898 A1 | 4/2022 | Hooda et al. |
| 2022/0141184 A1 | 5/2022 | Oswal et al. |
| 2022/0158923 A1 | 5/2022 | Ramaswamy et al. |
| 2022/0158924 A1 | 5/2022 | Ramaswamy et al. |
| 2022/0158926 A1 | 5/2022 | Wennerstrom et al. |
| 2022/0166713 A1 | 5/2022 | Markuze et al. |
| 2022/0191719 A1 | 6/2022 | Roy |
| 2022/0198229 A1 | 6/2022 | López et al. |
| 2022/0210035 A1 | 6/2022 | Hendrickson et al. |
| 2022/0210041 A1 | 6/2022 | Gandhi et al. |
| 2022/0210042 A1 | 6/2022 | Gandhi et al. |
| 2022/0210122 A1 | 6/2022 | Levin et al. |
| 2022/0217015 A1 | 7/2022 | Vuggrala et al. |
| 2022/0231949 A1 | 7/2022 | Ramaswamy et al. |
| 2022/0231950 A1 | 7/2022 | Ramaswamy et al. |
| 2022/0232411 A1 | 7/2022 | Vijayakumar et al. |
| 2022/0239596 A1 | 7/2022 | Kumar et al. |
| 2022/0294701 A1 | 9/2022 | Mayya et al. |
| 2022/0335027 A1 | 10/2022 | Seshadri et al. |
| 2022/0337553 A1 | 10/2022 | Mayya et al. |
| 2022/0353152 A1 | 11/2022 | Ramaswamy |
| 2022/0353171 A1 | 11/2022 | Ramaswamy et al. |
| 2022/0353175 A1 | 11/2022 | Ramaswamy et al. |
| 2022/0353182 A1 | 11/2022 | Ramaswamy et al. |
| 2022/0353190 A1 | 11/2022 | Ramaswamy et al. |
| 2022/0360500 A1 | 11/2022 | Ramaswamy et al. |
| 2022/0407773 A1 | 12/2022 | Kempanna et al. |
| 2022/0407774 A1 | 12/2022 | Kempanna et al. |
| 2022/0407790 A1 | 12/2022 | Kempanna et al. |
| 2022/0407820 A1 | 12/2022 | Kempanna et al. |
| 2022/0407915 A1 | 12/2022 | Kempanna et al. |
| 2022/0417742 A1* | 12/2022 | Dey ................ H04W 12/069 |
| 2023/0006929 A1 | 1/2023 | Mayya et al. |
| 2023/0025586 A1 | 1/2023 | Rolando et al. |
| 2023/0026330 A1 | 1/2023 | Rolando et al. |
| 2023/0026865 A1 | 1/2023 | Rolando et al. |
| 2023/0028872 A1 | 1/2023 | Ramaswamy |
| 2023/0039869 A1 | 2/2023 | Ramaswamy et al. |
| 2023/0041916 A1 | 2/2023 | Zhang et al. |
| 2023/0054961 A1 | 2/2023 | Ramaswamy et al. |
| 2023/0105680 A1 | 4/2023 | Simlai et al. |
| 2023/0110199 A1* | 4/2023 | Gupta ................ H04L 12/4641<br>709/238 |
| 2023/0121871 A1 | 4/2023 | Mayya et al. |
| 2023/0164158 A1 | 5/2023 | Fellows et al. |
| 2023/0179445 A1 | 6/2023 | Cidon et al. |
| 2023/0179502 A1 | 6/2023 | Ramaswamy et al. |
| 2023/0179521 A1 | 6/2023 | Markuze et al. |
| 2023/0179543 A1 | 6/2023 | Cidon et al. |
| 2023/0216768 A1 | 7/2023 | Zohar et al. |
| 2023/0216801 A1 | 7/2023 | Markuze et al. |
| 2023/0216804 A1 | 7/2023 | Zohar et al. |
| 2023/0221874 A1 | 7/2023 | Markuze et al. |
| 2023/0224356 A1 | 7/2023 | Markuze et al. |
| 2023/0224759 A1 | 7/2023 | Ramaswamy |
| 2023/0231785 A1* | 7/2023 | Kumar ................ H04L 41/122<br>709/224 |
| 2023/0231845 A1 | 7/2023 | Manoharan et al. |
| 2023/0239234 A1 | 7/2023 | Zohar et al. |
| 2023/0261974 A1 | 8/2023 | Ramaswamy et al. |
| 2023/0308421 A1 | 9/2023 | Mayya et al. |
| 2023/0337113 A1* | 10/2023 | Trujillo ................ H04W 40/28 |
| 2023/0388233 A1 | 11/2023 | Thoria et al. |
| 2024/0004628 A1* | 1/2024 | Gupta ................ G06F 16/24578 |
| 2024/0031288 A1* | 1/2024 | Ponnuru ............ H04L 45/7453 |
| 2024/0031296 A1 | 1/2024 | Ramaswamy et al. |
| 2024/0147297 A1* | 5/2024 | Ramaswamy ......... H04L 45/04 |
| 2024/0267396 A1* | 8/2024 | Toy .................... H04L 63/1425 |
| 2024/0333622 A1* | 10/2024 | Zad Tootaghaj .... H04L 43/0876 |
| 2024/0333631 A1* | 10/2024 | Zafer ..................... H04L 41/40 |
| 2024/0340228 A1* | 10/2024 | Mermoud ........... H04L 43/0823 |
| 2025/0217191 A1* | 7/2025 | Wang ................ G06F 9/45558 |

FOREIGN PATENT DOCUMENTS

| CN | 102577270 A | 7/2012 |
| CN | 102811165 A | 12/2012 |
| CN | 104205757 A | 12/2014 |
| CN | 104956329 A | 9/2015 |
| CN | 106230650 A | 12/2016 |
| CN | 106656847 A | 5/2017 |
| CN | 106998284 A | 8/2017 |
| CN | 110447209 A | 11/2019 |
| CN | 111198764 A | 5/2020 |
| EP | 1031224 B1 | 3/2005 |
| EP | 1912381 A1 | 4/2008 |
| EP | 2538637 A2 | 12/2012 |
| EP | 2763362 A1 | 8/2014 |
| EP | 3041178 A1 | 7/2016 |
| EP | 3297211 A1 | 3/2018 |
| EP | 3509256 A1 | 7/2019 |
| EP | 3346650 B1 | 11/2019 |
| JP | 2002368792 A | 12/2002 |
| JP | 2010233126 A | 10/2010 |

(56) References Cited

FOREIGN PATENT DOCUMENTS

| JP | 2014200010 | A | 10/2014 |
| JP | 2017059991 | A | 3/2017 |
| JP | 2017524290 | A | 8/2017 |
| KR | 20170058201 | A | 5/2017 |
| RU | 2574350 | C2 | 2/2016 |
| WO | 2000078004 | A2 | 12/2000 |
| WO | 03073701 | A1 | 9/2003 |
| WO | 2005071861 | A1 | 8/2005 |
| WO | 2007016834 | A1 | 2/2007 |
| WO | 2012167184 | A2 | 12/2012 |
| WO | 2015092565 | A1 | 6/2015 |
| WO | 2016061546 | A1 | 4/2016 |
| WO | 2016123314 | A1 | 8/2016 |
| WO | 2017083975 | A1 | 5/2017 |
| WO | 2019070611 | A1 | 4/2019 |
| WO | 2019094522 | A1 | 5/2019 |
| WO | 2020012491 | A1 | 1/2020 |
| WO | 2020018704 | A1 | 1/2020 |
| WO | 2020091777 | A1 | 5/2020 |
| WO | 2020101922 | A1 | 5/2020 |
| WO | 2020112345 | A1 | 6/2020 |
| WO | 2020214713 | A1 | 10/2020 |
| WO | 2021040934 | A1 | 3/2021 |
| WO | 2021118717 | A1 | 6/2021 |
| WO | 2021150465 | A1 | 7/2021 |
| WO | 2021211906 | A1 | 10/2021 |
| WO | 2021242562 | A1 | 12/2021 |
| WO | 2022005607 | A1 | 1/2022 |
| WO | 2022082680 | A1 | 4/2022 |
| WO | 2022154850 | A1 | 7/2022 |
| WO | 2022159156 | A1 | 7/2022 |
| WO | 2022231668 | A1 | 11/2022 |
| WO | 2022235303 | A1 | 11/2022 |
| WO | 2022265681 | A1 | 12/2022 |
| WO | 2023009159 | A1 | 2/2023 |

OTHER PUBLICATIONS

Non-Published Commonly Owned Related U.S. Appl. No. 18/234,378 with similar specification, filed Aug. 16, 2023, 100 pages, VMware, Inc.

Non-Published Commonly Owned Related U.S. Appl. No. 18/234,379 with similar specification, filed Aug. 16, 2023, 100 pages, VMware, Inc.

Non-Published Commonly Owned Related U.S. Appl. No. 18/234,380 with similar specification, filed Aug. 16, 2023, 100 pages, VMware, Inc.

Non-Published Commonly Owned U.S. Appl. No. 18/235,879, filed Aug. 20, 2023, 173 pages, VMware, Inc.

Non-Published Commonly Owned U.S. Appl. No. 18/375,925, filed Oct. 2, 2023, 100 pages, VMware, Inc.

Non-Published Commonly Owned U.S. Appl. No. 15/803,964, filed Nov. 6, 2017, 15 pages, The Mode Group.

Noormohammadpour, Mohammad, et al., "DCRoute: Speeding up Inter-Datacenter Traffic Allocation while Guaranteeing Deadlines," 2016 IEEE 23rd International Conference on High Performance Computing (HiPC), Dec. 19-22, 2016, 9 pages, IEEE, Hyderabad, India.

Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.

Sarhan, Soliman Abd Elmonsef, et al., "Data Inspection in SDN Network," 2018 13th International Conference on Computer Engineering and Systems (ICCES), Dec. 18-19, 2018, 6 pages, IEEE, Cairo, Egypt.

Taleb, Tarik, "D4.1 Mobile Network Cloud Component Design," Mobile Cloud Networking, Nov. 8, 2013, 210 pages, MobileCloud Networking Consortium, retrieved from http://www.mobile-cloud-networking.eu/site/index.php?process=download&id=127&code=89d30565cd2ce087d3f8e95f9ad683066510a61f.

Tootaghaj, Diman Zad, et al., "Homa: An Efficient Topology and Route Management Approach in SD-WAN Overlays," IEEE Infocom 2020—IEEE Conference on Computer Communications, Jul. 6-9, 2020, 10 pages, IEEE, Toronto, ON, Canada.

Valtulina, Luca, "Seamless Distributed Mobility Management (DMM) Solution in Cloud Based LTE Systems," Master Thesis, Nov. 2013, 168 pages, University of Twente, retrieved from http://essay.utwente.nl/64411/1/Luca_Valtulina_MSc_Report_final.pdf.

Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.

Xie, Junfeng, et al., A Survey of Machine Learning Techniques Applied to Software Defined Networking (SDN): Research Issues and Challenges, IEEE Communications Surveys & Tutorials, Aug. 23, 2018, 38 pages, vol. 21, Issue 1, IEEE.

Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.

Zakurdaev, Gieorgi, et al., "Dynamic On-Demand Virtual Extensible LAN Tunnels via Software-Defined Wide Area Networks," 2022 IEEE 12th Annual Computing and Communication Workshop and Conference, Jan. 26-29, 2022, 6 pages, IEEE, Las Vegas, NV, USA.

Alsaeedi, Mohammed, et al., "Toward Adaptive and Scalable OpenFlow-SDN Flow Control: A Survey," IEEE Access, Aug. 1, 2019, 34 pages, vol. 7, IEEE, retrieved from https://ieeexplore.ieee.org/document/8784036.

Alvizu, Rodolfo, et al., "SDN-Based Network Orchestration for New Dynamic Enterprise Networking Services," 2017 19th International Conference on Transparent Optical Networks, Jul. 2-6, 2017, 4 pages, IEEE, Girona, Spain.

Author Unknown, "VeloCloud Administration Guide: VMware SD-WAN by VeloCloud 3.3," Month Unknown 2019, 366 pages, VMware, Inc., Palo Alto, CA, USA.

Barozet, Jean-Marc, "Cisco SD-WAN as a Managed Service," BRKRST-2558, Jan. 27-31, 2020, 98 pages, Cisco, Barcelona, Spain, retrieved from https://www.ciscolive.com/c/dam/r/ciscolive/emea/docs/2020/pdf/BRKRST-2558.pdf.

Barozet, Jean-Marc, "Cisco SDWAN," Deep Dive, Dec. 2017, 185 pages, Cisco, Retreived from https://www.coursehero.com/file/71671376/Cisco-SDWAN-Deep-Divepdf/.

Bertaux, Lionel, et al., "Software Defined Networking and Virtualization for Broadband Satellite Networks," IEEE Communications Magazine, Mar. 18, 2015, 7 pages, vol. 53, IEEE, retrieved from https://ieeexplore.ieee.org/document/7060482.

Cox, Jacob H., et al., "Advancing Software-Defined Networks: A Survey," IEEE Access, Oct. 12, 2017, 40 pages, vol. 5, IEEE, retrieved from https://ieeexplore.ieee.org/document/8066287.

Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.

Duan, Zhenhai, et al., "Service Overlay Networks: SLAs, QoS, and Bandwidth Provisioning," IEEE/ACM Transactions on Networking, Dec. 2003, 14 pages, vol. 11, IEEE, New York, NY, USA.

Fortz, Bernard, et al., "Internet Traffic Engineering by Optimizing OSPF Weights," Proceedings IEEE Infocom 2000, Conference on Computer Communications, Nineteenth Annual Joint Conference of the IEEE Computer and Communications Societies, Mar. 26-30, 2000, 11 pages, IEEE, Tel Aviv, Israel, Israel.

Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MASCOTS), Sep. 19-21, 2016, 10 pages, IEEE, London, UK.

Funabiki, Nobuo, et al., "A Frame Aggregation Extension of Routing Algorithm for Wireless Mesh Networks," 2014 Second International Symposium on Computing and Networking, Dec. 10-12, 2014, 5 pages, IEEE, Shizuoka, Japan.

Guo, Xiangyi, et al., (U.S. Appl. No. 62/925,193), filed Oct. 23, 2019, 26 pages.

(56) References Cited

OTHER PUBLICATIONS

Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.

Jivorasetkul, Supalerk, et al., "End-to-End Header Compression over Software-Defined Networks: a Low Latency Network Architecture," 2012 Fourth International Conference on Intelligent Networking and Collaborative Systems, Sep. 19-21, 2012, 2 pages, IEEE, Bucharest, Romania.

Lasserre, Marc, et al., "Framework for Data Center (DC) Network Virtualization," RFC 7365, Oct. 2014, 26 pages, IETF.

Li, Shengru, et al., "Source Routing with Protocol-oblivious Forwarding (POF) to Enable Efficient e-Health Data Transfers," 2016 IEEE International Conference on Communications (ICC), May 22-27, 2016, 6 pages, IEEE, Kuala Lumpur, Malaysia.

Lin, Weidong, et al., "Using Path Label Routing in Wide Area Software-Defined Networks with Open Flow," 2016 International Conference on Networking and Network Applications, Jul. 2016, 6 pages, IEEE.

Long, Feng, "Research and Application of Cloud Storage Technology in University Information Service," Chinese Excellent Masters' Theses Full-text Database, Mar. 2013, 72 pages, China Academic Journals Electronic Publishing House, China.

Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.

Ming, Gao, et al., "A Design of SD-WAN-Oriented Wide Area Network Access," 2020 International Conference on Computer Communication and Network Security (CCNS), Aug. 21-23, 2020, 4 pages, IEEE, Xi'an, China.

Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.

Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.

Non-Published Commonly Owned U.S. Appl. No. 17/833,555, filed Jun. 6, 2022, 34 pages, VMware, Inc.

Non-Published Commonly Owned U.S. Appl. No. 17/833,566, filed Jun. 6, 2022, 35 pages, VMware, Inc.

Non-Published Commonly Owned U.S. Appl. No. 17/976,717, filed Oct. 28, 2022, 37 pages, VMware, Inc.

Non-Published Commonly Owned U.S. Appl. No. 18/100,369, filed Jan. 23, 2023, 55 pages, VMware, Inc.

Non-Published Commonly Owned U.S. Appl. No. 18/100,381, filed Jan. 23, 2023, 55 pages, VMware, Inc.

Non-Published Commonly Owned U.S. Appl. No. 18/100,397, filed Jan. 23, 2023, 55 pages, VMware, Inc.

Non-Published Commonly Owned U.S. Appl. No. 18/126,989, filed Mar. 27, 2023, 83 pages, VMware, Inc.

Non-Published Commonly Owned U.S. Appl. No. 18/126,990, filed Mar. 27, 2023, 84 pages, VMware, Inc.

Non-Published Commonly Owned U.S. Appl. No. 18/126,991, filed Mar. 27, 2023, 84 pages, VMware, Inc.

Non-Published Commonly Owned U.S. Appl. No. 18/126,992, filed Mar. 27, 2023, 84 pages, VMware, Inc.

Non-Published Commonly Owned U.S. Appl. No. 18/208,352, filed Jun. 12, 2023, 69 pages, VMware, Inc.

Non-Published Commonly Owned U.S. Appl. No. 18/208,356, filed Jun. 12, 2023, 69 pages, VMware, Inc.

Non-Published Commonly Owned U.S. Appl. No. 18/208,358, filed Jun. 12, 2023, 69 pages, VMware, Inc.

Non-Published Commonly Owned U.S. Appl. No. 18/211,568, filed Jun. 19, 2023, 37 pages, VMware, Inc.

Non-Published Commonly Owned U.S. Appl. No. 18/211,576, filed Jun. 19, 2023, 37 pages, VMware, Inc.

Non-Published Commonly Owned U.S. Appl. No. 18/211,578, filed Jun. 19, 2023, 36 pages, VMware, Inc.

Non-Published Commonly Owned U.S. Appl. No. 18/211,820, filed Jun. 20, 2023, 43 pages, VMware, Inc.

Non-Published Commonly Owned U.S. Appl. No. 18/211,842, filed Jun. 20, 2023, 43 pages, VMware, Inc.

Non-Published Commonly Owned U.S. Appl. No. 18/211,850, filed Jun. 20, 2023, 43 pages, VMware, Inc.

Non-Published Commonly Owned U.S. Appl. No. 18/222,864, filed Jul. 17, 2023, 350 pages, VMware, Inc.

Non-Published Commonly Owned U.S. Appl. No. 18/222,868, filed Jul. 17, 2023, 22 pages, VMware, Inc.

Non-Published Commonly Owned U.S. Appl. No. 18/224,466, filed Jul. 20, 2023, 56 pages, VMware, Inc.

Non-Published Commonly Owned U.S. Appl. No. 18/225,720, filed Jul. 25, 2023, 86 pages, VMware, Inc.

Non-Published Commonly Owned Related U.S. Appl. No. 18/234,373 with similar specification, filed Aug. 16, 2023, 100 pages, VMware, Inc.

Non-Published Commonly Owned Related U.S. Appl. No. 18/234,374 with similar specification, filed Aug. 16, 2023, 100 pages, VMware, Inc.

Non-Published Commonly Owned Related U.S. Appl. No. 18/234,375 with similar specification, filed Aug. 16, 2023, 101 pages, VMware, Inc.

Non-Published Commonly Owned Related U.S. Appl. No. 18/234,376 with similar specification, filed Aug. 16, 2023, 102 pages, VMware, Inc.

European Patent Office, Extended Search Report, Application No. 24192140.2, Jan. 7, 2025, 9 pages.

Kawakami, M. et al., Live Streaming Over Wi-Fi Direct Multi-Groups, 2019 Seventh International Symposium on Computing and Networking Workshops (CANDARW), IEEE, 2019, pp. 221-227.

* cited by examiner

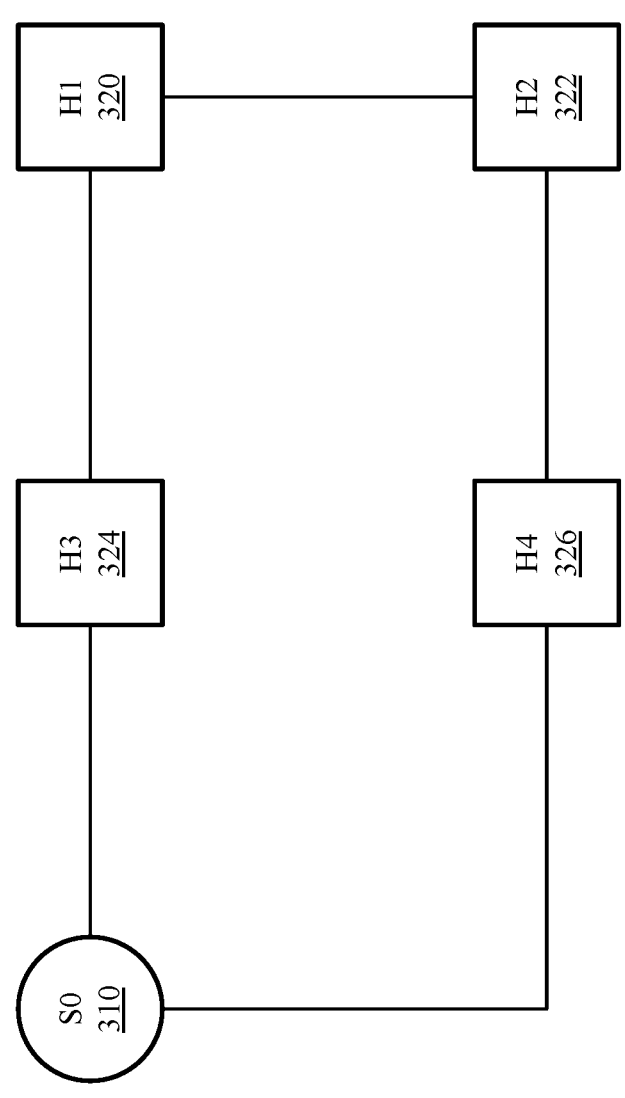
*Figure 3*

700

|    | S1 | H1 | H2 | S2 |
|----|----|----|----|----|
| S1 | 1  | 1  | 0  | 0  |
| H1 | 1  | 1  | 1  | 0  |
| H2 | 0  | 1  | 1  | 10 |
| S2 | 0  | 0  | 10 | -  |

```
// Source of Reachability (SoR) stuffs
static struct vc_hash_map_rwlocked *vc_sor_table = NULL;
typedef struct vc_sor_transit {
    TAILQ_ENTRY(vc_sor_transit) link;
    struct logical_id transit_id;
    int
    int
    int
    uint8_t
    uint64_t
    uint8_t
    uint8_t
} vc_sor_transit_t;
reachable;
routes_check_scheduled;
routes_check_scheduled_cnt;                805
metric;
time_of_arrival;
sent : 1;
rcvd : 1;
typedef struct vc_sor_entry_key {
    struct logical_id   node_id; // key
    struct logical_id   entr_id; // entr ID
} vc_sor_entry_key_t;
TAILQ_HEAD(vc_sor_transit_list, vc_sor_transit);
typedef struct vc_sor_entry {                          815
    vc_sor_entry_key_t          key;
    AO_t                        users;
    // indicates this edge/gw is directly connected to node_id
    int                         connected;                   810
    vc_pthread_rwlock_t         transits_list_lock;
    struct vc_sor_transit_list direct_transits;  // List of direct
transits
    struct vc_sor_transit_list relayed_transits; // List of relayed
transits
    struct hash_map_rwlocked  *transits_map;     // Hashmap of transits
} vc_sor_entry_t;
```

```
struct subscribers_list {
    struct logical_id sub_log_id;//subscribers logical_id
    int op_type;
};

struct dest_id_subscribers_info {
    struct logical_id dest_id;
    uint32_t    seg_id;
    struct subscribers_list sub_list[50];//list of subscribers
    int subscriber_count;
};
```

|     | S1 | C11 | S2 | C12 | S3 | C13 | S4 | C14 |
| --- | --- | --- | --- | --- | --- | --- | --- | --- |
| S1  | 1 | 1 | 0 | 0 | 0 | 0 | 0 | 0 |
| C11 | 1 | 1 | 0 | 0 | 0 | 0 | 0 | 0 |
| S2  | 0 | 0 | - | 10 | 0 | 0 | 0 | 0 |
| C12 | 0 | 0 | 10 | 1 | 0 | 0 | 0 | 0 |
| S3  | 0 | 0 | 0 | 0 | - | 10 | 0 | 0 |
| C13 | 0 | 0 | 0 | 0 | 10 | 1 | 0 | 0 |
| S4  | 0 | 0 | 0 | 0 | 0 | 0 | - | 10 |
| C14 | 0 | 0 | 0 | 0 | 0 | 0 | 10 | 1 |

2000

|    | S1 | H1 |
|----|----|----|
| S1 | 1  | 1  |
| H1 | 1  | 1  |

|    | S1 | H1 | H2 |
|----|----|----|----|
| S1 | 1  | 1  | 0  |
| H1 | 1  | 1  | 1  |
| H2 | 0  | 1  | 1  |

|    | S1 | H1 | H2 | S2 |
|----|----|----|----|----|
| S1 | 1  | 1  | 0  | 0  |
| H1 | 1  | 1  | 1  | 0  |
| H2 | 0  | 1  | 1  | 10 |
| S2 | 0  | 0  | 10 | -  |

|    | S1 | H1 | H2 | S2 | H3 | S3 |
|----|----|----|----|----|----|----|
| S1 | 1  | 1  | 0  | 0  | 0  | 0  |
| H1 | 1  | 1  | 1  | 0  | 0  | 0  |
| H2 | 0  | 1  | 1  | 10 | 1  | 0  |
| S2 | 0  | 0  | 10 | -  | 0  | 0  |
| H3 | 0  | 0  | 1  | 0  | 1  | 10 |
| S3 | 0  | 0  | 0  | 0  | 10 | -  |

*Figure 24*

|    | S1 | H1 | H2 |
|----|----|----|----|
| S1 | 1  | 1  | 1  |
| H1 | 1  | 1  | 0  |
| H2 | 1  | 0  | 1  |

|    | S1 | H1 | H2 | H3 | H4 |
|----|----|----|----|----|----|
| S1 | 1  | 1  | 1  | 0  | 0  |
| H1 | 1  | 1  | 0  | 1  | 1  |
| H2 | 1  | 0  | 1  | 1  | 1  |
| H3 | 0  | 1  | 1  | 1  | 0  |
| H4 | 0  | 1  | 1  | 0  | 1  |

|    | S1 | H1 | H2 | H3 | H4 | S2 |
|----|----|----|----|----|----|----|
| S1 | 1  | 1  | 1  | 0  | 0  | 0  |
| H1 | 1  | 1  | 0  | 1  | 1  | 0  |
| H2 | 1  | 0  | 1  | 1  | 1  | 0  |
| H3 | 0  | 1  | 1  | 1  | 0  | 10 |
| H4 | 0  | 1  | 1  | 0  | 1  | 10 |
| S2 | 0  | 0  | 0  | 10 | 10 | -  |

|  | S1 | H1 | S2 | H2 | S3 | H3 | S4 | H4 | H5 | S5 | H6 | S6 | H7 | S7 | C24 | H8 |
|---|---|---|---|---|---|---|---|---|---|---|---|---|---|---|---|---|
| S1 | 1 | 1 | 0 | 0 | 0 | 0 | 0 | 0 | 1 | 1 | 0 | 0 | 0 | 0 | 0 | 0 |
| H1 | 1 | 1 | 0 | 0 | 0 | 0 | 0 | 0 | 1 | 0 | 0 | 0 | 0 | 0 | 0 | 0 |
| S2 | 0 | 0 | 1 | 1 | 0 | 0 | 0 | 0 | 0 | 0 | 0 | 0 | 0 | 0 | 0 | 0 |
| H3 | 0 | 0 | 1 | 1 | 0 | 1 | 0 | 0 | 0 | 0 | 1 | 0 | 0 | 0 | 0 | 0 |
| S3 | 0 | 0 | 0 | 0 | 1 | 1 | 0 | 0 | 0 | 0 | 0 | 0 | - | 10 | 0 | 0 |
| H3 | 0 | 0 | 0 | 0 | 1 | 0 | 1 | 0 | 0 | 0 | 0 | 0 | 1 | 0 | 0 | 0 |
| S4 | 0 | 0 | 0 | 0 | 0 | 0 | 1 | 1 | 0 | 0 | 0 | 0 | 0 | 0 | 0 | 0 |
| H4 | 0 | 0 | 0 | 0 | 0 | 0 | 0 | 1 | 0 | 0 | 0 | 0 | 0 | 0 | 1 | 0 |
| H5 | 0 | 1 | 0 | 1 | 0 | 0 | 0 | 0 | 1 | 10 | 1 | 0 | 0 | 0 | 0 | 0 |
| S5 | 0 | 0 | 0 | 0 | 0 | 0 | 0 | 0 | 10 | - | 10 | 10 | 0 | 0 | 0 | 0 |
| H6 | 0 | 0 | 0 | 0 | 0 | 0 | 0 | 0 | 0 | 0 | 0 | - | 0 | 0 | 0 | 0 |
| S6 | 0 | 0 | 0 | 0 | 0 | 1 | 0 | 0 | 0 | 0 | 0 | 0 | 1 | 10 | 0 | 0 |
| H7 | 0 | 0 | 0 | 0 | 0 | 0 | - | 0 | 0 | 0 | 0 | 0 | 10 | - | 0 | 0 |
| S7 | 0 | 0 | 0 | 0 | 0 | 0 | 0 | 1 | 0 | 0 | 0 | 0 | 0 | 0 | 0 | 0 |
| H8 | 0 | 0 | 0 | 0 | 0 | 0 | 0 | 0 | 0 | 0 | 0 | 0 | 0 | 0 | 1 | 10 |
| S8 | 0 | 0 | 0 | 0 | 0 | 0 | 0 | 0 | 0 | 0 | 0 | 0 | 0 | 0 | 10 | - |

*Figure 34*

3500

|    | S1 | S2 | H1 | S3 | S4 | H2 |
|----|----|----|----|----|----|----|
| S1 | 1  | 0  | 1  | 0  | 0  | 1  |
| S2 | 0  | 1  | 1  | 0  | 0  | 1  |
| H1 | 1  | 1  | 1  | 1  | 1  | 0  |
| S3 | 0  | 0  | 1  | 1  | 0  | 1  |
| S4 | 0  | 0  | 1  | 0  | 1  | 1  |
| H2 | 1  | 1  | 0  | 1  | 1  | 1  |

DISTRIBUTED GATEWAYS FOR MULTI-REGIONAL LARGE SCALE DEPLOYMENTS

BACKGROUND

Today, some routing solutions enable interconnectivity among SASE enabled destinations. Some of these routing solutions (e.g., VMware, Inc.'s SASE routing solution) involve stateless cloud controller models for route propagation to SASE edges. However, the limits on the number of edges that can connect to any given transit point or gateway router create issues for large scale deployments (e.g., deployments with greater than 4,000 edges). For example, deployments that utilize underlays lose end-to-end visibility as the original sender's information is lost when overlay to underlay handoffs occur. In another example, deployments that use overlays have to use a common controller for route exchanges, which limits the maximum supported overlay hops to two, thus constraining hierarchical deployments. Additionally, the common controller (i.e., common gateway) model requires manual assignment of controllers to edges to keep the number of edges connecting to a controller within the acceptable limit.

BRIEF SUMMARY

Some embodiments of the invention provide methods for supporting large scale deployments that require interconnectivity of SD-WAN nodes spread across geographical regions. In some embodiments, support for multi-hop routing is enabled through distributed, disjoint gateway routers to address scaling demands. Branch-to-branch VPN (virtual private network), customizable VPN (e.g., profile isolation) among branches across regions using a common controller model, seamless switching between redundant transit points using route summarization, full-mesh or customizable mesh for redundancy and resiliency are all supported by the embodiments described herein.

Some embodiments of the invention provide methods for implementing an SD-WAN that connects multiple sites at multiple physical locations. The SD-WAN of some embodiments includes (1) multiple edge routers at the multiple sites, (2) multiple route reflectors for multiple regions, each region including one or more sites, and (3) multiple hub routers for the multiple regions, each particular hub router of each particular region forwarding packets between the edge routers of the sites of the particular region and between the regions.

At a first hub router of the SD-WAN, a first method for implementing the SD-WAN establishes, with a first edge router located at a first site in a first region, a new connection for the first hub router to use to connect the first edge router to a second edge router of a second site in the first region. At the first hub router, the method determines that a peer-connection (peer-conn) notification regarding the newly connected first edge router has to be sent to a first route reflector that does not connect directly with the first edge router but connects to one or more routers in a second region of the SD-WAN. At the first hub router, the method sends the peer-conn notification to the first route reflector for the first router reflector to analyze in order to determine whether the first route reflector needs to obtain routes associated with the first edge router for advertising to the one or more routers in the second region.

At the first hub router of the SD-WAN, a second method for implementing the SD-WAN establishes, with the first edge router located at the first site in the first region, a new connection for the first hub router to use to connect the first edge router to the second edge router of the second site in the first region. At the first hub router, the method determines that a peer-conn notification regarding the newly connected first edge router has to be sent to a second hub router of a second region that does not directly connect with the first edge router but connects to one or more routers in a second region and to a third hub router of a third region. At the first hub router, the method sends the peer-conn notification to the second hub router for the second hub router to distribute the peer-connection notification to the one or more routers in the second region and the third hub router of the third region.

At the first hub router of the SD-WAN, a third method for implementing the SD-WAN establishes, with the first edge router located at the first site in the first region, a new connection for the first hub router to use to connect the first edge router to the second edge router of the second site in the first region. At the first hub router, the method determines that a peer-conn notification regarding a set of other routers of which the first hub router has been notified has to be sent to the first edge router. At the first hub router, the method sends the peer-conn notification to the first edge router for the first edge router to analyze in order to determine whether the first edge router needs to obtain routes associated with each other router in the set of other routers.

At a first route reflector of the first region of the SD-WAN, a fourth method for implementing the SD-WAN receives, from the first hub router of the first region, a peer-conn notification regarding the newly connected first edge router located at the first site in the first region. At the first route reflector, the method determines that a routing table maintained by the first route reflector does not include routes of the first edge router and that the first route reflector does not have a direct connection to the first edge router. Based on these determinations, at the first route reflector, the method requests routes of the first edge router from the first hub router. After receiving the requested routes of the first edge router from the first hub router, the method updates, at the first route reflector, the routing table to include the routes of the first edge router.

In some of the embodiments above, each peer-conn notification includes an identifier associated with the first edge router, and one or more of PMTU (path maximum transmission unit) associated with the first edge router, a current connection status of the first edge router (i.e., connected or disconnected), a profile associated with the first edge router, a set of configuration parameters defined for the first edge router, and endpoint information associated with the first edge router. The identifier, in some embodiments, includes a logical identifier assigned to the first edge router. In some embodiments, a node identifier associated with the first edge router is also included. The configuration parameters, in some embodiments, include a set of routing configuration parameters.

The endpoint information included in the peer-conn notification, in some embodiments, includes a number of private links of the first edge router, network addresses for each private link of the first edge router, a number of public links of the first edge router, and network addresses for each public link of the first edge router. This endpoint information is used in some embodiments by edge routers that receive the peer-conn notification to establish a dynamic edge-to-edge connection with the first edge router.

In some embodiments, the metric value specified in the peer-conn notification is a metric value of 1 for direct connections, and is incremented for each additional hop. For instance, in some embodiments, the second hub router of the second region that does not directly connect with the first edge router but connects to one or more routers in the second region and to the third hub router of the third region sends the peer-conn notification to the one or more routers in the second region and to the third hub router of the third region after incrementing the metric to indicate the additional hop (i.e., the first hub router) between the second hub router and the first edge router.

Also, in some embodiments, the peer-conn notification received by the second hub router also includes a direct flag indicating the direct connection between the first hub router and first edge router, and before sending the peer-conn notification to the one or more routers in the second region and to the third hub router of the third region, the second hub router removes the direct flag and instead sets a relay flag to indicate the relayed connection between the second hub router and the first edge router.

Some embodiments of the invention provide a method for forwarding packet through an SD-WAN. To facilitate the forwarding of packets from a first region of the SD-WAN to a second region of the SD-WAN, and from the second region of the SD-WAN to the first region of the SD-WAN, said first region having a first hub router forwarding packets between a first set of edge routers of a first set of sites of the first region, and said second region having a second hub router for forwarding packets between a second set of edge routers of a second set of sites of the second region, the method directs the first set of edge routers to (1) establish connections to the first and second hub routers, and (2) use the first hub router as a next-hop to initiate communications with the second set of edge routers located at the second set of branch sites of the second region. The method also directs the second set of edge routers to (1) establish connections to the first and second hub routers, and (2) use the second hub router as a next-hop to initiate communications with the first set of edge routers located at the first set of branch sites of the first region.

In some embodiments, the method is performed by a route reflector or set of route reflectors that connects to the first and second sets of edge routers, and to the first and second hub. The route reflector of some embodiments directs the first and second sets of edge routers by providing a first set of configuration data to the first set of edge routers and a second set of configuration data to the second set of edge routers. The first set of configuration data, in some embodiments, includes connection data (e.g., DCE (data circuit-terminating equipment) information) for establishing connections to the first and second hub routers, and a first routing table identifying the first hub router as a primary hub router and the second hub router as a secondary hub router for the first set of edge routers. In some embodiments, the second set of configuration data includes connection data for establishing connections to the first and second hub routers, and a second routing table identifying the second hub router as a primary hub router and the first hub router as a secondary hub router for the second set of edge routers.

The route reflector of some embodiments stores records that identify routes of each edge router in the first and second sets of edge routers of the first and second regions. In some embodiments, to reduce a number of routes that the route reflector advertises to the first and second sets of edge routers of the first and second regions, the route reflector aggregates routes of the first set of edge routers in a first record to create a first aggregated route for reaching the first set of edge routers of the first region, and aggregates routes of the second set of edge routers in a second record to create a second aggregated route for reaching the second set of edge routers of the second region. The first record, in some embodiments, identifies the second hub router as a next hop, and the second record identifies the first hub router as a next hop. The route reflector of some embodiments then advertises the first record to the second set of edge routers, and advertises the second record to the first set of edge routers.

In some embodiments, when a first edge router in the first set of edge routers of the first region receives a first packet flow initiated by a second edge router in the second set of edge routers of the second region via the second hub router, the first edge router in the first region uses the second hub router as a next hop to send a reply to the second edge router in the second region. Similarly, when the second edge router in the second region receives a second packet flow initiated by the first edge router in the first region via the first hub router, the second edge router in the second region uses the first hub router as a next hop to send a reply to the first edge router in the first region, according to some embodiments.

The route reflector or set of route reflectors of some embodiments receive, from the second hub router, a notification that the second hub router has lost connectivity to a first edge router of the first set of edge routers of the first region. Based on the notification, the route reflector of some embodiments advertises to the second set of edge routers a third route that identifies the first hub router as a next-hop for initiating communications with the first edge router in the first region. The first and second routes, in some embodiments, are first and second summarized routes that represent aggregated routes of the first and second sets of edge routers, respectively.

In some embodiments, after receiving the third route that identifies the first hub router as the next-hop for initiating communications with the first edge router in the first region, the second set of edge routers (1) use the third route with the first hub router as the next-hop for initiating communications with the first edge router in the first set of edge routers of the first region, and (2) continue to use the second route with the second hub router as the next-hop for initiating communications with each other edge router in the first set of edge routers in the first region. The route reflector of some embodiments receives a subsequent notification from the second hub router indicating the connection between the second hub router and the first edge router has been reestablished. In response to this subsequent notification, the route reflector advertises to the second set of edge routers the second route that identifies the second hub router as the next hop for use in initiating communications with the first set of edge routers in the first region including the first edge router, in some embodiments, causing the second set of edge routers to use the second hub router to initiate communications with all edge routers in the first set of edge routers.

Some embodiments of the invention provide a method for interconnecting hub router clusters in an SD-WAN. The method is performed for each particular hub router belonging to a first hub router cluster of the SD-WAN and located in a first of multiple regions connected by the SD-WAN. The method establishes a connection with a respective hub router belonging to a second hub router cluster of the SD-WAN and located in a second of the multiple regions connected by the SD-WAN. The method sends, to a particular route reflector for the first region to which the first hub router cluster is connected, a first peer-conn notification that identifies the particular hub router as a next-hop for reaching the respective hub router of the second hub router cluster. For each other hub router belonging to the first hub router cluster, the method receives from the particular route reflector a second peer-conn notification identifying the other hub router in the first hub router cluster as a next-hop for reaching the other hub router's respective hub router of the second hub router cluster for use in reaching edge routers connected to each other hub router's respective hub router of the second hub router cluster.

In some embodiments, the first and second hub router clusters have the same number of hub routers (i.e., the first hub router cluster includes a same number of hub routers as the second hub router cluster). In some such embodiments, after the hub router clusters are interconnected, a one-to-one association is established between the first and second hub router clusters. In other embodiments, the first and second hub router clusters have different numbers of hub routers. For instance, in some other embodiments, the first hub router cluster includes more hub routers than the second hub router cluster. In some such other embodiments, after each hub router belonging to the second hub cluster has established a connection with a respective hub router belonging to the first hub cluster, the hub routers belonging to the second hub cluster are iterated through and assigned to additional hub routers belonging to the first hub cluster to ensure each hub router in the first hub router cluster has a connection established with a hub router belonging to the second hub cluster.

Some embodiments of the invention provide a method for providing dynamic edge-to-edge support across multi-hops in an SD-WAN. At a first route reflector for a first of multiple regions connected by the SD-WAN, each region having one or more edge routers located at one or more sites in the region, the multiple regions connected by multiple hub routers located in the multiple regions, the method receives, from a first edge router located at first site of the first region, a first endpoint information request for endpoint information associated with a second edge router located at a second site of a second region. At the first route reflector, after determining that the first route reflector does not have a direct connection to the second edge router, the method identifies a next-hop hub router for reaching the second edge router. At the first route reflector, the method sends a second endpoint information request to the identified next-hop hub router to request the identified next-hop hub router to forward endpoint information for the second edge router to the first edge router for the first edge router to use to establish a dynamic edge-to-edge connection with the second edge router.

In some embodiments, the dynamic edge-to-edge connection flows from the first edge router to the first hub router, from the first hub router to the second hub router, and from the second hub router to the second edge router. In other embodiments, the connection traverses additional hub routers between the first and second hub routers. The dynamic edge-to-edge connection of some embodiments is achieved using overlay connections between the edge routers and hub routers, and using underlay connections between the hub routers.

Some embodiments of the invention provide a method for providing asymmetric route resolutions in an SD-WAN. At a first edge router located at a first site in a first region connected by the SD-WAN, the first edge router being one of multiple edge routers located at multiple sites across multiple regions connected by the SD-WAN, the method receives, from a first hub router of a first hub router cluster, a first packet flow that originates from a second edge router located at a second site in a second region connected by the SD-WAN and that is sent by the second edge router via a first route that points to a second hub router of a second hub router cluster as a next hop. At the first edge router, the method identifies a second route that is defined as a default route for reaching the second edge router from the first edge router and that points to a third hub router of the second hub router cluster as next-hop for reaching the second edge router. At the first edge router, the method determines that the first route includes secure overlay tunnels between the second edge router and the first edge router, and that a source network address associated with the first packet flow matches a source network address associated with the first route. Based on these determinations, the method uses, at the first edge router, the first route to send a return second packet flow to the second edge router to ensure symmetric routing.

In some embodiments, the second edge device has a direct connection to the third hub router of the second hub router cluster, and a fourth hub router of the first hub router cluster has a direct connection to the third hub router of the second hub router cluster. The second route, in some embodiments, identifies the fourth hub router of the first hub router cluster as a cluster exit for reaching the second edge router, and also identifies the third hub router of the second hub router cluster as a cluster entrance for reaching the second edge router. In some embodiments, the first hub router of the first hub router cluster has a direct connection to the second hub router of the second hub router cluster. In some such embodiments, the first route identifies the first hub router of the first hub router cluster as a cluster exit for reaching the second edge router, and also identifies the second hub router of the second hub router cluster as a cluster entrance for reaching the second edge router.

The second edge router and the third hub router of some embodiments synchronize one or more policies to be applied to packet flows sent between the second edge router and the first edge router using the first route. In some embodiments, by using the first route to send the return second packet flow to the second edge router to ensure symmetric routing, the one or more policies are ensured to be applied to packets in the return second packet flow. Examples of policies applied in some embodiments include a backhaul policy, firewall policy, intrusion detection policy, intrusion prevention policy, traffic shaping policy, monitoring policy, and resource allocation policy.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

FIG. 3 conceptually illustrates another example topology of some embodiments.

FIG. 7 illustrates a sample network reachability matrix of some embodiments.

FIG. 8 illustrates an example of the code for SoR table entries in some embodiments.

FIG. 12 illustrates an example of the code structure of a subscribers list of some embodiments.

FIGS. 20-22 illustrate examples of a connection table as it is updated by a gateway router in the topology illustrated by FIG. 19, in some embodiments.

FIG. 24 illustrates a connection table generated by a gateway router in the topology illustrated by FIG. 23, in some embodiments.

FIGS. 26-28 illustrate connection tables generated by a gateway router in the topology illustrated by FIG. 25, in some embodiments.

FIG. 34 conceptually illustrates a topology of some embodiments in which sites within a region are summarized under a single prefix.

DETAILED DESCRIPTION

Figure 1:
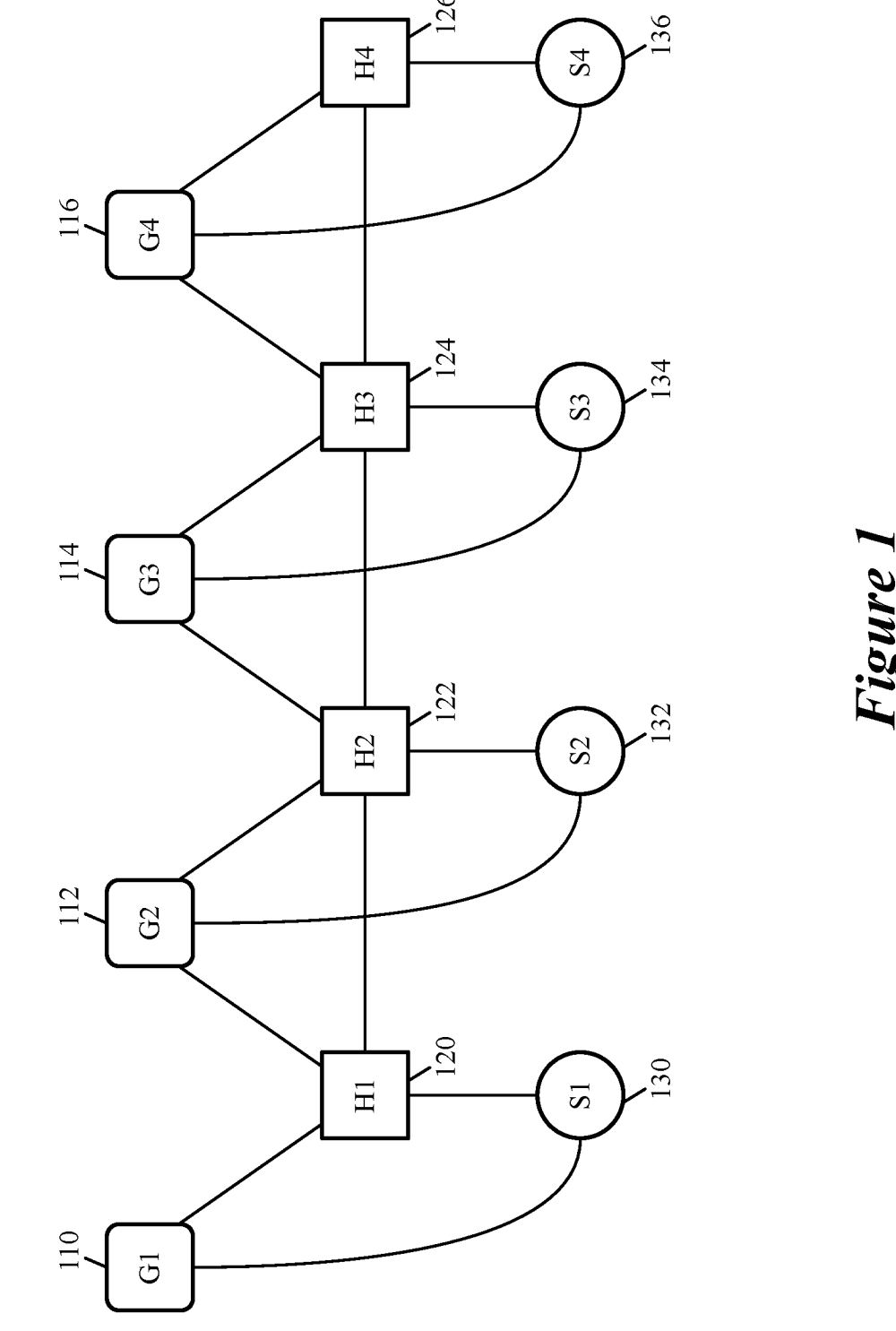
FIG. 1 conceptually illustrates an example of a topology of disjoint gateway routers of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide methods for supporting large scale deployments that require interconnectivity of SD-WAN nodes spread across geographical regions. In some embodiments, support for multi-hop routing is enabled through distributed, disjoint gateway routers to address scaling demands. Branch-to-branch VPN (virtual private network), customizable VPN (e.g., profile isolation) among branches across regions using a common controller model, seamless switching between redundant transit points using route summarization, full-mesh or customizable mesh for redundancy and resiliency are all supported by the embodiments described herein.

An SD-WAN forms the middle layer of the network connection between clients and devices on one end of the network (e.g., at branch, campus, and/or work-from-anywhere locations) and applications on the other end (e.g., cloud applications, datacenter applications). The SD-WAN, in some embodiments, is formed by a set of SD-WAN edge forwarding elements (e.g., SD-WAN nodes such as edge routers, hub routers, and gateway routers) that connect branch networks (or other enterprise networks) to datacenters and public and private clouds. The SD-WAN enables high performance and reliable branch network access across multiple different clouds, according to some embodiments.

The datacenters of some embodiments are cloud datacenters across which application resources are distributed. Examples of public clouds are public clouds provided by Amazon Web Services (AWS), Google Cloud Platform (GCP), Microsoft Azure, etc., while examples of entities include a company (e.g., corporation, partnership, etc.), an organization (e.g., a school, a non-profit, a government entity, etc.), etc. The edge routers of some embodiments are located at sites of the entity for which the SD-WAN is implemented. These sites, in some embodiments, are multi-machine sites, such as multi-user compute sites (e.g., branch offices or other physical locations having multi-user computers and other user-operated devices and serving as source computers and devices for requests to other machines at other sites), datacenters (e.g., locations housing servers), etc. These multi-machine sites are often at different physical locations (e.g., different buildings, different cities, different states, etc.).

In some embodiments, multiple secure connection links (e.g., multiple secure tunnels that are established over multiple physical links) can be established between one edge router and a gateway router. When multiple such links are defined between an edge router and a gateway router, each secure connection link in some embodiments is associated with a different physical network link between the edge router and an external network. For instance, to access external networks, an edge router in some embodiments has one or more commercial broadband Internet links (e.g., a cable modem, a fiber optic link) to access the Internet, an MPLS (multiprotocol label switching) link to access external networks through an MPLS provider's network, a wireless cellular link (e.g., a 5G LTE network), etc. In some embodiments, the different physical links between an edge router and a cloud gateway router are the same type of links (e.g., are different MPLS links).

In some embodiments, gateway routers act as route reflectors and build a view of the entire network through a peer-conn notification from transit points. The peer-conn notification (or peer-conn message) is a special control message that indicates the connection status of nodes along with the nodes' endpoint information, profile, and configuration parameters related to routing, according to some embodiments. Each node, in some embodiments is a branch, hub, or cluster member. In some embodiments, gateways, with the view of the network built using peer-conn notifications received from transit points, can request the transit points to send needed information, such as prefixes of nodes that are not directly connected to the requesting gateways but are connected to the transit points. Convergence and scale needs can be addressed in some embodiments by making gateways the deciding authority for receiving routes of not-directly-connected nodes from the relevant transit points.

Each SD-WAN, in some embodiments, includes a controller or a cluster of controllers that serve as a central point for managing (e.g., defining and modifying) configuration data that is provided to the edge routers, hub routers, and/or gateway routers to configure some or all of the operations. In some embodiments, the controller cluster is in one or more public cloud datacenters, while in other embodiments it is in one or more private datacenters. In some embodiments, the controller cluster has a set of manager servers that define and modify the configuration data, and a set of controller servers that distribute the configuration data to the edge routers, hub routers, and/or gateway routers (e.g., route reflectors). In some embodiments, the controller cluster directs edge routers and hub routers to use certain gateway routers (i.e., assigns a gateway to the edge routers and hub routers). In some embodiments, some or all of the controller cluster's functionality is performed by a cloud gateway. The controller cluster of some embodiments also provides next hop forwarding rules and load balancing criteria.

There are two types of transit points, in some embodiments. The first type is transit points that are directly connected to nodes, and the second type is transit points that are SD-WAN hop(s) away from nodes. In some embodiments, transit points propagate peer reachability through peer-conn notification. Each peer-conn notification, in some embodiments, includes information such as a node identifier for which the message is sent, the node's PMTU, and a reachability status (e.g., up, or down).

The transit points, in some embodiments, are nodes such as hubs and clusters that have the capability to interconnect branches in a region and across regions. In some embodiments, transit points notify gateways of reachability with branches thereby providing connectivity information to gateways to build a view of the entire network. FIG. 1 conceptually illustrates an example of a topology 100 of disjoint gateway routers of some embodiments. In this example, there are four regions in the topology with four gateways, G1 110, G2 112, G3 114, and G4 116, assigned to each region. The four gateways 110-116 are disjoint gateway routers. The disjoint gateway routers act as route reflectors for the regions that they serve, in some embodiments, and as such, the gateway routers are also referred to in the embodiments below as route reflectors. There are four hubs, H1 120, H2 122, H3 124, and H4 126, assigned to each region that are linearly interconnected, as shown. The hubs act as transit points for regional interconnectivity.

In the topology 100, hubs from every region connect to minimally two gateways from two different regions such that the hubs can provide details of branches to gateways that do have direct connections to the branches. For example, hub 120 is connected to gateways 110 and 112. By providing connection information of not-directly connected branches to gateways, in some embodiments, gateways can request the transit hubs to share prefixes of not-directly-connected branches to build a view of the complete network. For instance, hub H1 120 can notify gateway G2 112 about spokes S1 130. Gateway G2 112 in turn can ask hub H1 120 to send prefixes of spokes S1 130 that can be relayed to the other side of the network that includes hubs H2 122, H3 124, etc.

When two hubs are interconnected, in some embodiments, one hub is a spoke to the other hub, and spokes of any interconnected hub are able to reach any hub and a spoke of any hub of the interconnect. In some embodiments, when two clusters are associated to each other through a tunnel (e.g., a VCMP tunnel), every node from each of the two clusters is connected to at least one node in the other cluster by a tunnel (e.g., a VCMP tunnel) forming either hub/spoke relation with the other. In some such embodiments, spokes of any hub in a hub cluster should be able to reach any hub in any cluster and the spoke of all the clusters. A stand-alone hub of some embodiments is associated with a cluster as its hub. In some embodiments, the cluster in turn is also associated with the standalone hub as its hub. One of the cluster members will be a spoke to the standalone hub while other members are in hub relation, according to some embodiments. In some such embodiments, spokes of any hub in a hub cluster are able to reach the standalone hub and its spokes and vice-versa.

In some embodiments, convergence and scale needs are addressed by making gateways the deciding authority for receiving routes of not-directly-connected nodes from the relevant transit points. By doing so, in some embodiments, load is distributed among transit points that own the updates of not-directly-connected nodes, scale is addressed by avoiding redundant updates from multiple transit points, convergence time is reduced by reducing the number of nodes sending redundant updates, and memory requirement for routes on gateways is reduced by maintaining only one copy of routes associated with any node. Additionally, in some embodiments, there is a behavior change of route updates to gateways from clusters for scale and convergence, as will be further described below.

This design, along with the behavioral change to clusters, brings down the number of routes per enterprise to 1× on gateways (i.e., as opposed to N× in legacy designs, where N is the number of members in a cluster), according to some embodiments. Other benefits, in some embodiments, include a reduction in redundant routes that leads to increases in scale and improvements in convergence time, limitless VCRP (VeloCloud Routing Protocol) multi-hop, relaxed dependency on common gateways, spokes that are agnostic of multi-hop design and implementation, route scale that is linearly-defined by the number of routes in the network, linear route convergence that is defined by the number of edges in the network, and debugging and route visibility aided by the full view of the network by gateways (e.g., on gateways, any prefix can be queried and return end-to-end path information). In some embodiments, an additional benefit is that features such as DE2E (dynamic edge-to-edge), profile isolation, route summarization with second order nexthop fallback, and business policies across regions, are able to work without impact.

Figure 2:
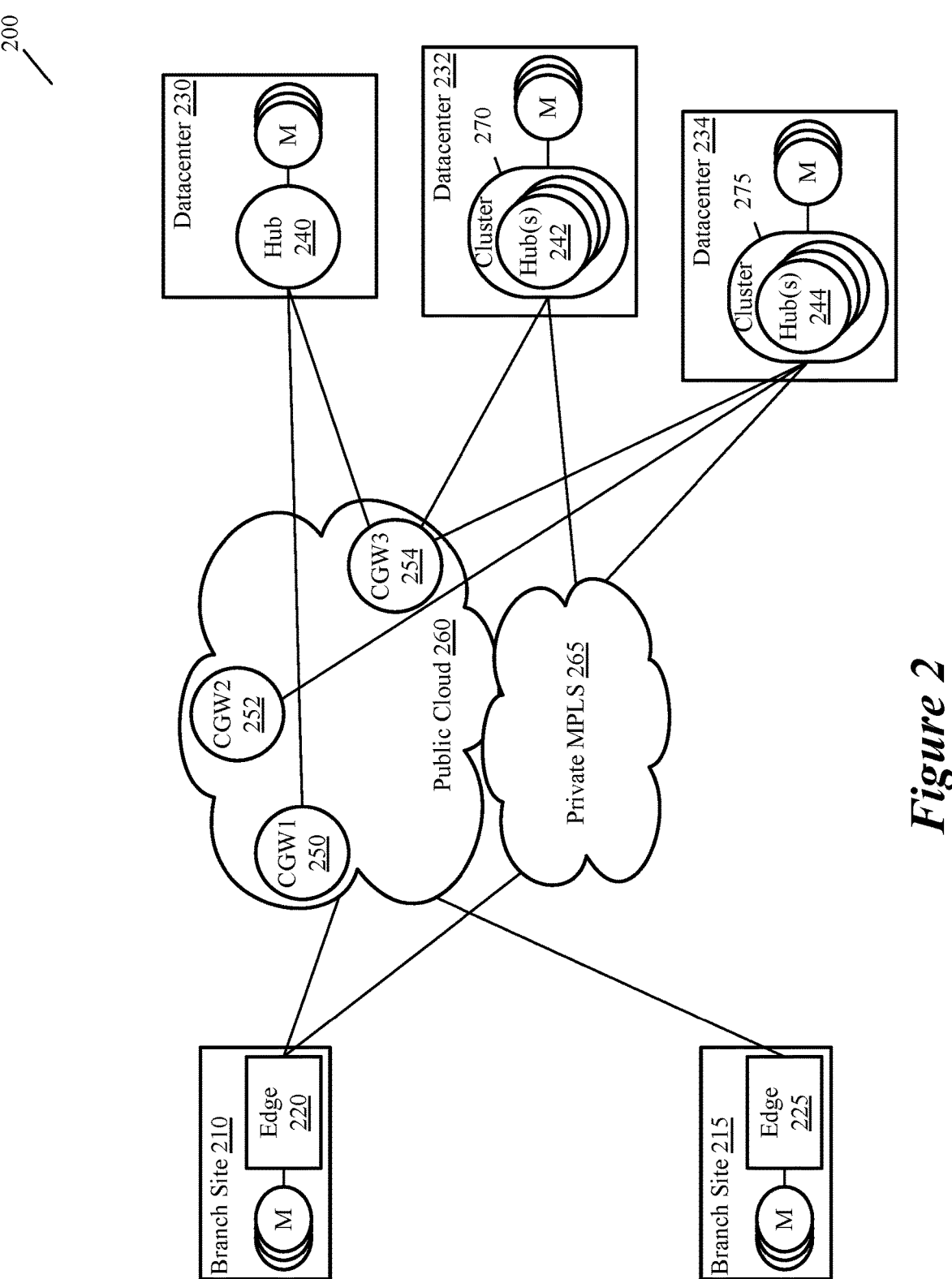
FIG. 2 conceptually illustrates a network of some embodiments that connects multiple sites to each other through both public and private connections.

FIG. 2 conceptually illustrates a network 200 of some embodiments that connects multiple sites to each other through both public and private connections. The network 200 is implemented by edge routers 220 and 225; cloud gateway routers 250, 252, and 254; hub router 240; and hub router clusters 270 and 275. The edge routers 220 and 225 are located at branch sites 210 and 215, respectively, to connect devices (e.g., machines, user devices, etc.) at the branch sites to the network 200. Branch site 210 is located in a first region, while branch site 215 is located in a second region. While not shown, the network 200 also includes a network management and control system for configuring spoke and hub profiles to set up a multi-hop hierarchy and full mesh topology, according to some embodiments.

The hub router 240 is located at a datacenter 230 and acts as both a transit point for the network 200 (e.g., as a next-hop between a source and destination external to the datacenter 230), and provides access to resources of the datacenter 230. Cluster 270, made up of hub routers 242, and cluster 275, made up of hub routers 244, are located in respective datacenters 232 and 234. The clusters 270 and 275 also act as transit points for the network 200, and provide access to resources of their respective datacenters 232 and 234. The hub router 240 in this example is a hub router for the first region, while the cluster 275 is a cluster for the second region.

The cloud gateway routers 250-254 are located in a public cloud 260 and, in some embodiments, act as route reflectors for the network 200. That is, each of the cloud gateway routers 250-254 receive reachability messages from peers and propagate these reachability messages to other peers. For example, cloud gateway router 250 sends requests to hub router 240 for routes of the edge router 225 (i.e., edge router in the first region), receives routes of edge router 225 from hub router 240, and redistributes the routes of edge router 225 to the edge router 220. Cloud gateway router 252 sends requests to cluster 275 for routes of edge router 220, receives the routes of edge router 220 from cluster 275, and redistributes the routes of edge router 220 to edge router 225. Lastly, cloud gateway router 254 requests routes of edge router 220 from hub router 240 and readvertises these routes, and also requests routes of edge router 225 from cluster 275 and readvertises these routes.

Each of the hub router 240 and clusters 270 and 275 also receive reachability messages from peers and propagate these reachability messages to other peers. The hub router 240 located in the datacenter 230 sends routes of edge router 220 to cloud gateway router 254. Cluster 270 located in the datacenter 232 receives routes of both edge routers 220 and 225 from cloud gateway router 254. Cluster 275 located in the datacenter 234 sends routes of edge router 225 to cloud gateway router 254.

When the edge router 220 located at branch site 210 receives peer reachability messages, reachability for remote branches is marked as true. Edge router 220 receives edge router 225 from cloud gateway router 250. When the edge router 225 located at branch site 215 receives peer reachability messages, reachability for remote branches is marked as true. Edge router 225 receives edge router 220 routes from cloud gateway router 252.

In some embodiments, as also described above, a topology can include common gateways and/or disjoint gateways. For instance, in some embodiments, a particular gateway is a common gateway with respect to a set of hub routers, and a disjoint gateway with respect to a set of edge routers located at different sites across different regions. Transit points, such as clusters or hubs, exist for interconnecting regions of enterprises, in some embodiments. The transit points of some embodiments are responsible for proactively notifying gateways of connected nodes. Examples of connected nodes, in some embodiments, include branches (i.e., edge routers at branch sites), hubs (i.e., hub routers located at datacenter sites), and clusters (e.g., clusters of hub routers located at datacenter sites).

As mentioned above, in some embodiments, peer-conn messages are used to notify gateways of connected nodes. These peer-conn messages, in some embodiments, include information such as node identifier (i.e., the logical identifier of a node), node name (e.g., for debuggability), a metric that starts with 1 for directly connected nodes and is incremented by relaying nodes (i.e., Min=1; Max=64), flags, and endpoint information.

The metrics added to the peer-conn messages of some embodiments are used in routes ordering. For instance, routes are inserted pointing to next hops/transits in the metric order (i.e., low to high). The flags, in some embodiments, include direct connection flags that indicate that the node has a direct overlay with the announcing transit point, relayed connection flags that indicate that the node is connected to a different transit point and reachable via the announcing transit point, and cluster direct flags which indicate whether the node is directly connected to cluster members. In some embodiments, the endpoint information includes number of public and private links, public link addresses, and private link addresses.

Control message prefixes used, in some embodiments, are special prefixes to propagate segment-specific configurations. The network address used for the control message prefixes, in some embodiments, is 255.255.255.255/255.255.255.255. In some embodiments, the control message prefixes include attributes, such as a node's logical identifier, segment identifier, and feature flags that indicate features that are turned on for a node, such as VPN, edge-to-datacenter, edge-to-edge, profile isolation, and direct edge-to-edge.

In some embodiments, a precedence of peer-conn messages is followed. When a first peer-conn message indicates a node has a direct overlay with the announcing transit point and a second peer-conn message indicates a node is connected to a different transit point but reachable via the announcing transit point, the directly connected node is given precedence. When two peer-conn messages both indicate their respective node has a direct overlay with the announcing transit point, in some embodiments, they are sorted by metric such that the lower metric is given precedence. However, in embodiments where the metric for both peer-conn messages is the same, they are sorted by arrival order. The same precedential rationale is followed when both peer-conn messages indicate their respective node is connected to a different transit point but reachable via the announcing transit point (i.e., sort by metric, or arrival order when the metrics are the same).

A transit point, in some embodiments, can receive a peer-reachability message for a node from multiple sources that the transit point is connected to. In some embodiments, a source-of-reachability (SoR) node is a node from which a transit point learns first about a node's reachability in the network. In order to designate a transit as an SoR transit, certain rules are followed, in some embodiments. The first rule, in some embodiments, is that the transit that sends a peer-reachability message for a node and has the lowest metric becomes the SoR transit for the node. When there are multiple transits announcing the same metric, the SoR transit of some embodiments is chosen in the order of arrival.

The second rule, in some embodiments, is that a reachability notification can be of two forms including direct or relayed. Since direct reachability takes precedence over relayed reachability, as described above, a transit point sending direct reachability for a node can become the SoR for the node by replacing the other transit that sent relayed reachability, according to some embodiments. For example, FIG. 3 conceptually illustrates a topology 300 of some embodiments. As shown, the topology 300 includes a node S0 310, and transit points H1 320, H2 322, H3 324, and H4 326.

The transit point H1 320 is connected to H2 322 and H3 324, while S0 310 is directly connected to H3 324, but only connected to H2 322 via additional SD-WAN hops (e.g., H4 326). When H2 322 first sends a relayed reachability for node S0 310 with metric 2, H2 322 becomes the SoR for node S0 310. After some time, when H3 324 sends a direct reachability notification to H1 320 with metric 1, then H3 324 will become the SoR for node S0 310.

In some embodiments, the third rule is that transit nodes announce reachability (direct or relayed) of nodes to other directly connected transit points and nodes. The fourth rule of some embodiments is that transit nodes do not send reachability notifications to any node that is designated as SoR for the same node. For example, in the topology 300, when H1 320 learns about S0 310 from H3 324, which has direct reachability to S0 310, H3 324 becomes the SoR node for S0 310. H1 320 will also learn about S0 310 from H2 322, which has relayed reachability. However, based on this fourth rule, H1 320 does not relay that reachability to H3 324 as H3 324 is the SoR for S0 310 in H1 320. Similarly, for H2 322, H4 326 is the SoR for S0 310. As such, H2 322 will learn about S0 310 from H1 320 as well due to H1's relayed reachability. However, H2 322 again does not relay the reachability to H4 326.

The fifth rule of some embodiments is that transit nodes will send reachability down (i.e., pull reachability) for a node when its SoR sends down for the corresponding node. For example, in the topology 300, when H3 324 sends down a notification for S0 310 to H1 320, H1 320 will send down for S0 310 towards H2 322.

In some embodiments, transit nodes have two lists per node to maintain sources of reachability. These lists, in some embodiments, include a direct list and a relayed list. The direct list, in some embodiments, includes a list of transit points announcing direct reachability of a node. The relayed list includes a list of transit points announcing relayed reachability of a node, according to some embodiments.

The entries of each list, in some embodiments, are inserted in a sorted metric order. In some embodiments, a tail insertion method is applied for transits with identical metrics, thereby keeping the list of announcers in the incoming order. Selection of SoR of some embodiments goes by the direct list first, ordered by metric, and then the relayed list, also ordered by metric. When both lists are empty, in some embodiments, whoever announces reachability (direct or relayed) for a node becomes the SoR for the node. In some embodiments, when an SoR in the direct list withdraws reachability of a node, then the next available source in the direct list becomes the designated SoR. In some such embodiments, reachability for the node is withdrawn from the newly elected direct SoR, and then, reachability for the node is announced to the going-away-SoR node.

In some embodiments, when there are no nodes in the direct list, transit nodes employ a 30 second stabilization timer before electing an SoR from the relayed list. The 30 seconds delay is needed for the network to remove dead nodes from the network, according to some embodiments. Once the timer is elapsed, in some embodiments, the first available node from the related list is designated as the SoR for the node. Other directly connected transit nodes are notified about the node's reachability, in some embodiments.

Routes of some embodiments are inserted pointing to next hops/transits in the metric order from low to high. For transits with the same metric, in some embodiments, routes are inserted based on VPN (virtual private network) order of directly connected nodes. In some embodiments, if the node is a pure responder (e.g., only with cloud VPN enabled), then routes prefer SoR transits metric order and arrival order when transits have same metric.

Figure 4:
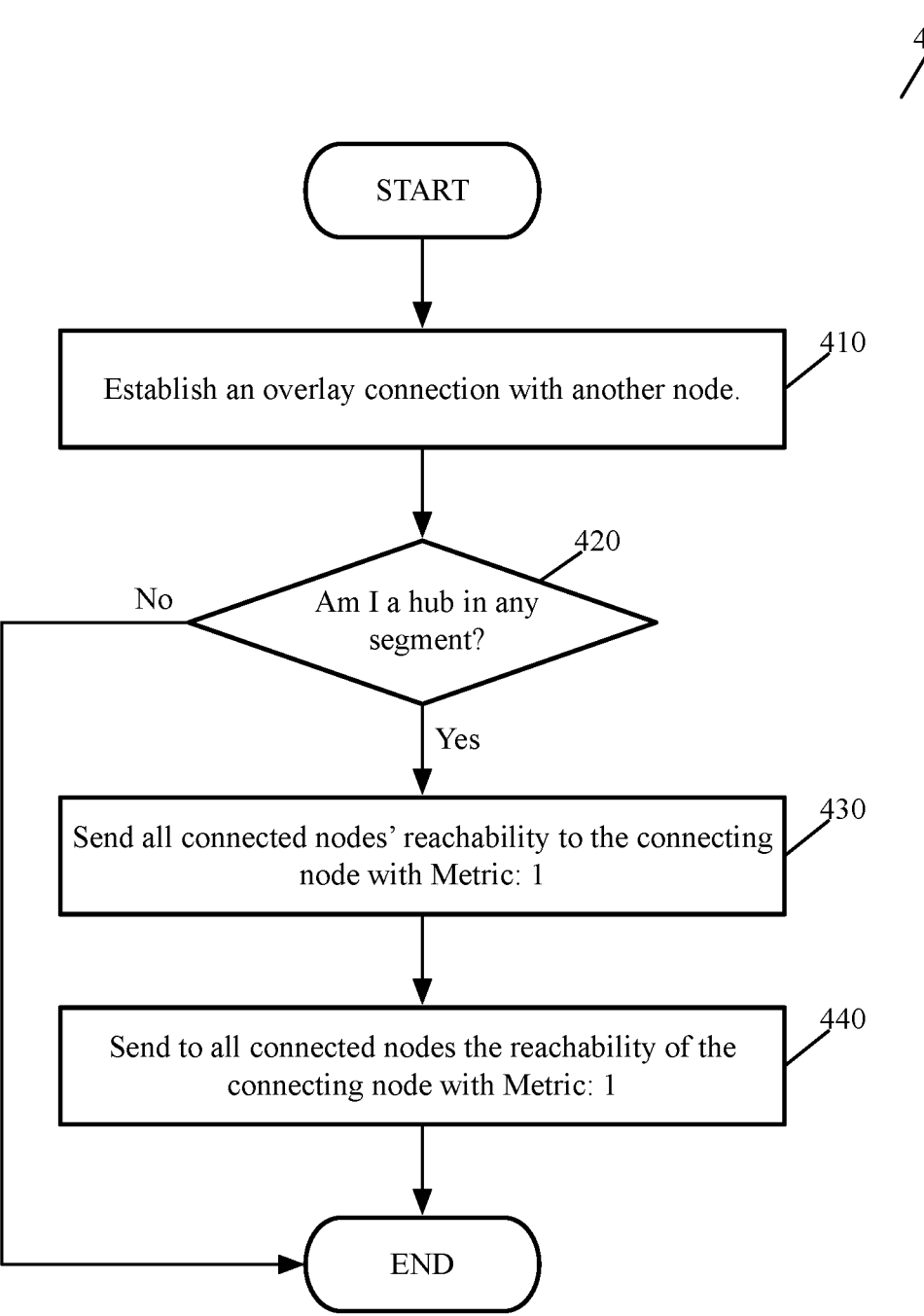
FIG. 4 conceptually illustrates a process performed in some embodiments for peer-conn initiation between directly connected nodes in a network.

FIG. 4 conceptually illustrates a process 400 performed in some embodiments for peer-conn initiation between directly connected nodes in a network. The process 400 will be described below with references to FIG. 1. The process 400 is performed, in some embodiments, by an edge router at a branch site, a hub router, or a cluster member (e.g., a hub router belonging to the cluster). The process 400 starts by determining (at 410) that an overlay connection (e.g., an overlay network tunnel) has been established with another node.

The other node, in some embodiments, can also be an edge router at a branch site, a hub router, or a cluster member (e.g., a hub router belonging to a cluster). For example, in the topology 100, each of the spokes S1 130, S2 132, S3 134, and S4 136 have a connection established with a respective hub router H1 120, H2, 122, H3 124, and H4 126. Additionally hub router H2 122 has connections established with both hub routers H1 120 and H3 124, and hub router H3 124 also has a connection established with hub router H4 126.

The process 400 determines (at 420) whether it is a hub in a segment. That is, the node that performs the process 400 determines whether it is a hub router in a segment. When the process 400 determines that it is not a hub in a segment, the process 400 ends. Otherwise, when it is a hub a segment, the process 400 transitions to send (at 430) all connected nodes' reachability to the connecting node with a metric of 1.

For example, in the topology 100, after determining that the spoke S1 130 has established a connection with hub router H1 120, and hub router H1 120 determines that it is a hub in a segment, the hub router H1 120 sends reachability information for hub router H2 122 in the form of a peer-conn message to the spoke S1 130, according to some embodiments. The metric 1 indicates to the spoke S1 130 that the hub router H1 120 is directly connected to the hub router H2 122 (i.e., one hop away).

The process 400 then sends (at 440) the reachability of the connecting node to all other connected nodes with the metric 1. The hub router H1 120 in the topology 100, for instance, would send the reachability of spoke S1 130 to the gateway routers 110 and 112, and to the hub router H2 122. Like the reachability information sent in step 430, the reachability information is sent using peer-conn messages. Each peer-conn message, in some embodiments, specifies attributes associated with the node to which the reachability information is associated.

Examples of the attributes included in peer-conn messages, in some embodiments, include a logical identifier of the node, a node identifier of the node, and the metric that indicates the number of hops between the node identified in the peer-conn message and the node sending the peer conn message. For instance, a metric of 1 indicates a direct connection between the node performing the process 400 and the newly connected node. In some embodiments, each peer-conn message includes either a direct flag also indicating a direct connection, or a relay flag indicating a relayed connection. In some embodiments, if the node performing the process 400 also belongs to a cluster, the peer-conn notification would also include a cluster direct flag. The nodes that receive the peer-conn notification sent at 440, in some embodiments, use the peer-conn notification to update their own SoR tables, determine whether to request routes of the node identified in the peer-conn notification, and relay the peer-conn notification to directly connected nodes, as will be further described below. Following 440, the process 400 ends.

Figure 5:
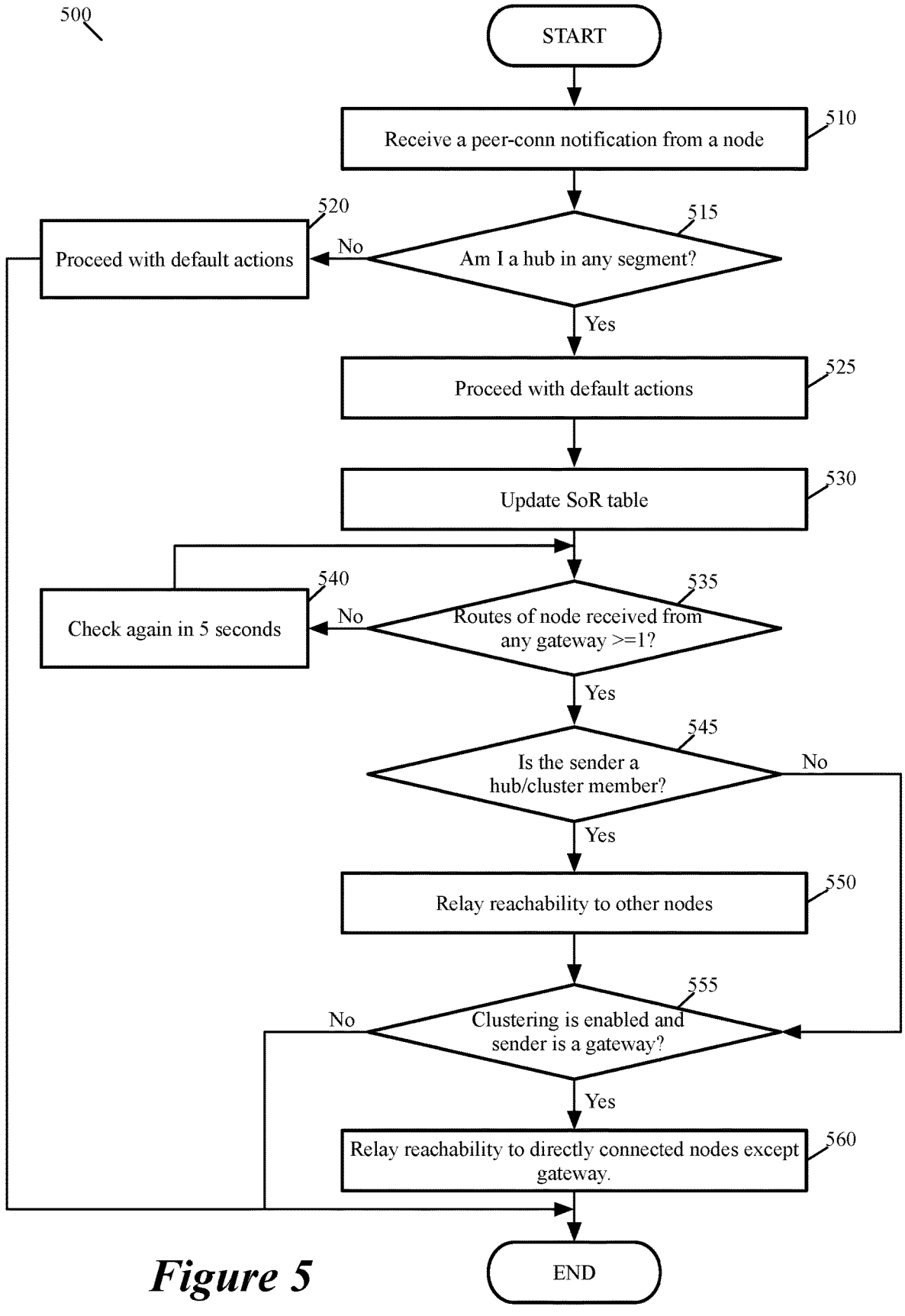
FIG. 5 conceptually illustrates a process performed in some embodiments for peer-conn reception at a node, such as an edge router of a branch site, a hub router, or a cluster member.

FIG. 5 conceptually illustrates a process performed in some embodiments at a node, such as an edge router of a branch site, a hub router, or a cluster member, when the node receives a peer-conn message. The process 500 will be described with references to FIG. 1. The process 500 starts by receiving (at 510) a peer-conn notification from a node. The node, in some embodiments, is any of a hub router, a gateway router, or a cluster member. For instance, the hub router H1 120 can receive a peer-conn message from any of the spoke S1 130, the gateway router G1 110, the gateway router G2 112, or the hub router H2 122.

The process 500 determines (at 515) whether the node performing the process 500 is a hub in any segment. When the node performing the process 500 is not a hub in any segment, the process 500 transitions to proceed (at 520) with default actions. The default actions, in some embodiments, include synchronizing routes using a multi-server routing software (e.g., Zebra) and updating an edge peer/PMTU (path maximum transmission unit). Following 520, the process 500 ends.

When the node performing the process 500 is a hub in a segment, the process 500 transitions to proceed (at 525) with the default actions and update (at 530) a source of reachability (SoR) table. The SoR table is a hash map maintained by transit routers (e.g., hub routers) and gateway routers, in some embodiments, and includes all discovered nodes and entries that include a list of transit nodes and their relevant details. When the hub router H2 122 receives a peer-conn message from the hub router H1 120 regarding the edge router S1 130, for example, the hub router H2 122 updates its SoR table to include the edge router S1 130, and includes the hub router H1 120 as a transit node for reaching the edge router S1 130.

Next, the process 500 determines (at 535) whether at least one route of the node identified by the peer-conn notification has been received from any gateway routers (e.g., router reflectors). For instance, in the topology 100, when the hub router H1 120 receives a peer-conn message from hub router H2 122 regarding edge router S2 132, the hub router H1 120 determines whether it has received routes (e.g., prefixes) of the edge router S2 132 from gateway router G1 110 and/or G2 112. When no routes of the node have been received from any gateway routers, the process 500 transitions to check again (at 540) in five (5) seconds. That is, the process 500 waits until routes of the node have been received before performing any additional steps, according to some embodiments.

When at least one route of the node has been received from at least one gateway router, the process 500 transitions to determine (at 545) whether the sender of the route is a cluster member. In some embodiments, hub routers relay routes to gateway routers that act as route reflectors for regions connected by the SD-WAN, and do not relay the routes to any other nodes to which they are connected (unless directed by a route reflector), whereas hub routers belonging to hub router clusters do share routes with other members of the same cluster, as will be described by embodiments further below.

When the sender is not a cluster member, the process 500 transitions to 555. When the sender is a cluster member (i.e., the routes received from a gateway router are received via a fellow cluster member), the process 500 transitions to relay (at 550) reachability of the node to other nodes in the cluster. As will also be described by embodiments further below, cluster members relay routes to other members of the same cluster on the underlay network using a community string. The community string indicates to other members of the cluster receiving the routes that the routes are not to be redistributed to the route reflectors (i.e., to avoid duplicate routes being sent to the route reflectors), according to some embodiments.

In some embodiments, each node that receives the peer-conn message uses the information in the peer-conn message to determine whether to request routes of the node specified in the peer-conn message. For instance, a first edge router at a first branch site in a first region of some embodiments that receives a peer-conn notification regarding a second edge router at a second branch site in a second region determines, in some embodiments, that the first edge router wants to establish a connection with the second edge router, and as such, sends a request to a route reflector to which the first edge routers is connected to request routes of the second edge router for use in establishing said connection.

The process 500 next determines (at 555) whether clustering is enabled and if the sender is a gateway router. When clustering is not enabled and the sender is not a gateway router, the process 500 ends. When clustering is enabled and the sender is a gateway router, the process 500 transitions to relay (at 560) reachability to directly connected nodes (i.e., nodes directly connected to the node performing the process 500) except for the sender gateway router (i.e., because the sender gateway router is already aware of the reachability based on the route(s) received from the sender gateway router). For example, when the node performing the process 500 is a hub router connected to multiple edge routers located at multiple sites in at least one region, the hub router relays the reachability to each of the multiple edge routers.

To relay the reachability, the node performing the process 500 sends a peer-conn notification that includes attributes such as the logical identifier of the node (i.e., the new node for which the peer-conn notification was received at 510), a node identifier of the node, and a metric of +1 (i.e., increment the metric from the received peer-conn notification by +1). Additionally, the peer-conn notification would leave the direct flag and the cluster direct flag unset. Following 560, the process 500 ends.

For peer-conn initiation at a route reflector (e.g., gateway router), the route reflector sends peer-conn messages to all other connected nodes when a node connects or disconnects. In the diagram 100, for instance, the gateway router G2 112 sends peer-conn messages to hub routers H1 120 and H2 122, and to edge router S2 132 when any of the nodes in the diagram 100 connects or disconnects.

Figure 6:
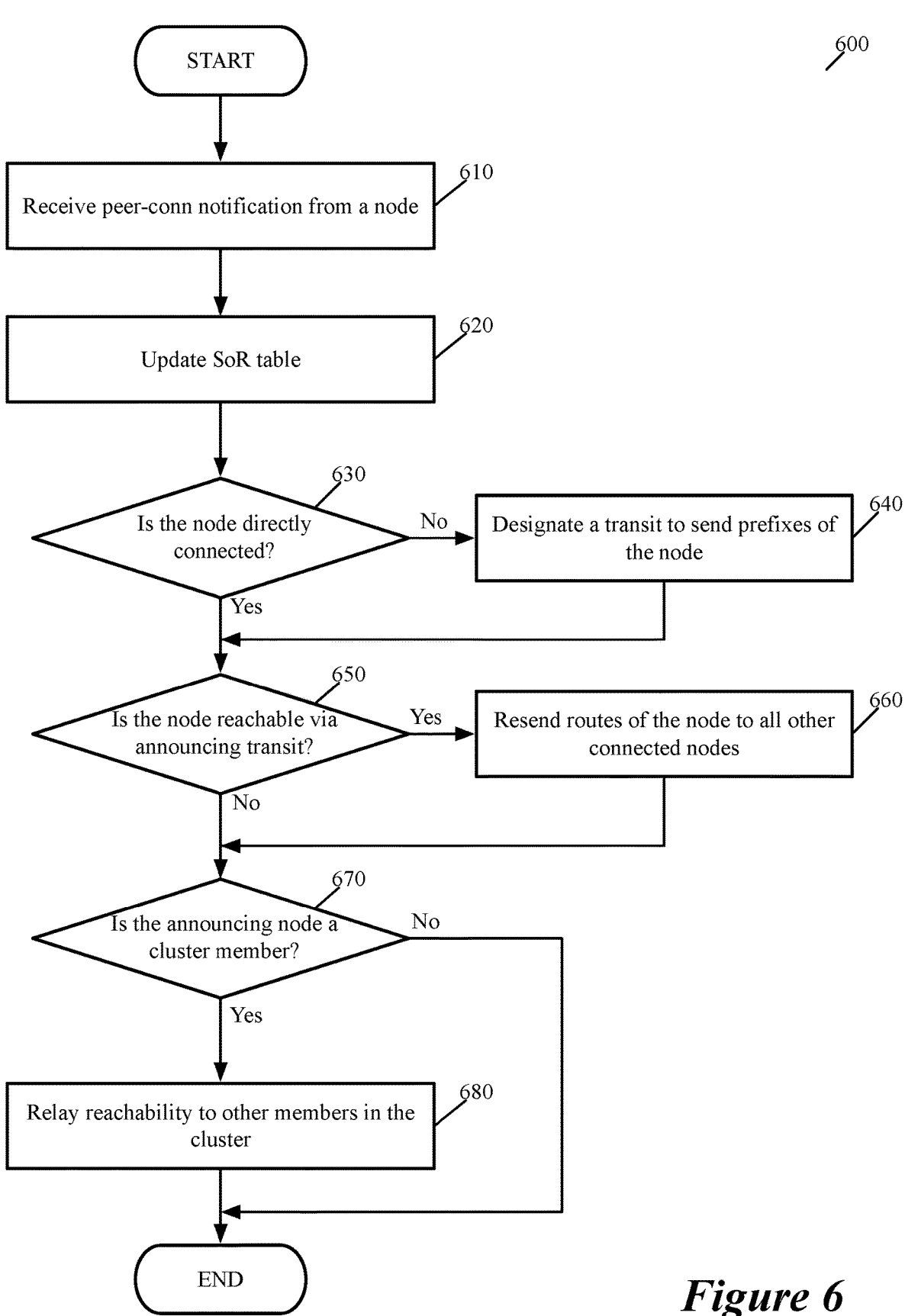
FIG. 6 conceptually illustrates a process performed in some embodiments for peer-conn reception at a gateway router that acts as a route reflector.

FIG. 6 conceptually illustrates a process performed in some embodiments for peer-conn reception at a route reflector (e.g., gateway router). The process 600 will be described with references to FIG. 1. The process 600 starts when the gateway router receives (at 610) a peer-conn notification from a node. The node, in some embodiments, is either an individual hub router or a hub router that is a member of a cluster. For instance, the gateway router G2 112 receives peer-conn notifications from hub router H1 120 and hub router H2 122.

The process 600 updates (at 620) an SoR table maintained by the gateway router. In some embodiments, the update involves generating a new entry in the SoR table for a node specified in the peer-conn notification, with the announcing node (i.e., the node from which the peer-conn notification was received) as a next-hop for reaching the specified node. Also, in some embodiments, the update involves adding the announcing node as an SoR for the specified node when one or more other peer-conn notifications for the specified node have already been received from one or more other announcing nodes. Additional details regarding SoRs and SoR tables will be described further below.

The process 600 determines (at 630) whether the node specified by the peer-conn notification is directly connected to the gateway router. For example, the spoke S2 132 is directly connected to the gateway router G2 112, whereas none of the spokes S1 130, S3 134, or S4 136 are directly connected to the gateway router G2 112. When the specified node is not directly connected, the process 600 transitions to designate (at 640) a transit node to send prefixes to the specified node. In the topology 100, for instance, when the specified node is the spoke S3 134, the gateway router G2 112 may designate hub router H2 122 as the transit point for sending prefixes of spoke S3 134 to the gateway router G2 112. Following 640, the process 600 then transitions to 650.

When the node is directly connected to the gateway router, the process transitions to determine (at 650) whether the specified node is reachable via the announcing transit point. For example, in the topology 100, if the specified node is spoke S2 132 that is directly connected to gateway router G2 112, the gateway router G2 112 would determine that spoke S2 132 is both directly connected to the gateway router G2 112 and reachable via announcing transit hub router H2 122. As another example, if the specified node is spoke S3 134 that is not directly connected to gateway router G2 112, the gateway router G2 112 would determine whether spoke S3 134 is reachable via announcing hub router H2 122.

When the specified node is reachable via the announcing transit point, the process 600 transitions to resend (at 660) all routes of the specified node to all other connected nodes. The gateway router G2 112, for example, would resend routes of spoke S3 134 to all connected nodes, such as hub router H1

120, hub router H2 122, and spoke S2 132, with hub router H2 122 as the next hop. Following 660, the process transitions to 670.

When the specified node is not reachable via the announcing transit, the process transitions to determine (at 670) whether the announcing node is a cluster member. When the announcing node is not a cluster member, the process 600 ends. When the announcing node is a cluster member, the process 600 transitions to relay (at 680) reachability of the specified node to other members in the cluster. Following 680, the process 600 ends.

In some embodiments, gateways can request transit points to send prefixes of nodes that are not directly connected with the gateways, as mentioned above. Before making the request, the route reflectors of some embodiments determine whether they have already received routes of the specified node. In some embodiments, each route reflector makes this determination by performing a lookup in a routing table stored and maintained by the route reflector to determine whether the routing table includes routes of the specified node. Each routing table (or RIB (routing information base)), in some embodiments, further includes a set of rules that specify where to direct packets traversing the network (e.g., SD-WAN), as well as information regarding the network's topology.

Each route in the routing table of some embodiments specifies a next hop, referring to the next closest router through which a packet can traverse. In some embodiments, the next hop is the only hop between a source and destination of a packet, while in other embodiments, the next hop is one of multiple hops between the source and destination. The next hops are calculated according to a routing protocol used and its associated metric, according to some embodiments. Each router (e.g., each gateway router, hub router, and edge router) in the network maintains its own routing table for use in routing packets through the SD-WAN.

In some embodiments, policy-based routing (PBR) is used to route certain packets to their destinations via specific next hops, thereby allowing users (e.g., network administrators) to control (i.e., through policies) which packets flow through which paths in the network (e.g., SD-WAN). For instance, with PBR, users can define policies to route packets based on one or more tuples associated with the packet (e.g., source IP address, destination IP address, source port, destination port, protocol), packet size, and/or other data available in the packet's header and/or payload.

In other embodiments, next hop routing that is not policy based is used for routing packets through the network. Next hop routing that is not policy based utilizes at least destination IP address and destination port of a packet to identify the next hop interface of a router from which the packet should be sent out, according to some embodiments. For instance, a router sends a first set of packets destined for a first destination IP address and port through a first next-hop interface of the router, and sends a second set of packets destined for a second destination IP address and port through a second next-hop interface of the router.

When the route reflector of some embodiments determines that it has not yet received any routes of the node specified in one or more peer-conn messages, the route reflector sends a route request for routes of the specified node. In some embodiments, the route reflectors request routes from the transit points using RMSG. RMSG includes attributes such as node identifier for which the routes are requested, segment identifier, and op_type (i.e., START for enabling route subscription, STOP for disabling route subscription).

Since there can be multiple transit points, route reflectors of some embodiments can distribute route requests, thereby designating transit points to send routes of certain nodes including updates to routes (i.e., prefixes). For instance, if a group of 500 spokes, spokes S1 through spokes S500, are reachable via four transit points, T1 through T4, then the route reflectors can request T1 to send prefixes of S1 through S125, T2 to send prefixes of S126 to S250, T3 to send prefixes of S251 to S375, and T4 to send prefixes of S376 to S500. In some embodiments, when a designated transit point loses connectivity to the route reflectors, then a different transit point is chosen to own the updates of the nodes for which the disconnected transit point was previously responsible.

In some embodiments, gateways (i.e., route reflectors) select two transit points (e.g., a designated transit point and a backup designated transit point) from the SoR table per indirectly connected node for redundancy. Routes are pulled from both the designated and backup designated transit points, in some embodiments. When the designated transit point loses connectivity to gateways, then the backup designated transit point is chosen, in some embodiments, to own the updates of the nodes for faster convergence. After receiving the routes, the route reflectors update their routing tables with the received routes.

Each transit point of some embodiments maintains a DSTID (destination identifier) hash table with a key (node ID, segment ID). In some embodiments, every entry of the DSTID hash table has a list of subscribers. Upon receiving a request, in some embodiments, a transit point looks up the DSTID hash table and the requesting gateway is added to the list of subscribers. If this is the first subscriber for the key (node ID, segment ID), in some embodiments, then a FIB (forwarding information base), or forwarding table, is iterated and all the routes matching the node ID as the DST ID from the FIB are added to the rdlist.

In some embodiments, if other subscribers are already present for the key (node ID, segment ID), then the rdlist rewind is done for this subscriber to resend all the routes. In some embodiments, a decision is made to forward the route to the subscriber if it is found in the subscribers list of the DSTID hash table. Any subsequent route ADD/DEL/UP-DATE for the DST ID will be updated in the rdlist and pushed to the subscribers, according to some embodiments.

When transit points receive FLUSH_FOR_DSTID for the DST ID, in some embodiments, the transit points propagate this to all of the subscribers for faster convergence. In some embodiments, when a gateway (i.e., a subscribing gateway) receives FLUSH_FOR_DSTID from transit points, the gateway iterates the FIB and deletes routes matching the DST ID. When a transit point receives the subscription STOP from the last subscriber for DSTID, in some embodiments, the transit point iterates through the FIB and removes the routes from rdlist.

Each gateway, in some embodiments, maintains a network reachability matrix of all nodes in the enterprise network. In some embodiments, upon receiving a peer-conn notification message, the gateways update their network reachability networks. The gateways use the network reachability matrices to request prefixes of nodes that are not directly connected to the gateways from the transit node(s) that are aware of the not-directly-connected nodes, according to some embodiments. The logic given, in some embodiments, is directional and not indicative of low-level implementation.

FIG. 7 illustrates a sample network reachability matrix 700 of some embodiments. Column 1 indicates the receiver of updates when the logic starts. The starting point in this example is row 1, column 1. Walking through the corresponding columns of each row, positive values indicate reachability. A value of 1 indicates reachability via the node labelled in the column and the node is directly connected to the gateway. A value of 10 indicates reachability via some other directly connected node, but the node is not directly connected to the gateway.

To find a transit point through which a node with value 10 can be reached, identify the column with a value 10 is identified along with the column label and the row matching the column label to determine if the node pertaining to the row is directly connected such that the row and column of the same label (e.g., S1) has a value of 1. Next, prefixes of nodes with a value 1 are sent, and for nodes with a value 10, transit points of the nodes are found and the prefixes of the nodes with the value 10 are sent with the transit points as next-hop if the receiver is directly connected to the transit point.

The network reachability matrix 700 is implemented and represented by an SoR table, in some embodiments. The presence of a transit node for a spoke node, in some embodiments, is the equivalent of having a positive value in the represented matrix indicating reachability. In some embodiments, each SoR table is a hash map of all discovered nodes with its entries including a list of transit nodes and their relevant details.

FIG. 8 illustrates an example 800 of the code for SoR table entries in some embodiments. As shown, the code in the example 800 includes a list of direct transits, a list of relayed transits, and a hashmap of transits at 810. Additionally, the example code 800 includes multiple attributes 805 (e.g., routes check scheduled, metric, time of arrival), and an indication 815 of whether the edge or gateway is directly connected to the identified node.

Figure 9:
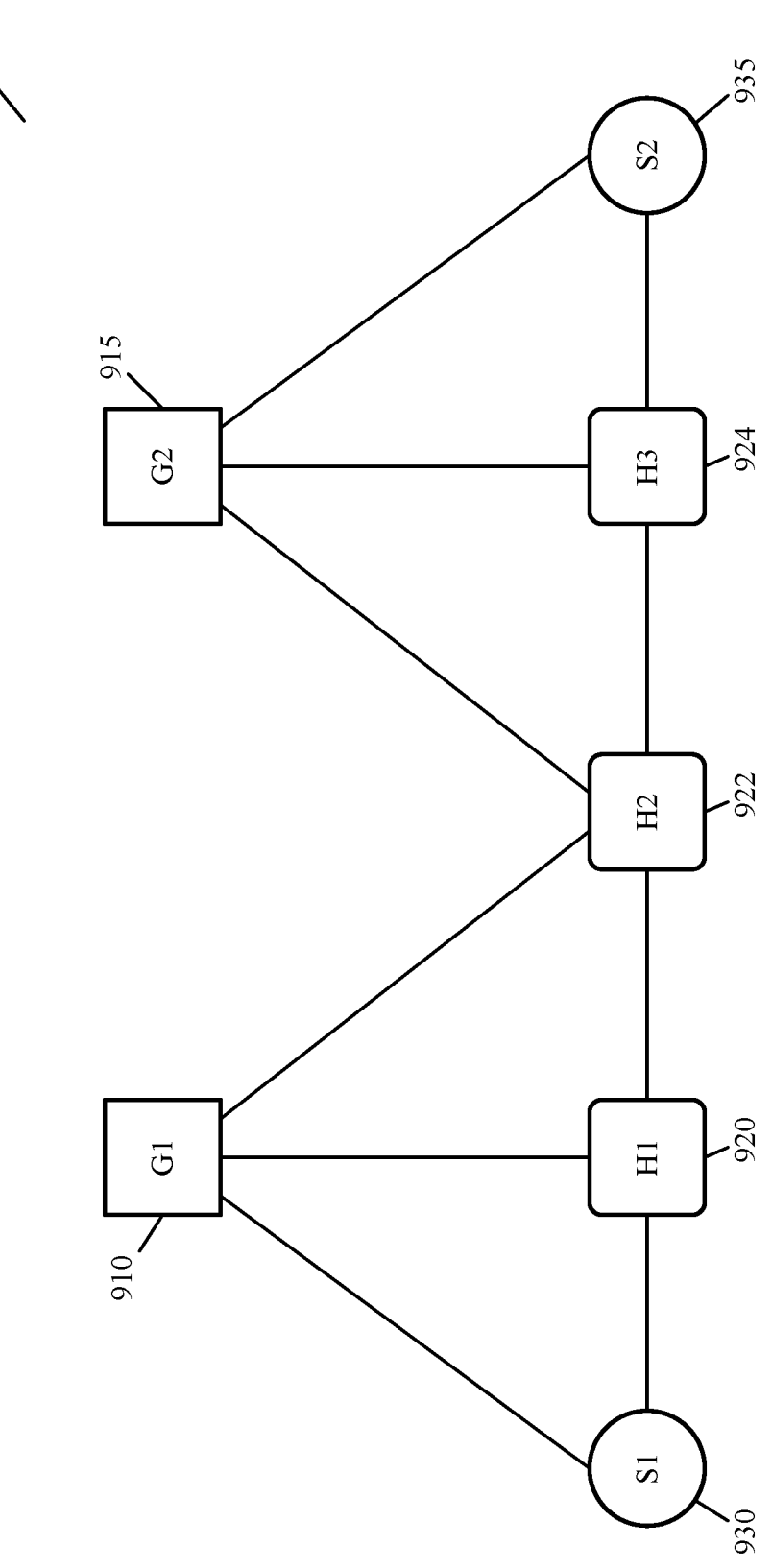
FIG. 9 conceptually illustrates another example of a topology of some embodiments.
Figure 10:
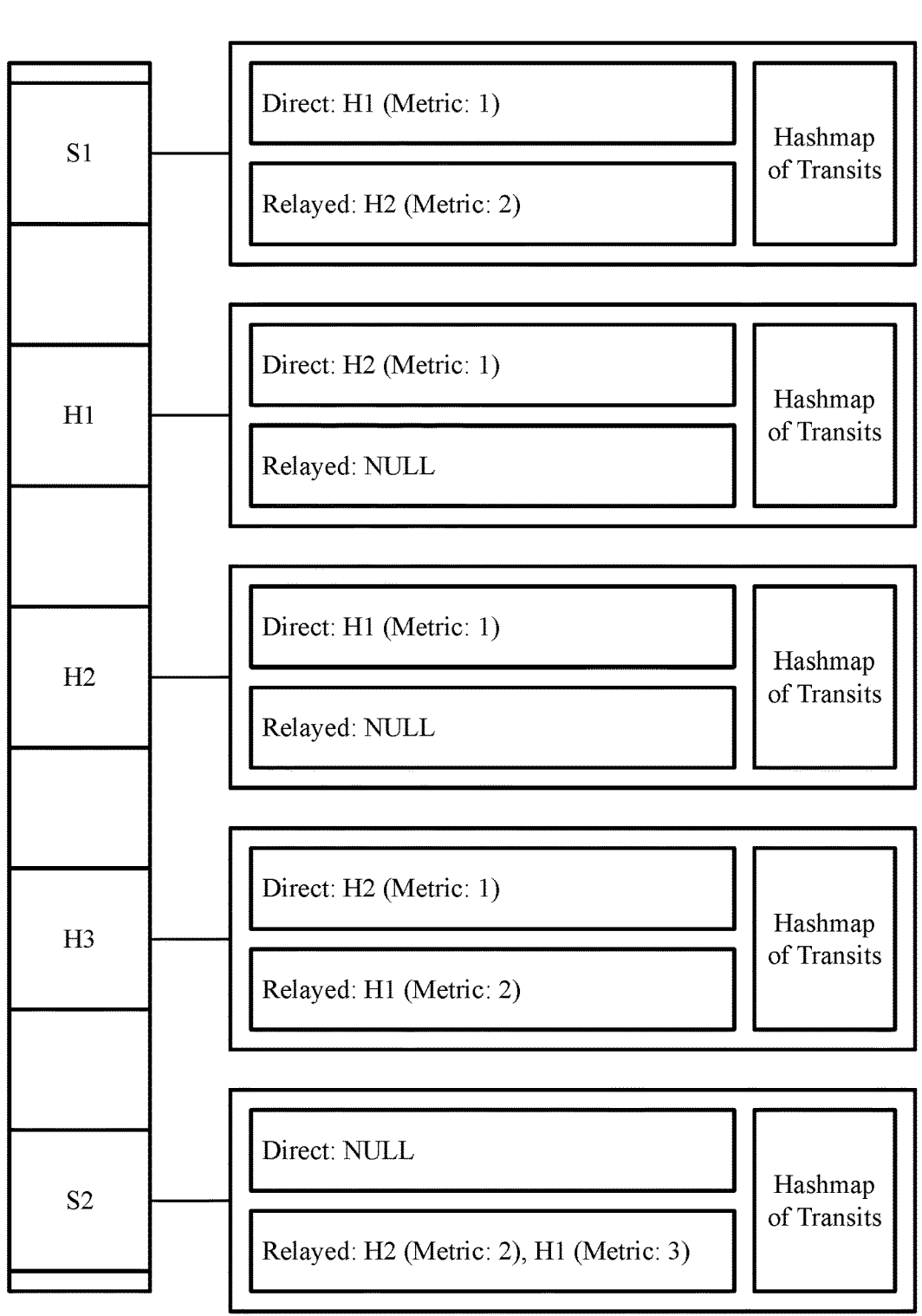
FIG. 10 conceptually illustrates an SoR table of some embodiments for the topology illustrated by FIG. 9.

FIG. 9 conceptually illustrates an example of a topology 900 of some embodiments, and FIG. 10 conceptually illustrates an SoR table 1000 of some embodiments for the topology 900. As shown, the topology 900 includes spokes S1 930 and S2 935, gateway routers G1 910 and G2 915, and hub routers H1 920, H2 922, and H3 924. The gateway router G1 910 is directly connected to the spoke S1 930 and to hub routers H1 920 and H2 922. The gateway router G2 915 is directly connected to the spoke S2 935 and to hub routers H2 922 and H3 924. Hub router H1 920 is also connected to spoke S1 930 and hub router H2 922, while hub router H3 924 is also connected to spoke S2 935 and hub router H2 922. As such, hub router H2 922 is directly connected to each gateway router G1 910 and G2 915, as well as each hub router H1 920 and H3 924, but is not directly connected to any of the spokes S1 930 or S1 935.

In some embodiments, gateway routers use the SoR table 1000 to determine whether to request routes of nodes that are not connected to them (i.e., not directly connected to the gateway routers). The gateway routers of some embodiments also use the table to determine whether to send routes. For instance, in the topology 900, the gateway router G1 910 is aware of hub router H3 924 and spoke S2 935 through its direct connection to hub router H2 922, and as such, gateway router G1 910 requests hub router H2 922 to send prefixes of hub router H3 924 and of spoke S2 935 to the gateway router G1 910.

To send prefixes of a node to other nodes, gateway routers of some embodiments employ the following logic. First, the gateway routers obtain the list of transit nodes of the receiver. The gateway routers then check if there is at least one common transit node between the receiver and route originator. If a common transit is found, then the gateway router sends prefixes of the route originator to the receiver.

For example, to send prefixes of spoke S2 935 to spoke S1 930, the gateway router G1 910 performs the following check. The gateway router G1 910 first fetches the list of transit nodes of spoke S1 930, which includes hub router H1 920 as a direct connection with metric of 1, and hub router H2 922 as a relayed connection with metric of 2, as illustrated in the Sor table 1000. The gateway router G1 910 then checks if hub router H1 920 and/or hub router H2 922 is in the transit node list of spoke S2 935. If any are found, the gateway router G1 910 sends the prefixes of spoke S2 935 to spoke S1 930. For example, the transit node list for spoke S2 935 in the SoR table 1000 does not include any direct connections, but includes hub router H2 via a relayed connection with a metric of 2 (i.e., two hops) and includes hub router H1 via a relayed connection with a metric of 3 (i.e., three hops).

Figure 11:
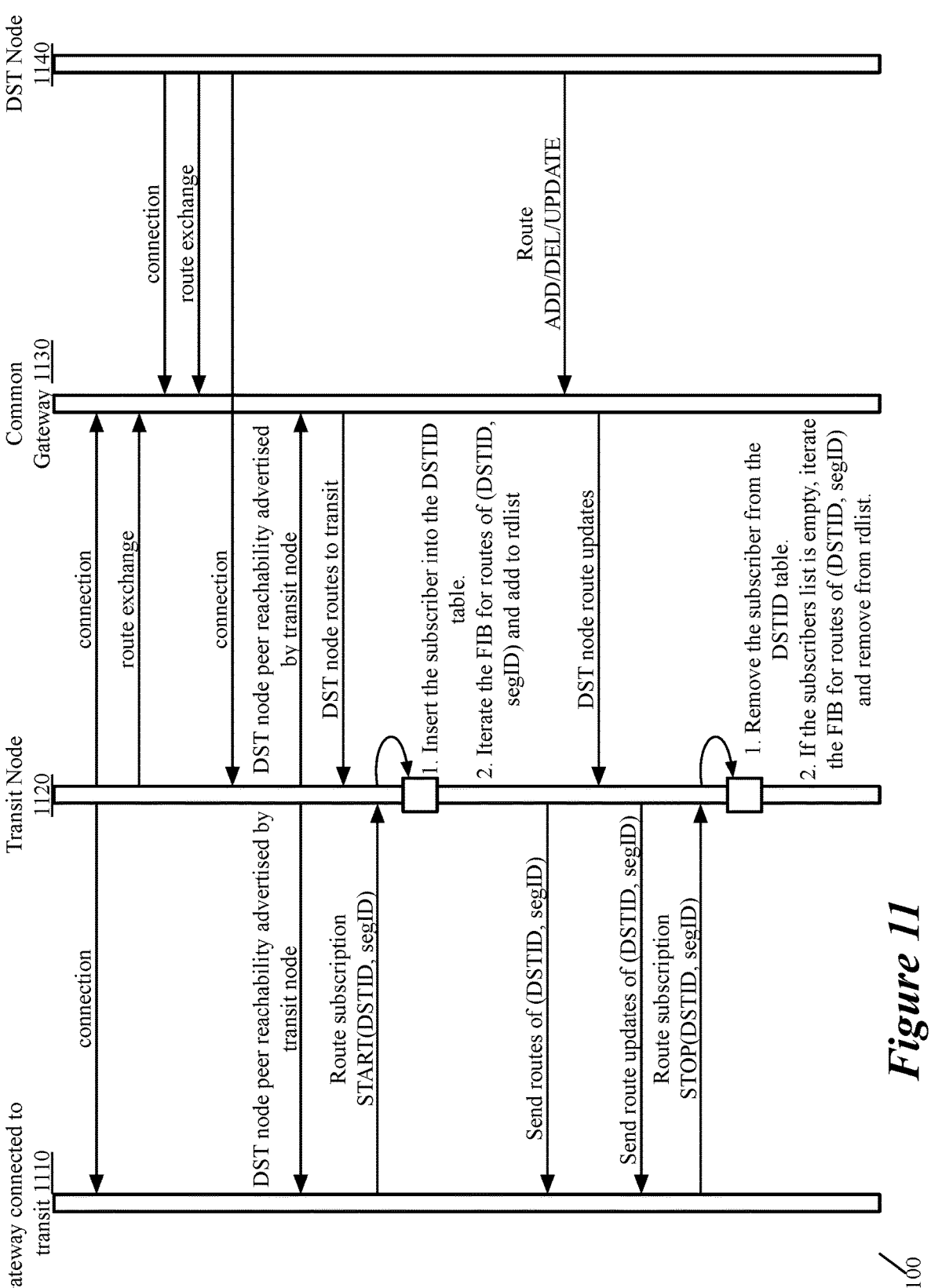
FIG. 11 conceptually illustrates a gateway prefix request workflow of some embodiments.

FIG. 11 conceptually illustrates a gateway prefix request workflow of some embodiments. As shown, the workflow 1100 is between a gateway router 1110 connected to a transit node, a transit node 1120, a common gateway router 1130, and a destination (DST) node 1140. Initially, the transit node 1120 establishes connections with the gateway router 1110 and the common gateway router 1130. The common gateway router 1130 then receives routes from the transit node 1120.

Next, the destination node 1140 establishes a connection to the common gateway router 1130 and provides its routes to the common gateway router 1130. The destination node 1140 also establishes a connection with the transit node 1120, as shown. The transit node 1120 advertises peer reachability for the destination node 1140 to both the gateway router 1110 and common gateway router 1130. In response, the common gateway router 1130 sends routes of the destination node 1140 that it previously received to the transit node 1120.

The gateway router 1110 sends a route subscription notification START with key (DSTID, segID) to the transit node 1120 in order to receive routes for the destination node 1140. The transit node 1120 then inserts the subscriber (i.e., gateway router 1110) into its DSTID table, and iterates its FIB for routes of the node corresponding to the key (DSTID, segID) and adds them to the rdlist. The transit node 1120 then sends routes of the destination node 1140 corresponding to key (DSTID, segID) to the gateway router 1110, which is now a subscriber for routes of destination node 1140.

When the common gateway router 1130 receives a route ADD/DEL/UPDATE notification from the destination node 1140, the common gateway router 1130 provides the routes updates of the destination node 1140 to the transit node 1120. The transit node provides the route updates to the subscribing gateway router 1110, as shown. When the gateway router 1110 wants to stop receiving routes for the destination node 1140, the gateway router 1110 sends a route subscription STOP notification with the key (DSTID, segID) to the transit node 1120.

Lastly, in response to the STOP notification, the transit node 1120 removes the gateway router 1110 as a subscriber from the DSTID table. If the subscribers list is empty, the transit node 1120 iterates the FIB for routes of the destination node 1140 with key (DSTID, segID), and removes it from the rdlist. FIG. 12 illustrates an example 1200 of the code structure of a subscribers list of some embodiments, which includes attributes such as the logical identifiers of subscribers as well as a count of the number of subscribers.

Figure 13:
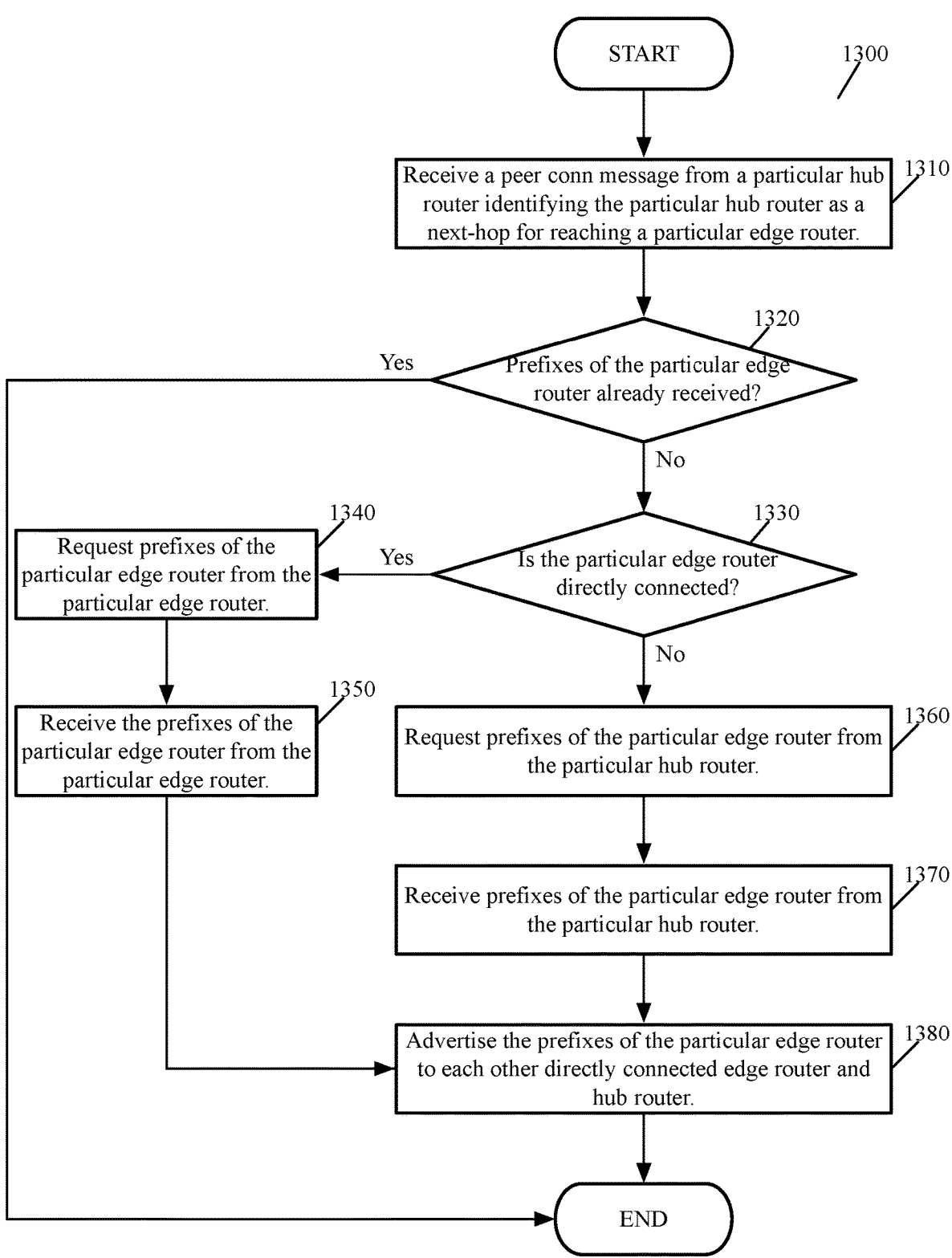
FIG. 13 conceptually illustrates a process performed in some embodiments by a route reflector (e.g., cloud gateway router) when it is notified of a newly connected edge router.
Figure 15:
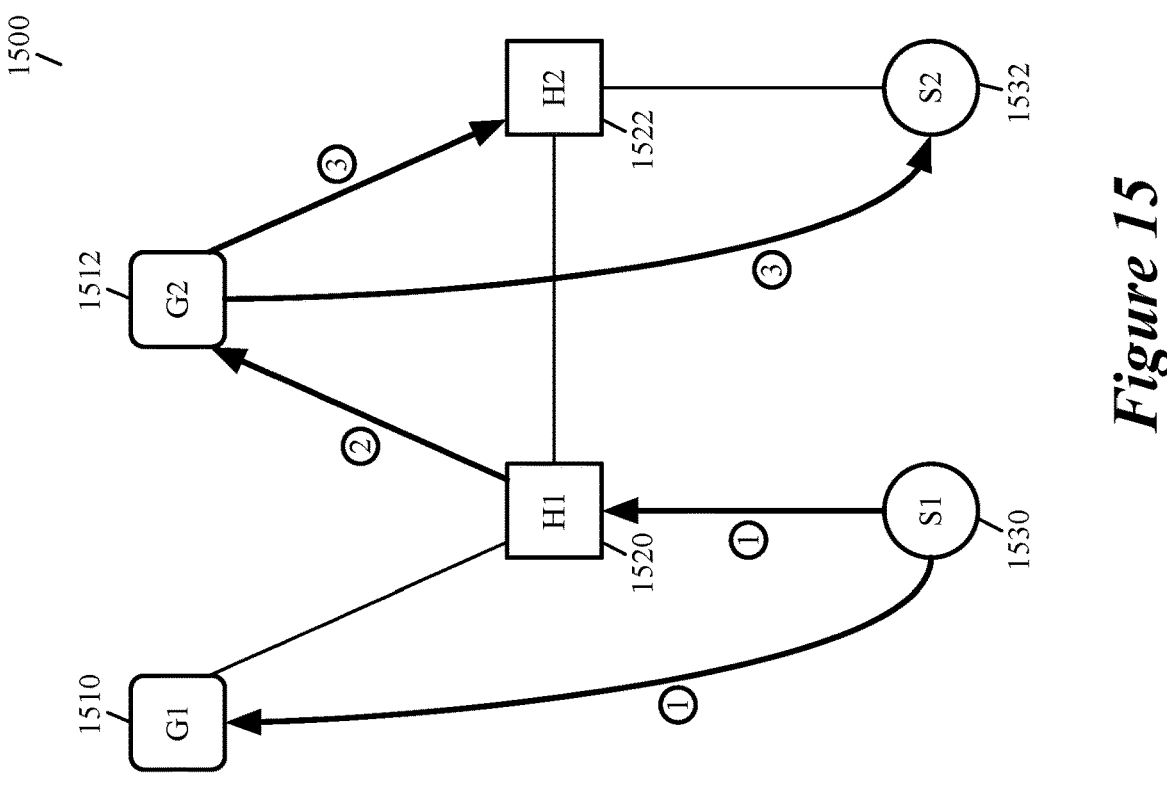
FIG. 15 conceptually illustrates an architecture diagram of some embodiments in which prefixes of an edge router are advertised.
Figure 14:
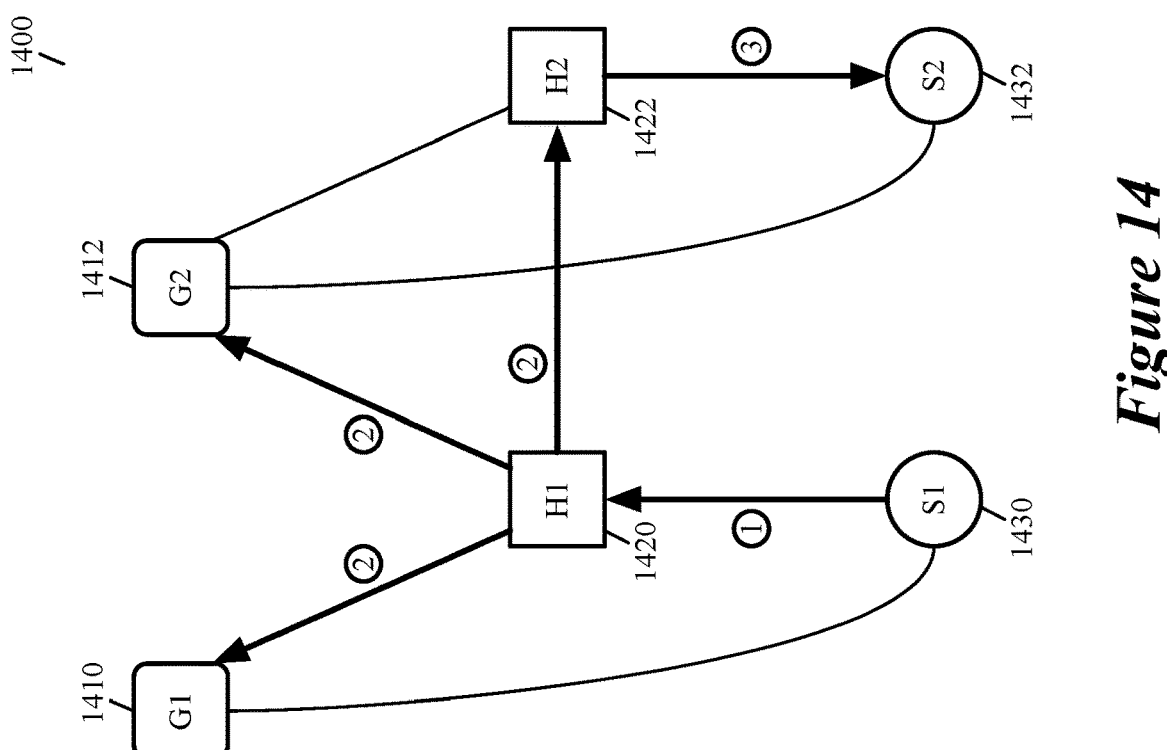
FIG. 14 conceptually illustrates an architecture diagram of some embodiments in which a peer-conn message is distributed when an edge router establishes a connection to a hub router.

FIG. 13 conceptually illustrates a process 1300 performed in some embodiments by a route reflector (e.g., cloud gateway router) when it is notified of a newly connected edge router. The process 1300 will be described below with references to FIG. 14, which conceptually illustrates an architecture diagram 1400 of some embodiments in which a peer-conn message is distributed when an edge router establishes a connection to a hub router, and to FIG. 15, which conceptually illustrates an architecture diagram 1500 of some embodiments in which prefixes of an edge router are advertised.

The process 1300 starts when the route reflector receives (at 1310) a peer-conn message from a particular hub router identifying the particular hub router as a next-hop for reaching a particular edge router. In the architecture diagram 1400, for instance, the hub router H1 1420 receives, at the encircled 1, a peer-conn message from the edge router S1 1430 (e.g., edge router located at a branch site in a first region) after a connection is established between the hub router 1420 and edge router S1 1430, and sends peer-conn messages identifying itself as a next hop for reaching the edge router S1 1430 to the route reflectors G1 1410 and G2 1412. The hub router H1 1420 also sends a peer-conn message announcing the edge router S1 1430 to the hub router H2 1422, which then sends a peer-conn message to the edge router S2 1432 at the encircled 3.

As described above, peer-conn messages, in some embodiments, indicate the connection status of a node (e.g., edge router, hub router, etc.) as well as endpoint information of the node, a profile of the node, and configuration parameters defined for the node (e.g., routing configuration parameters). In some embodiments, the router reflector updates its SoR table upon receiving the peer-conn message from the particular hub router, with the particular hub router identified as a next-hop for reaching the particular edge router. For instance, in some embodiments, the peer-conn message from the particular hub router is the first notice the route reflector receives regarding the particular edge router, and thus the route reflector updates its SoR table to include an entry for the particular edge router. In other embodiments, the route reflector is already aware of the first edge router and updates its SoR table to include the first hub router as another option for a next-hop to reach the particular edge router.

As such, the process determines (at 1320) whether the route reflector has already received prefixes (i.e., routes) of the particular edge router. The route reflector of some embodiments makes this determination by performing a look up in a routing table to determine whether it needs to request routes of the particular edge router or whether it has already received routes of the particular edge router. In some embodiments, for instance, the peer-conn message received at 1310 is not the first peer-conn message received by the route reflector regarding the particular edge router, and as such, the route reflector of some embodiments has already received the routes of the particular edge router between receipt of the initial peer-conn message and the peer-conn message received at 1310. When the route reflector has already received the routes, the process 1300 ends.

When the route reflector has not yet received the routes of the particular edge router, the process 1300 transitions to determine (at 1330) whether the particular edge router is directly connected to the route reflector. For example, in the diagram 1400, the route reflector G1 1410 is directly connected to edge router S1 1430 and is not directly connected to edge router S2 1432. In some embodiments, the route reflector makes the determination based on its SoR table. As described above, for example, a value of 1 indicates a particular node is directly connected to the route reflector, in some embodiments, while a value of 10 indicates a particular node is reachable via a relayed connection.

When the particular edge router is directly connected to the route reflector, the process 1300 transitions to request (at 1340) prefixes of the particular edge router from the particular edge router. That is, when the route reflector has a direct connection to the particular edge router, the route reflector does not need to go through any intermediate nodes to obtain the prefixes of the particular edge router. In the diagram 1500, for instance, the route reflector G1 1510 would request prefixes of the edge router S1 1530 directly from the edge router S1 1530. Similarly, the route reflector G1 1512 would request prefixes of the edge router S2 1532 directly from the edge router S2 1532.

The process 1300 receives (at 1350) the prefixes of the particular edge router from the particular edge router. At the encircled 1 in the diagram 1500, for instance, the route reflector G1 1510 receives from the edge router S1 1530 prefixes of the edge router S1 1530. In some embodiments, the route reflector updates the entry for the particular edge router in the route reflector's SoR table to include the prefixes of the particular edge router. If the prefixes of the particular edge router are ever updated, the route reflector receives the updated prefixes and updates the SoR table to reflect the updated prefixes, according to some embodiments. In addition to updating the SoR table, the route reflectors of some embodiments also update their routing tables to include the prefixes of the particular edge router.

The process 1300 then transitions to advertise (at 1380) the prefixes of the particular edge router to each other directly connected edge router and hub router. The route reflector G1 1510 of some embodiments, for example, advertises prefixes of the edge router S1 1530 to the hub router H1 1520, as the hub router H1 1520 is the only other router to which the router reflector G1 1510 has a direct connection. In some embodiments, the route reflector is connected to additional edge routers in the same region as the particular edge router and/or additional hub routers, and advertises the prefixes of the particular edge router to each of these other edge and hub routers.

When the particular edge router is not directly connected to the route reflector, the process 1300 transitions to request (at 1360) prefixes of the particular edge router from the particular hub router. In some embodiments, the route reflector requests the prefixes of the particular edge router from the particular hub router after determining (e.g., based on a lookup in an SoR table of the route reflector) that the particular hub router is the best next-hop for reaching the particular edge router.

For example, in the diagram 1500, the route reflector G2 1512 does not have a direct connection to the edge router S1 1530, but can reach the edge router S1 1530 via either the hub router H1 1520, which has a direct connection to the edge router S1 1530, or the hub router H2 1522, which has a relayed connection to the edge router S1 1530. As such, the route reflector G2 1512 of some embodiments requests prefixes of the edge router S1 1530 from the hub router H1 1520 and not from the hub router H2 1522. However, if the route reflector G2 1512 has lost connectivity to the hub router H1 1520, the route reflector G2 1512 requests the prefixes from the hub router H2 1522.

The process 1300 receives (at 1370) prefixes of the particular edge router from the particular hub router. Upon receiving the prefixes, the route reflector of some embodiments updates its SoR table to include the newly received prefixes. The route reflector of some embodiments also updates its routing table to include the received routes. In some embodiments, the route reflector also sends a route subscription notification to the hub router from which it received the prefixes in order to receive any updates to the prefixes associated with the particular edge router.

The process 1300 advertises (at 1380) prefixes of the particular edge router to each other directly connected edge router and hub router. That is, when the route reflector has a direct connection to the particular edge router, the route reflector advertises the prefixes to each other route apart from the particular edge router. Each of the hub routers and edge routers that receive the prefixes from the route reflector, in some embodiments, relay the prefixes to other route reflectors to which they are connected.

For example, in the diagram 1500, if the hub router H1 1520 receives prefixes of the edge router S1 1530 from the route reflector G1 1510, the hub router relays the prefixes to the route reflector G2 1512. The route reflector G2 1512 of some embodiments then updates its own SoR table and relays the prefixes to the hub router H2 1522 and edge router S2 1532. In other embodiments, the route reflector G2 1512 provides the prefixes to the edge router S2 1532 only upon request by the edge router S2 1532 for the prefixes of the edge router S1 1530. Following 1380, the process 1300 ends.

As mentioned above, the embodiments described herein allow for features such as profile isolation to be implemented. As such, profile isolation (PISO) information, in some embodiments, is shared by the nodes. In some embodiments, every node that receives PISO information for a directly connected peer with propagate the PISO information to all connected nodes. The originating node of some embodiments sets a direct flag in the PISO information (i.e., a direct flag indicating the node has a direct overlay with the announcing transit point). The peer node, on receiving the PISO information with Direct Flag set, propagates the PISO information further to all the connected nodes. Otherwise, the peer node drops the message. In some embodiments, PISO information is shared by the nodes to gateway routers. For example, in some such embodiments, nodes share PISO information as part of multipath control initiations (e.g., VCMP ctrl init). Originating nodes also send the PISO information to directly-connected peers as part of RMSG, in some embodiments, and the gateway routers propagate the received PISO information to all other connected nodes using RMSG.

In some embodiments, to propagate the PISO information to indirectly connected gateway routers, a new profile dlist is used to hold per-node, per-segment specific information and redistribute this information to all connected nodes. The attributes of the new profile dlist, in some embodiments, include the node's logical identifier, segment identifier, and any feature flags identifying enabled features (e.g., VPN, edge-to-datacenter, edge-to-edge, profile isolation, and direct edge-to-edge). The gateway routers of some embodiments request routes of indirectly connected destinations from transit points (e.g., hub routers), and the transit points first send the profile information of the destination, followed by the requested routes. The sequencing of dlist, in some embodiments, to ensure profile identifier and profile flags are propagated before routes on a routing protocol (e.g., VCRP) window reopen is (1) peer_conn dlist, (2) profile dlist, and (3) route dlist.

In an alternate approach, the profile identifier and profile flag information are embedded into every route object, according to some embodiments. However, in some embodiments, this leads to memory bloat with scale number of routes. Even with a special control prefix message (e.g., 255.255.255.255/255.255.255.255), some embodiments do not guarantee the message will be propagated before all other routes, especially when profile updates are occurring.

Figure 16:
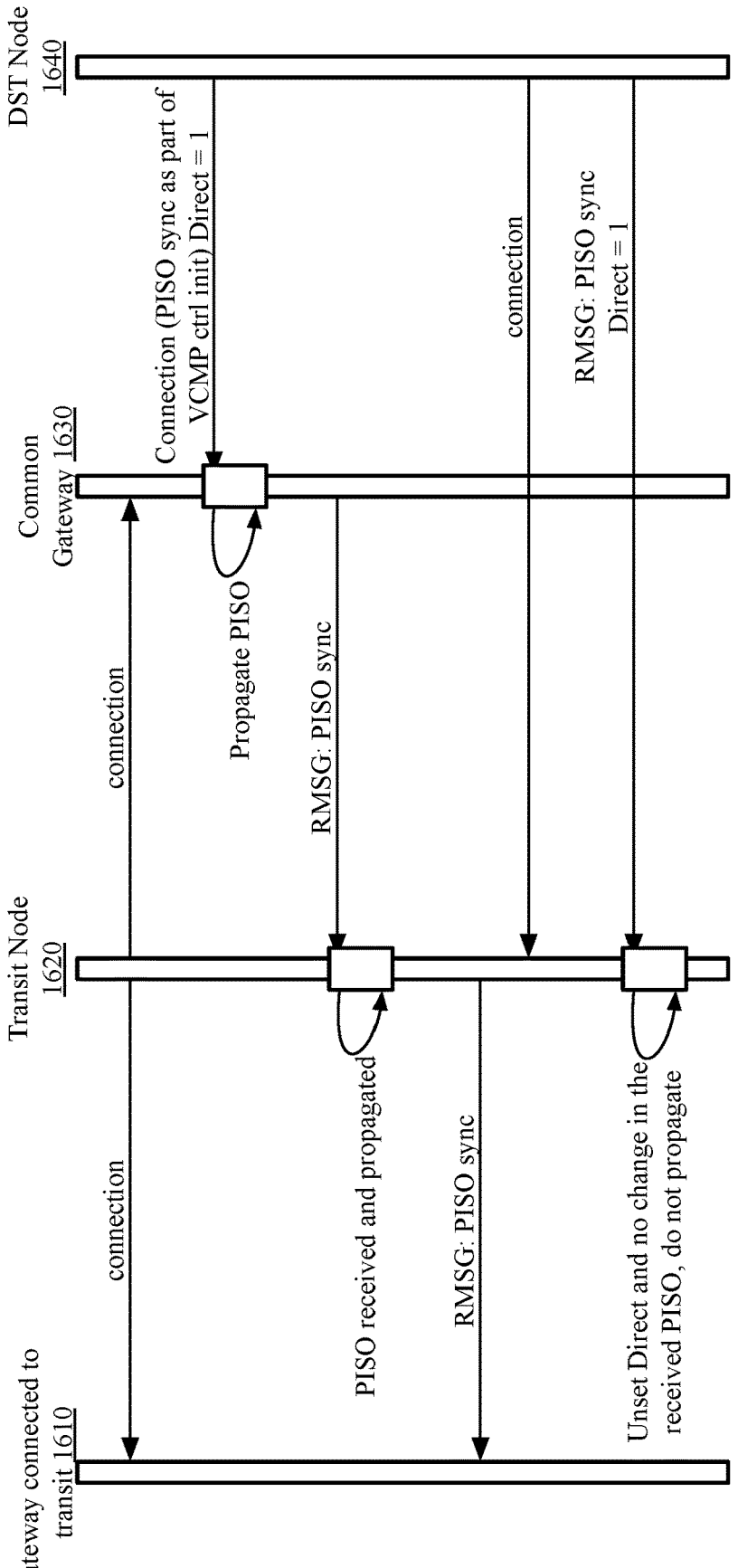
FIG. 16 conceptually illustrates a workflow of some embodiments during PISO information propagation to an indirectly connected gateway router.

FIG. 16 conceptually illustrates a workflow 1600 of some embodiments during PISO information propagation to an indirectly connected gateway router. The workflow 1600 involves a gateway router 1610 that is connected to a transit node, a transit node 1620, a common gateway router 1630, and a destination (DST) node 1640. The workflow 1600 starts with the transit node 1620 establishing connections with the gateway router 1610 and the common gateway router 1630. Next, the destination node 1640 establishes a connection to the common gateway router 1630 and includes PISO information as part of a multipath control initiation. Additionally, the destination node 1640 has set a direct flag in its PISO information with a value of 1 because there is a direct overlay connection between the destination node 1640 and the common gateway router 1630.

Based on the direct flag set in the PISO information from the destination node 1640, the common gateway router 1630 propagates the PISO information to all connected nodes. The common gateway router 1630 sends the PISO information to the transit node 1620 (i.e., a directly connected peer) as part of RMSG. In response, the transit node 1620 receives and propagates the PISO information, and sends the PISO information as part of RMSG to the gateway router 1610. When the destination node 1640 establishes a connection with the transit node 1620, the destination node 1640 also sends its PISO information as part of RMSG, and sets a direct flag with a value of 1 to indicate the direct connection from destination node 1640 to transit node 1620. Because the PISO information has already been propagated, and there is no change in the received PISO information, the transit node 1620 does not propagate the received PISO information (i.e., because doing so would be redundant).

As described above, members of hub router clusters, in some embodiments, relay routes (e.g., prefixes) to other members of their cluster using an identifier that indicates to recipients of the routers that the routes should not be redistributed to the route reflectors. In some embodiments, cluster members redistribute overlay prefixes to eBGP for intra-cluster communication. The identifier is an extended community string, according to some embodiments, which is a common string within the cluster. The community string, in some embodiments, is specific to clusters (i.e., each cluster uses a respective community string) in order to help members identify prefixes redistributed by other members as will be further described below.

Figure 17:
FIG. 17 conceptually illustrates a topology of a cluster of some embodiments connecting to four sets of spokes.

FIG. 17 conceptually illustrates a topology 1700 of a cluster of some embodiments connecting to four sets of spokes. Each spoke, in some embodiments, is representative of multiple edge routers located at multiple sites within a respective region. The topology 1700 includes four sets of spokes, S1 1730, S2 1732, S3 1734, and S4 1736, that can, in total, have more than the 4,000 edges that a single gateway can support. As shown, each of the gateway routers (e.g., route reflectors) 1710-1716 connects to a respective spoke set 1730-1736, and all of the gateway routers 1710-1716 are connected to the cluster 1705.

As the hub routers 1720-1726 establish connections to their respective spoke sets 1730-1736, each hub router 1720-1726 sends a peer-conn notification to the route reflectors 1710-1716 to provide reachability information for the connected spoke sets. For each peer-conn message received by the route reflectors 1710-1716 from a member of the cluster 1705, the route reflectors of some embodiments distribute to each other member of the cluster 1705 the received peer-conn message to notify the other members of the reachability of the connected spoke sets identified in the peer-conn messages.

As the hub routers 1720-1726 of the cluster 1705 receive prefixes of their respective spoke sets 1730-1736 (e.g., after requesting the prefixes from their respective spoke sets), the hub routers redistribute the prefixes via the overlay network to the route reflectors 1710-1716, and redistribute the prefixes via cluster eBGP underlay after tagging the prefixes with an extended community string 'C1' to other members of the cluster 1705. This extended community string is used by cluster members of cluster C1 1705 to indicate to recipients of the prefixes that the prefixes should not be announced to the route reflectors. Cluster members belonging to a cluster, in some embodiments, are aware of their membership. For instance, cluster members H1 1720, H2 1722, H3 1724, and H4 1726 in the topology 1700 know that they belong to cluster C1 1705.

In some embodiments, support for an extended community string is required in deployments with cluster-to-cluster interconnect. However, the string is optional in single cluster deployments, according to some embodiments. A controller knob (e.g., a VCO (VeloCloud Orchestrator) is provided, in some embodiments, to enable or disable extended community string in single cluster deployments. In some embodiments, the default for the knob is set as disabled. When the cluster-to-cluster interconnect feature is enabled, in some embodiments, the extended community string knob becomes "ENABLED" and cannot be disabled.

Figure 18:
FIG. 18 illustrates an example of a gateway's connection table in some embodiments.

FIG. 18 illustrates an example of a gateway's connection table 1800 in some embodiments. Each "C" in the table 1800 denotes a cluster member (e.g., C11 denotes cluster member 11), while each "S" in the table 1800 denotes a spoke (e.g., S1 denotes spoke 1). When spokes connect to their corresponding cluster member, in some embodiments, the cluster member notifies the gateways of reachability (e.g., through peer-conn messages). In response, the gateways of some embodiments relay that information to other members in the same cluster. In some embodiments, when a gateway shares prefixes with next-hops, the gateway shares the cluster identifier in next-hop as opposed to a specific cluster member's identifier in next-hop. Also, in some embodiments, the gateways request cluster members to send prefixes of spokes that are not connected directly to gateways.

Cluster members, on receiving the relayed reachability peer-conn messages from gateway routers, relay the reachability to the directly connected nodes. This will enable the directly connected members to install prefixes of nodes connected to other cluster members and reach them. For instance, when a spoke "S1" connects to a cluster member "C11", the cluster member "C11" sends spoke "S1" reachability to gateways via a peer-conn message. Gateways send the reachability information back to cluster members "C12", "C13", and "C14". Upon receiving the reachability peer-conn messages, the cluster members "C12", "C13", and "C14" relay that information to spokes "S2", "S3", and "S4", respectively. "S2", "S3", and "S4" then install the prefixes for spoke "S1" with next-hops pointing to cluster "C1". Cluster members identify prefixes redistributed by their sibling members and refrain from announcing to gateway routers, which eliminates redundant copies of prefixes going to gateway routers, according to some embodiments.

In some embodiments, when gateway routers are unaware of any nodes, the gateway routers request cluster members to send prefixes of those nodes when they receive peer-conn messages from cluster members. For example, when a cluster member "C11" notifies a gateway "G2" of a spoke "S1" that is not directly connected to the gateway "G2", then the gateway "G2" will request cluster member "C11" to send the prefixes of spoke "S1", which gateway "G2" can relay to a spoke "S2" with the cluster "C1" as next hop.

In some embodiments, when an enterprise is configured with only partner gateways, a common gateway between every two interconnecting transit points (e.g., hub routers) is elected among available gateway routers in the enterprise. There are two different approaches used, in some embodiments. The first approach involves gateway routers embedding the gateway order as part of DCE (data circuit-terminating equipment) information reply messages to nodes to select the gateway, while the second approach involves a network controller electing the common gateway from the available gateway routers in the enterprise.

In the first approach, every node provides a list of connected gateway routers to all gateway routers. Each gateway router creates a union of gateway routers between every pair of interconnecting nodes, and designates the one having the greater logical identifier as the first order gateway router. As part of the DCE information reply message, every gateway router embeds its order from the union of the gateway router's list. This information is then used on the nodes to determine which gateway router assignment needs to be honored.

In the second approach, since the network controller is aware of all gateway routers present in the enterprise, it can elect a common gateway router for every pair of interconnecting transit points. The gateway router selection, in some embodiments, is based on higher logical identifier, geographical location, or any other parameters which the network controller currently uses for electing a super gateway router/alternative super gateway router. The network controller then sends this elected common gateway's identifier as part of the hub router configurations in the control plane policy to the nodes. In embodiments where interconnect is enabled, this information is embedded. The received gateway router identified is then considered as a super gateway for the pair of interconnecting transit nodes and assignments from this super gateway are honored.

Figure 19:
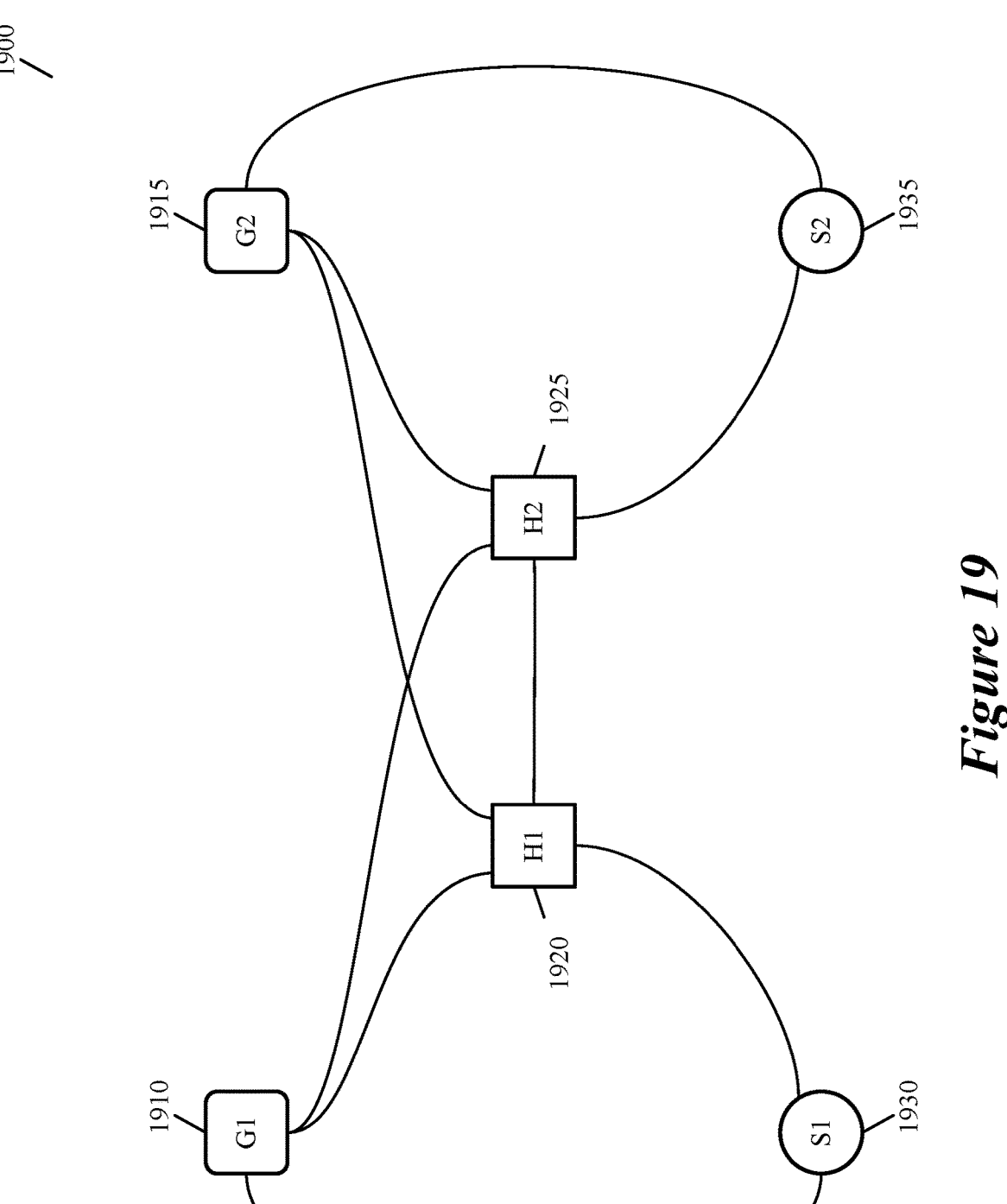
FIG. 19 conceptually illustrates a first example scenario of some embodiments of a topology that includes common gateways for transit points and disjoint gateways for regional branches.

FIG. 19 conceptually illustrates a first example scenario of some embodiments of a topology 1900 that includes common gateways for transit points and disjoint gateways for regional branches. As shown, the topology 1900 includes gateway routers G1 1910 and G2 1915, hub routers H1 1920 and H2 1925, and spokes S1 1930 and S2 1935. The hub routers H1 1920 and H2 1925 are connected to each other and to each of the gateway routers G1 1910 and G2 1915. The spoke S1 1930 is connected to the hub router H1 1920 and the gateway router G1 1910, while the spoke S2 1935 is connected to the hub router H2 1925 and gateway router G2 1915.

The gateway routers 1910-1915 are referred to as controllers, in some embodiments, due to their operations as route reflectors. The spoke S1 1930 represents a first set of branches in a first region and the spoke S2 1935 represents a second set of branches in a second region. Additionally, the hub routers H1 1920 and H2 1925 are transit points for connecting the spokes S11930 and S2 1935.

In this example, the gateway router G1 1910 is a common gateway router for the spoke S1 1930 and the hub router H1 1920, while the gateway router G2 1915 is a common gateway router for the spoke S2 1935 and the hub router H2 1925. Because each gateway router is connected to only one spoke, the gateway router G1 1910 is a disjoint gateway for the spoke S1 1930, and the gateway router G2 1915 is a disjoint gateway for the spoke S2 1935.

In some embodiments, the gateway routers G1 1910 and G2 1915 have limits on the number of branches that can connect to them due to limits on the number of edge routers that can connect to a single gateway router. For instance, in some embodiments, each gateway router can handle connections from 4,000 edge routers. Thus, regional branches are grouped accordingly and assigned to gateway routers, in some embodiments. Transit points (e.g., hub routers H1 1920 and H2 1925), in some embodiments, also have limits on the number of branches they can terminate. Thus, regional transit points of some embodiments connect to a set of regional branches.

The topology 1900 of some embodiments is associated with a set of requirements. Examples of such requirements, in some embodiments, include using gateway routers G1 1910 and G2 1915 for control plane functionality only, offering of data plane functionality by the hub routers H1 1920 and H2 1925, connecting regional branches of spoke S1 1930 to hub router H1 1920 and regional branches of spoke S2 1935 to hub router H2 1925, and using hub routers H1 1920 and H2 1925 to interconnect regional branches S1 1930 and S2 1935.

In some embodiments, a control plane workflow for the topology 1900 is as follows. First, the hub router H1 1920 connects to the gateway router G1 1910. Next, the spoke S1 1930 connects to the gateway router G1 1910 and requests the DCE for hub router H1 1920. After receiving the requested DCE from the gateway router G1 1910, the spoke S1 1930 then connects to the hub router H1 1920, and the hub router H1 1920 notifies the gateway router G1 1910 of the connection by spoke S1 1930, and indicates to the gateway router G1 1910 that the spoke S1 1930 is reachable via the hub router H1 1920.

Figures 20, 21, 22:
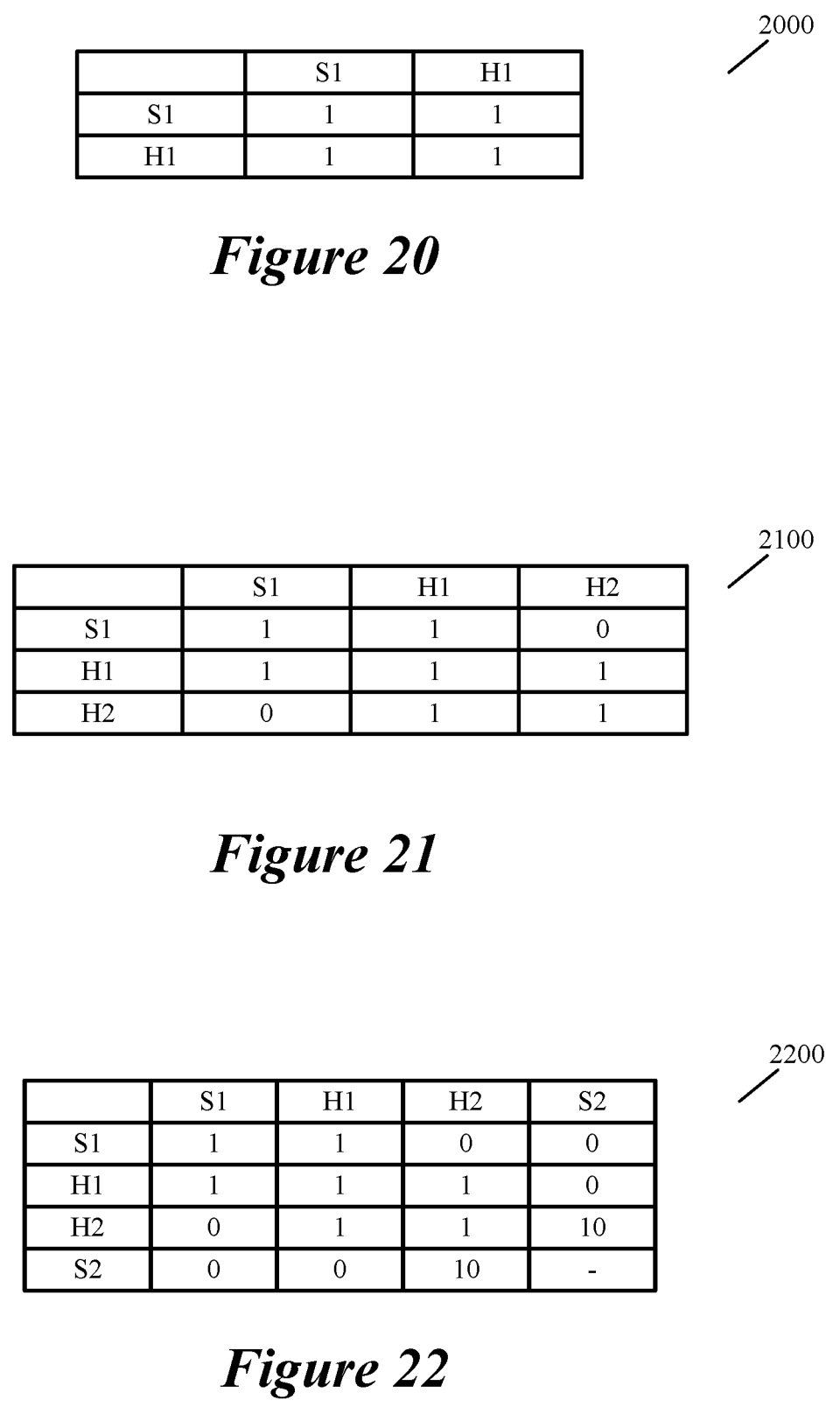

Based on this control plane workflow, the gateway router G1 1910 of some embodiments, generates a connection table, such as the connection table 2000 illustrated by FIG. 20. In the connection table 2000, a value of 1 indicates the entities in the corresponding row and column headers are connected, and that they are connected to the gateway router (i.e., the gateway router that generated the table) directly. For instance, a value of 1 in row 2, column 1 indicates spoke S1 1930 and hub router H1 1920 are connected to each other and connected to the gateway router G1 1910 directly.

When the hub router H1 1920 notifies gateway router G1 1910 of hub router H2 1925's connection to the hub router H1 1920, the gateway router G1 1910 updates its connection table to produce the table 2100 illustrated by FIG. 21. As shown, the table 2100 now includes an addition row and column for the hub router H2 1925. Because the hub router H2 1925 does not have a connection with the spoke S1 1930, the table 2100 has a value of 0 at the intersection of these entities (e.g., at row 1, column 3; and at row 3, column 1). Conversely, the intersection of hub router H1 1920 and hub router H2 1925 in the connection table 2100 (i.e., at row 3, column 2; and at row 2, column 3) has a value of 1, indicating the hub routers H1 1920 and H2 1925 are directly connected to each other and to the gateway router G1 1910.

Once the spoke S2 1935 connects to the hub router H2 1925, the hub router H2 1925 notifies the gateway router G1 1910 of spoke S2 1935, causing the gateway router G1 1910 to again update its connection table to produce connection table 2200 illustrated by FIG. 22. Since spoke S2 1935 is not directly connected to gateway router G1 1910, a connection value of 10 is used to represent reachability to spoke S2 1935. The gateway router G1 1910 obtains the prefixes of spoke S2 1935 by requesting the hub router H2 1925 to send the prefixes for spoke S2 1935 to the gateway router G1 1910. The hub router H2 1925 then sends the prefixes for spoke S2 1935 to the gateway router G1 1910 with the spoke S2 1935 marked as the owner of the prefix.

In some embodiments, the gateway router G1 1910 iterates through the table 2200 every time the table is updated in order to send updated prefixes to the nodes that are connected directly (e.g., hub routers 1920-1925 and spoke 1930). The prefix update flow performed by the gateway router G1 1910, in some embodiments, starts at column 1, row 1. First, the gateway router G1 1910 sends prefixes of hub router H1 1920 to the spoke S1 1930 with hub router H1 1920 as the next hop.

Next, the gateway router G1 1910 moves to hub router H1 1920's row (i.e., row 2) and checks the node that the hub router H1 1920 is connected to. The spoke S1 1930 in column 1 is ignored (i.e., as it has already been sent prefixes for hub router H1 1920), as is the hub router H1 1920 in column 2 (i.e., because the current check is for hub router H1 1920). In the third column, the value of 1 indicates that the hub router H2 1925 is connected to the hub router H1 1920 and as such, the gateway router G1 1910 sends prefixes of hub router H2 1925 to the spoke S1 1930 with the hub router H1 1920 as the next hop. Spoke S2 1935 in column 4 is skipped based on the value of 0.

The gateway router G1 1910 next moves to the third row to determine to which spoke the hub router H2 1925 is connected because the hub router H2 1925 is directly connected with gateway router G1 1910. Based on the value 10 in column 4, the gateway router G1 1910 determines that the hub router H2 1925 is directly connected to the spoke S2 1935. The gateway router G1 1910 then sends the prefixes of spoke S2 1935 to the spoke S1 1930 with hub router H1 1920 as the next-hop since the spoke S1 1930 is directly connected to the hub router H1 1920 and not directly connected to the hub router H2 1925.

Next, the gateway router G1 1910 moves to column 1, row 2. The gateway router G1 1910 sends prefixes of spoke S1 1930 and hub router H2 1925 to the hub router H1 1920, and ignores spoke S1 1930's row. Moving to hub router H2 1925's row, the gateway router G1 1910 determines that the spoke S2 1935 is connected via the hub router H2 1925, and as such, the gateway router G1 1910 moves to the row for spoke S2 1935, and sends the prefixes of spoke S2 1935 to hub router H1 1920 with hub router H2 1925 as the next hop.

The gateway router G1 1910 next moves to column 1, row 3, and send the prefixes of hub router H1 1920 to the hub router H2 1925. Moving to the row for hub router H1 1920, the gateway router G1 1910 sends the prefixes of spoke S1 1930 to the hub router H2 1925 with hub router H1 1920 as the next hop. Lastly, the gateway router G1 1910 ignores the row for spoke S1 1930, and the gateway router 1910 has completed its prefix update flow.

Figure 23:
FIG. 23 conceptually illustrates a second example scenario of some embodiments of an extended topology that includes an additional transit node, gateway router, and spoke.

FIG. 23 conceptually illustrates a second example scenario of some embodiments of an extended topology 2300 that includes an additional transit node, gateway router, and spoke. The topology 2300 includes gateway routers 2310, 2312, and 2314; hub routers 2320, 2322, and 2324; and spokes 2330, 2332, and 2334, with each spoke representing a set of branches in a particular region. Gateway router G1 2310 is a common gateway for spoke S1 2330 and hub router H1 2320, gateway router G2 2312 is a common gateway for spoke S2 2332 and hub router H2 2322, and gateway router G3 2314 is a common gateway for spoke S3 2334 and hub router H3 2324. The gateway routers 2310-2314 are also disjoint gateways as each gateway router connects to a different respective spoke. Each of the hub routers 2320-2324 is also connected to each of the gateway routers 2310-2314 such that a full mesh is created between the gateway routers and hub routers, as shown.

The control plane workflow for the topology 2300 starts with the hub router H1 2320 connecting to the gateway router G1 2310. Next, the spoke S1 2330 connects to the gateway router G1 2310 and requests from the gateway router G1 2310 the DCE of hub router H1 2320. After receiving the requested DCE from the gateway router G1 2310, the spoke S1 2330 then connects to the hub router H1 2320, and the hub router H1 2320 notifies the gateway router G1 2310 of spoke S1 2330's connection. Based on this information, the gateway router G1 2310 generates a connection table, such as the connection table 2000 described above.

The gateway router G1 2310 continues the control plane workflow as also described above for the gateway router G1 1910, including updating the connection table to produce table 2100, and table 2200. Because the topology 2300 includes an additional transit node (i.e., the hub router H3 2324), as well as an additional gateway router (i.e., the gateway router G3 2314) and additional spoke (i.e., the spoke S3 2334), after the gateway router G1 2310 has produced a table such as the table 2200 described above, the control plane workflow for the topology 2300 continues when the spoke S3 2334 connects to the hub router H3 2324, and the hub router H3 2324 notifies the gateway router G1 2310 of the spoke S3 2334. The hub router H2 2322 also notifies the gateway router G1 2310 of the hub router H3 2324.

The gateway router G1 2310 then updates its connection table to produce the connection table 2400 illustrated by FIG. 24. The gateway router G1 2310 iterates through its table every time the table is updated to send updated prefixes to the nodes that are connected directly. The prefix update flow using the table 2400 is as follows. The gateway router G1 2310 starts with column 1, row 1 and sends prefixes of the hub router H1 2320 to the spoke S1 2330 with the hub router H1 2320 as the next hop.

Next, the gateway router G1 2310 moves to the hub router H1 2320's row and determines which spoke the hub router H1 2320 is connected to. Because the spoke that the hub router H1 2320 is connected to is the spoke S1 2330, to which the gateway router G1 2310 has already sent prefixes for hub router H1 2320, the gateway router G1 2310 ignores the spoke S1 2330, as well as hub router H1 2320. The gateway router G1 2310 then determines the hub router H2 2322 is connected to the hub router H1 2320 and sends prefixes of hub router H2 2322 to the spoke S1 2330 with the next-hop as the hub router H1 2320.

The gateway router G1 2310 then moves to the hub router H2 2322's row and determines which spoke the hub router H2 2322 is connected to as the hub router H2 2322 is directly connected with the gateway router G1 2310. After determining that the hub router H2 2322 is connected to the spoke S2 2332, the gateway router G1 2310 sends prefixes of the spoke S2 2332 to the spoke S1 2330 with the hub router H1 2320 as the next hop (i.e., since spoke S1 2330 is only directly connected to the hub router H1 2320).

The gateway router G1 2310 also sends prefixes of the hub router H3 2324 to the spoke S1 2330 with the hub router H1 2320 as the next hop. Although the hub router H3 2324 is directly connected to the gateway router G1 2310 and to hub router H2 2322, the spoke S1 2330 is not connected to the hub router H3 2324. However, the spoke S1 2330 can reach the hub router H3 2324 via hub router H1 2320 to hub router H2 2322 to hub router H3 2324. The gateway router G1 2310 then moves to hub router H3 2324's row and sends prefixes of spoke S3 2334 to the spoke S1 2330 with the hub router H1 2320 as the next hop. The gateway router 2310 then skips rows for spokes S2 2332 and spoke S3 2334 as these spokes are not directly connected to the gateway router G1 2310.

Figure 25:
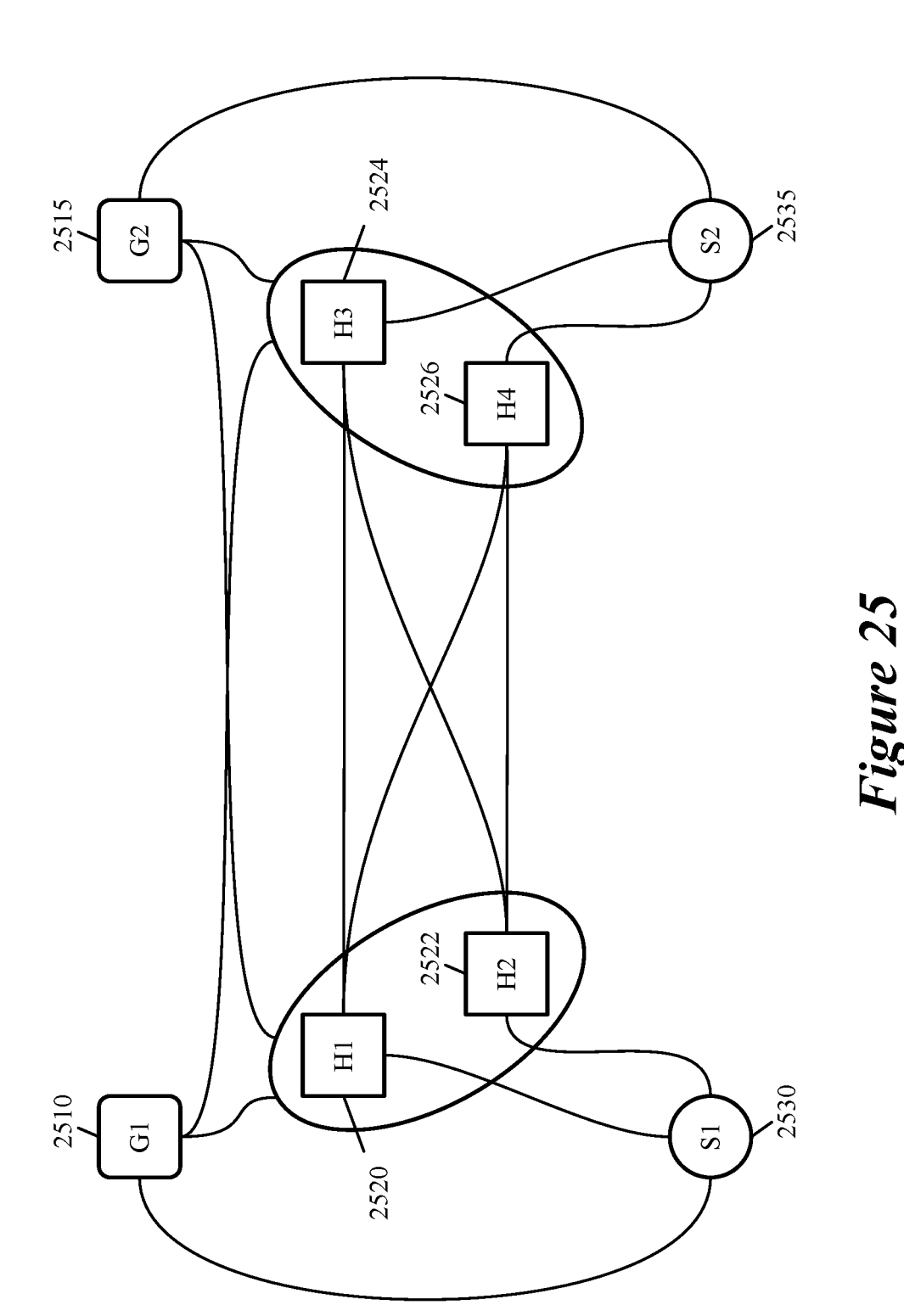
FIG. 25 conceptually illustrates a third example scenario of some embodiments of a topology that includes two hub routers per region as transit points.

FIG. 25 conceptually illustrates a third example scenario of some embodiments of a topology 2500 that includes two hub routers per region as transit points. The topology 2500 includes two gateway routers G1 2510 and G2 2515; four hub routers H1 2520, H2 2522, H3 2524, and H4 2526; and two spokes S1 2530 and S2 2535. The spoke S1 2530 is a set of branches in a first region and the spoke S2 2535 is a set of branches in a second region. The hub routers H1 2520 and H2 2522 are both assigned to the first region for the spoke S1 2530, while the hub routers H3 2524 and H4 2526 are both assigned to the second region for the spoke S2 2535.

The gateway router G1 2510 is a common gateway for the spoke S1 2530 and the hub routers H1 2520 and H2 2522, while the gateway router G2 2515 is a common gateway for the spoke S2 2535 and the hub routers H3 2524 and H4 2526. The hub routers 2520-2526 are in a full mesh with the gateway router G1 2510 and G2 2515 such that each hub router 2520-2526 is connected to each gateway router G1 2510 and G2 2515, as illustrated.

As mentioned above, gateway routers of some embodiments have limits on the number of branches that can connect to them based on limits on the number of edge routers that can connect to the gateway routers. Thus, regional branches are grouped accordingly and assigned to gateway routers. Additionally, transit points have limits on the number of branches they can terminate, and thus, regional transit points (e.g., hub routers) connect to a set of regional branches.

The topology 2500 is associated with a set of topology requirements, in some embodiments. Examples of such requirements include that the gateway routers G1 2510 and G2 2515 are for control plane only, that the hub routers 2520-2526 offer data plane functionality, that the regional branches of the spoke S1 2530 connect to hub routers H1 2520 and H2 2522, that the regional branches of the spoke S2 2535 connect to the hub routers H3 2524 and H4 2526, that hub routers H1 2520 and H2 2522 are first and second order transit points of the first region, that hub routers H3 2524 and H4 2526 are first and second order transit points of the second region, and that the hub routers 2520-2526 interconnect the regional branches of the spokes S1 2530 and S2 2535.

The control plane workflow for the topology 2500 is as follows. First, hub routers H1 2520 and H2 2522 connect to the gateway router G1 2510, and the spoke S1 2530 connects to the gateway router G1 2510 and requests the DCEs for hub routers H1 2520 and H2 2522. After receiving the requested DCEs, the spoke S1 2530 then connects to the hub routers H1 2520 and H2 2522. The hub routers H1 2520 and H2 2522 notify the gateway router G1 2510 of the spoke S1 2530's connection to the hub routers H1 2520 and H2 2522.

The gateway router G1 2510 next generates a connection table, such as the connection table 2600 illustrated by FIG. 26. In the table 2600, a value of 1 indicates spoke S1 2530 and hub router H1 2520 are connected to each other, spoke S1 2530 and hub router H2 2522 are connected to each other, and each of the spoke S1 2530 and hub routers 2520-2522 are directly connected to the gateway router G1 2510. Additionally, hub routers 2520-2522 connect to the hub routers 2524-2526, and notify the gateway router G1 2510 of the connection to hub routers H3 2524 and H4 2526.

Based on the notification of the connections between hub routers 2520-2522 and hub routers 2524-2526, the gateway router G1 2510 updates its table to produce a table 2700 as illustrated by FIG. 27. Because the spoke S2 2535 connects to hub router H3 2524 and hub router H4 2526, the hub routers H3 2524 and H4 2526 notify the gateway router G1 2510 of the spoke S2 2535. The gateway router again updates its table and produces the table 2800 as illustrated by FIG. 28.

Since spoke S2 2535 is not directly connected to gateway router G1 2510, a connection value of 10 is used to represent reachability to spoke S2 2535. The gateway router G1 2510 can get spoke S2 2535's prefixes either from hub router H3 2524 or hub router H4 2526. Since both hub router H3 2524 and hub router H4 2526 are connected to gateway router 2510 and spoke S2 2535, one of hub router H3 2524 and hub router H4 2526 is designated to send the prefixes and subsequent updates of spoke S2 2535, according to some embodiments. When the designated transit point goes down, in some embodiments, then the next available transit point is chosen to send prefixes and updates of spoke S2 2535. Designation logic is left to low-level implementation, in some embodiments.

The gateway router G1 2510 gets spoke S2 2535's prefixes by requesting hub router H3 2524 or hub router H4 2526 to send spoke S2 2535's prefixes. The spoke S2 2535's prefixes are sent to gateway router G1 2510 with spoke S2 2535 marked as the owner of the prefix. The gateway router G1 2510 iterates through the table 2800 every time the table is updated to send updated prefixes to the nodes that are connected directly.

The prefix update flow based on the table 2800 is as follows. The gateway router G1 2510 starts at column 1, row 1 of the table 2800. The gateway router G1 2510 sends prefixes of hub router H1 2520 and hub router H2 2522 to the spoke S1 2530 with hub router H1 2520 and hub router H2 2522 as the next hop, respectively. The gateway router G1 2510 then moves to hub router H1 2520's row to determine the spoke that hub router H1 2520 is connected to. As the prefixes for hub router H1 2520 have already been sent to the spoke S1 2530, the gateway router G1 2510 moves on and determines H3 2524 is connected. As such, the gateway router G1 2510 sends the prefixes of H3 2524 with H1 2520 and H2 2522 as next hop. The gateway router G1 2510 then sends prefixes of H4 2526 with H1 2520 and H2 2522 as next hop.

The gateway router G1 2510 then moves to the rows for H3 2524 and H4 2526 to determine the nodes that H3 and H4 are connected to because H3 and H4 are directly connected with G1. The gateway router 2510 determines that H3 and H4 are connected to S2 2535. The gateway router G1 2510 then sends prefixes of S2 2535 to S1 2530 with H1 2520 and H2 2522 as next hop (i.e., because S1 2530 is only directly connected to H1 2520 and H2 2522).

Next, the gateway router G1 2510 moves to column 1, row 2 of the table 2800 and sends prefixes of S1 2530, H3 2524, and H4 2526 to H1 2520. The prefixes for H2 2522 are not send to H1 2520 because, as illustrated in the topology 2500, H1 and H2 do not have any reachability. The gateway router G1 2510 then skips S1's row, and moves to the rows for H3 and H4. Because S2 2535 is connected via H3 2524 and H4 2526, the gateway router G1 2510 moves to S2's row and sends the prefixes for S2 2535 to H1 2520 with H3 2524 and H4 2526 as next hop. The gateway router G1 2510 then repeats these steps for H2 2522 and sends prefixes of S1

2530, H3 2524, and H4 2526 to H2 2522, and subsequently sends S2 2535's prefix to H2 2522 with H3 2524 and H4 2526 as next hop.

Figure 29:
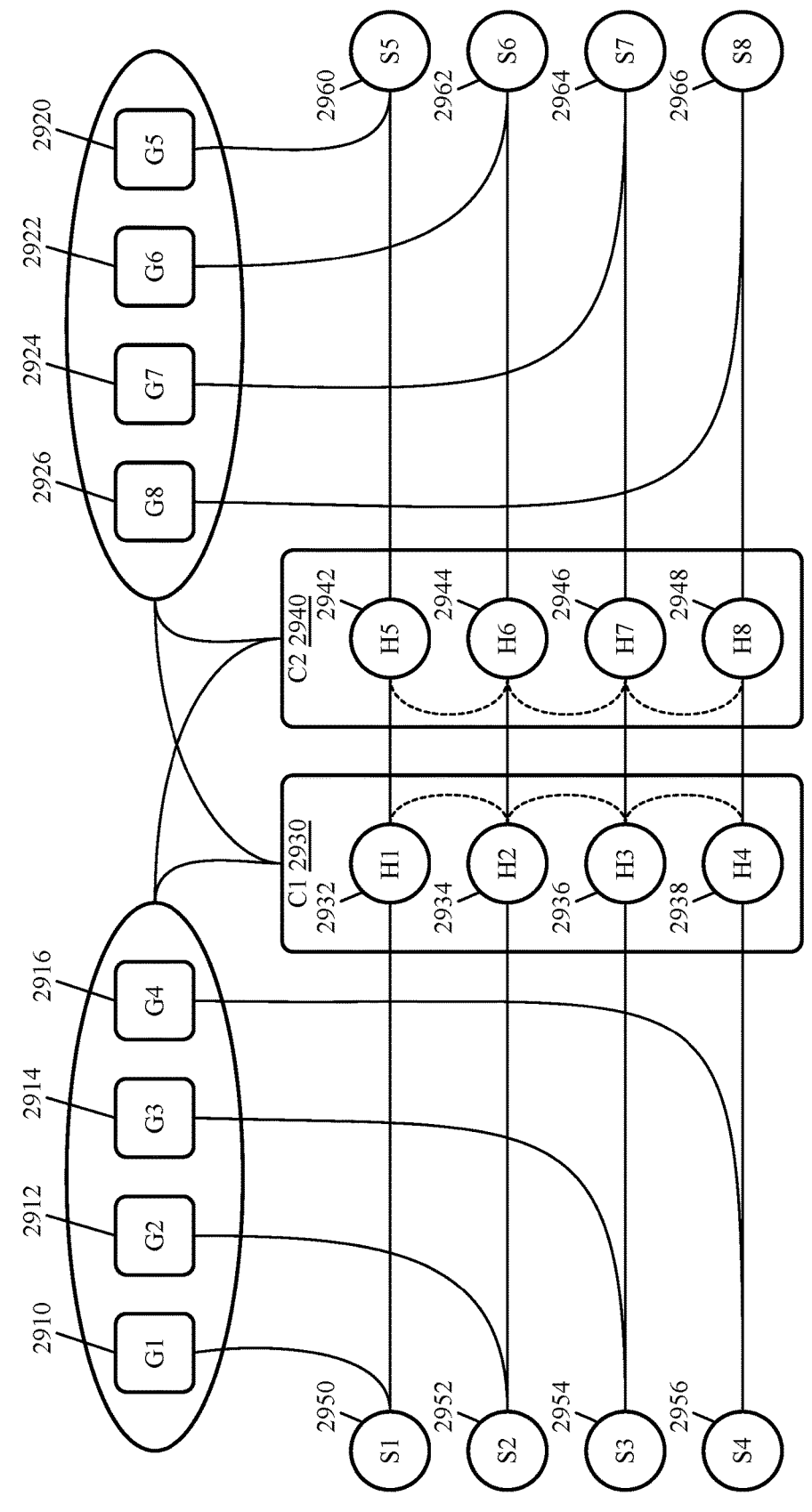
FIG. 29 conceptually illustrates a fourth example scenario of some embodiments of a topology that includes interconnecting clusters.

FIG. 29 conceptually illustrates a fourth example scenario of some embodiments of a topology 2900 that includes interconnecting clusters. As shown, the topology 2900 includes multiple gateway routers (e.g., G1 2910, G2 2912, G3 2914, G4 2916, G5 2920, G6 2922, G7 2924, and G8 2926), a hub router cluster C1 2930, a hub router cluster C2 2940, and multiple spokes (e.g., S1 2950, S2 2952, S3 2954, S4 2956, S5 2960, S6 2962, S7 2964, and S8 2966) each representing one or more sites. The hub router cluster C1 2930 includes members H1 2932, H2 2934, H3 2936, and H4 2938. The hub router cluster C2 2940 includes members H5 2942, H6 2944, H7 2946, and H8 2948.

Each spoke 2950-2956 is directly connected to a corresponding hub router 2932-2938 in the hub router cluster C1 2930, and each spoke 2960-2966 is directly connected to a corresponding hub router 2942-2948 in the hub router cluster C2 2940. For instance, spoke S2 2952 is directly connected to hub router H2 2934, and spoke S5 2960 is directly connected to hub router H5 2942. Additionally, each gateway router 2910-2916 and 2920-2926 is a common gateway for a respective connected hub-spoke pair. For example, gateway router G1 2910 is a common gateway for hub router H1 2932 and spoke S1 2950, while gateway router G7 2924 is a common gateway for hub router H7 2946 and spoke S7 2964.

In order to avoid sending redundant routes to the gateway routers 2910-2916 and 2920-2926, cluster members within each cluster use a form of route filtering, in some embodiments. The cluster members of some embodiments, for example, distribute prefixes to their fellow cluster members on the underlay network by adding an extended community string associated with the cluster as an indicator that the distributed prefixes should not be announced to the gateway routers. The extended community string is only used when sending prefixes between cluster members, and is not added to prefixes that are announced to the gateway routers.

For example, the hub routers 2932-2938 of hub router cluster C1 2930 redistribute prefixes to other members of the hub router cluster C1 2930 on the underlay with an extended community string "C1". The members of hub router cluster C1 2930 learn prefixes from the underlay and do not announce the prefixes received with the extended community string "C1" to the gateway routers. Similarly, the hub routers 2942-2948 of the hub router cluster C2 2940 redistribute prefixes to other members of the hub router cluster C2 2940 on the underlay network with an extended community string "C2". The members of hub router cluster C2 2940 learn prefixes from the underlay and do not announce the prefixes received with the extended community string "C2" to the gateway routers.

Figure 30:
FIG. 30 illustrates an example of a connection table of some embodiments generated by a gateway router of the topology illustrated by FIG. 29.

When the spokes 2950-2956 establish connections to their respective hub routers 2932-2938 of the hub router cluster C1 2930, each member notifies the gateway routers 2910-2916 and 2920-2926 of the spokes. Additionally, when connections are established between hub routers 2932-2938 of cluster C1 2930 and hub routers 2942-2948 of cluster C2 2940, the hub routers 2932-2938 of cluster C1 2930 notify the gateway routers 2910-2916 and 2920-2926 of the hub routers 2942-2948. The hub routers 2942-2948 of cluster C2 2940 also notify the gateway routers 2910-2916 and 2920-2926 when their respective spokes 2960-2966 establish connections, and notify the gateway routers 2910-2916 and 2920-2926 when the connections are established with the hub routers 2932-2938 of cluster C1 2930. The gateway routers 2910-2916 and 2920-2926 send prefixes according to a reachability matrix to nodes (i.e., hub routers and spokes) with next-hops set based on connectivity. FIG. 30 illustrates an example of a connection table 3000 of some embodiments generated by a gateway router (e.g., G1 2910) for the topology 2900.

In some embodiments, as described above, clusters are used as transit points. Each hub cluster, in some embodiments, is a logical entity composed of more than one hub and allows for more than 4,000 edges to connect to a cluster. In some embodiments, clusters interconnecting with other clusters can have different numbers of hub members in each cluster, requiring a need for a deterministic way of establishing overlays between clusters, according to some embodiments. Interconnecting clusters of some embodiments exhibit a set of properties for optimal performance, resiliency, and availability.

A first property of interconnecting clusters, in some embodiments, is that every cluster member has at least one association with the other cluster to which interconnect is enabled. In some embodiments, a second property of interconnecting clusters is that a minimum number of associations is greater than or equal to a maximum number of hub members in the participating clusters. For example, where A is the number of associations between clusters, N1 is the number of hub members in a cluster C1, and N2 is the number of hub members in cluster C2, A is greater than or equal to the maximum of N1 and N2 (i.e., A>=max(N1, N2)).

In some embodiments, an association between clusters is defined as the presence of overlay(s) between two hub members of participating clusters. Gateway routers of some embodiments track certain attributes of participating clusters. Examples of such attributes include the number of members in a cluster, the number of associations between clusters, and who are initiators and responders.

Overlay assignment logic, in some embodiments, begins with obtaining the number of members in participating clusters. Next, the cluster with the maximum number of members is designated as the initiator. When there are the same number of members in each cluster, the initiator cluster is selected using a logical identifier tiebreaker, in some embodiments. Once the initiator has been designated, some embodiments then select the same number of members from the participating clusters (e.g., select 5 members from each cluster). Selected members are then assigned, in some embodiments, to build one-to-one associations between the selected members. Next, some embodiments iterate through the hub members list of the responder cluster and assign these members to initiator cluster members that need assignment. New members joining later will become initiators, according to some embodiments, and will be assigned a responder. Responders with fewer numbers of cluster-to-cluster overlays are preferred over responders with more cluster-to-cluster overlays, in some embodiments. The responder with highest logical identifier in the list is chosen, in some embodiments, when all responders have identical number of cluster-to-cluster overlays.

Figure 31:
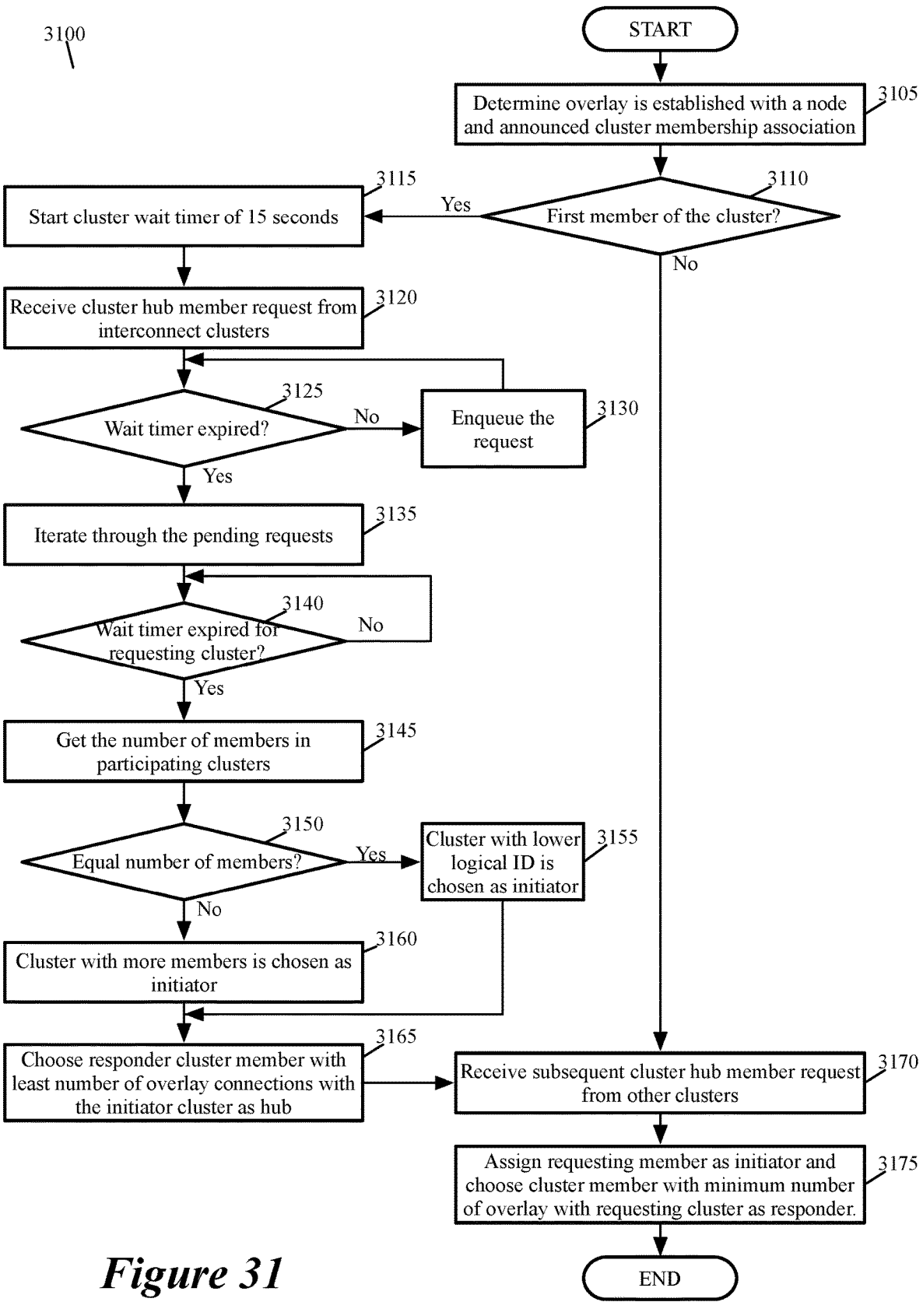
FIG. 31 conceptually illustrates a process of some embodiments for cluster hub assignment on a gateway router.

FIG. 31 conceptually illustrates a process 3100 of some embodiments for cluster hub assignment on a gateway router. The process 3100 starts by determining (at 3105) that an overlay connection has been established with a node that has announced its cluster membership association.

The process 3100 determines (at 3110) whether the announcing node is the first member of the cluster. When the announcing node is not the first member of the cluster, the process 3100 transitions to receive (at 3170) subsequent cluster hub member requests from other clusters. Otherwise, when the announcing node is the first member of the cluster, the process 3100 transitions to start (at 3115) a wait timer of 15 seconds. The process 3100 then receives (at 3120) a cluster hub member request from interconnected clusters.

The process 3100 determines (at 3125) whether the wait time has expired. When the wait time has not expired, the process 3100 transitions to enqueue (at 3130) the request, and the process 3100 then returns to 3125. When the wait timer has expired, the process 3100 transitions to iterate (at 3135) through the pending requests (i.e., that have been enqueued at 3130) and determines (at 3140) whether the wait time has expired for the requesting cluster. Once the wait time has expired, the process transitions to get (at 3145) the number of members in each participating cluster.

The process 3100 determines (at 3150) whether there is an equal number of members in each cluster. When there is an equal number, the process 3100 transitions to designate (at 3155) the cluster having the lower logical identifier as the initiator, while the cluster having the higher logical identifier is designated as the responder. The process 3100 then transitions to 3165. Otherwise, when the clusters do not have equal numbers of members, the process 3100 transitions to designate (at 3160) the cluster having more members as the initiator, while the cluster having fewer members is designated as the responder.

The process 3100 chooses (at 3165) the responder cluster member having the least number of overlay connections with the initiator cluster as a hub. The process 3100 then receives (at 3170) subsequent hub member requests from other clusters. Finally, the process 3100 assigns (at 3175) the requesting member as initiator and selects the cluster member with the minimum number of overlay connections with the requesting cluster as the responder. Following 3175, the process 3100 ends.

In some embodiments, the default behavior for branches to identify clusters is through cluster identifiers, while clusters identify branches by their logical identifiers. Interconnecting clusters, in some embodiments, see and identify cluster members by the member logical identifiers while establishing overlays regardless of their role being initiators or responders. Identification of individual cluster members is essential for functionalities like business policies, firewall, lookups (e.g., PR, peer, routes) to work properly, according to some embodiments. A translation table to translate member identifiers to cluster identifiers and vice versa is used, in some embodiments, by cluster members. In some embodiments, users continue to see cluster identifiers only on network management and control systems. For example, a cluster "C1" of some embodiments can have business policies configured to backhaul flows to a cluster "C2", and the cluster "C1" internally uses the translation table to find the corresponding cluster member and apply business policies.

Figure 32:
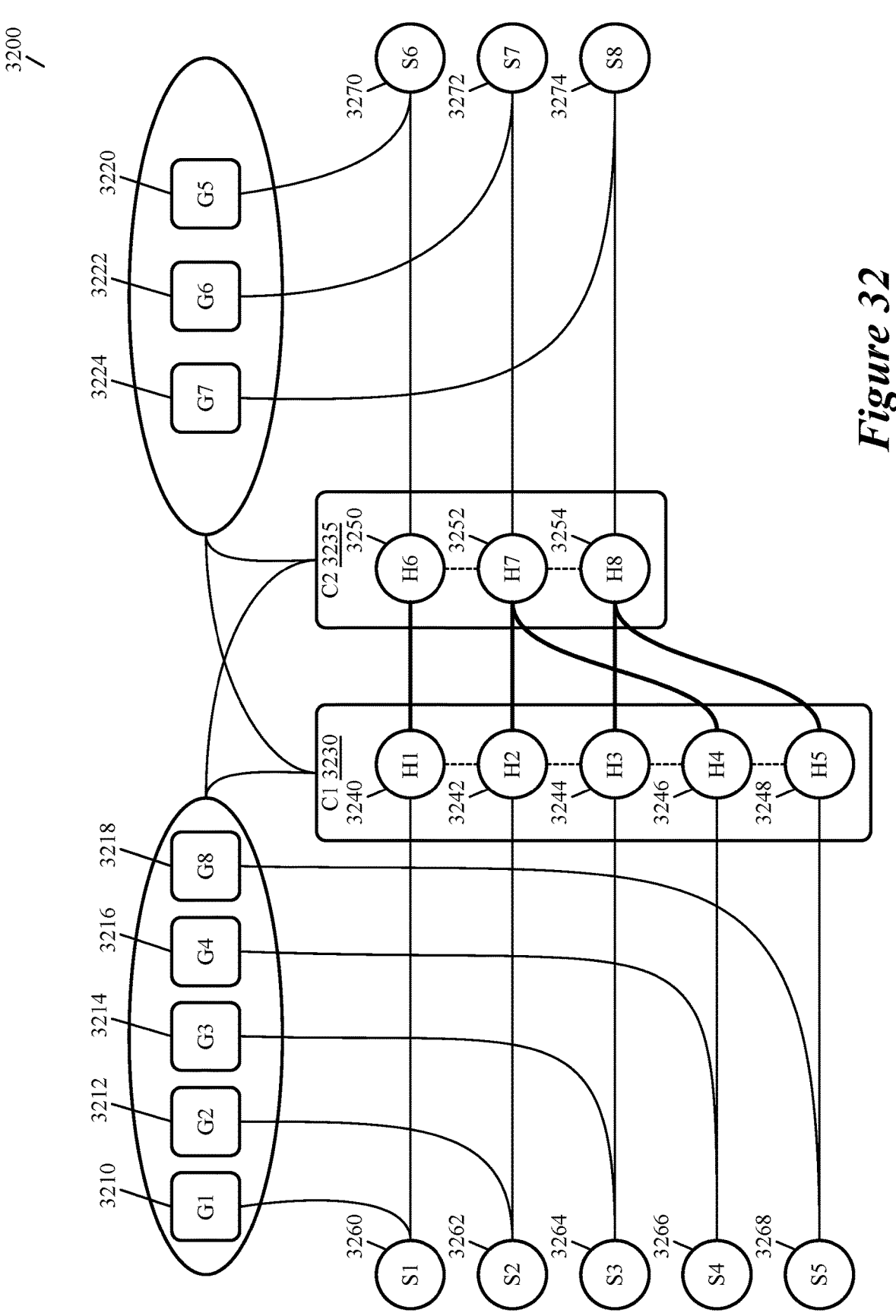
FIG. 32 conceptually illustrates a topology diagram of some embodiments in which hub router clusters that have different numbers of members are interconnected.

FIG. 32 conceptually illustrates a topology diagram 3200 of some embodiments in which hub router clusters that have different numbers of members are interconnected. As shown, the diagram 3200 includes multiple route reflectors (e.g., G1 3210, G2 3212, G3 3214, G4 3216, G8 3218, G5 3220, G6 3222, and G7 3224), a first cluster C1 3230 with multiple hub routers (e.g., H1 3240, H2 3242, H3 3244, H4 3246, and H5 3248), a second cluster C2 3235 with multiple hub routers (e.g., H6 3250, H7 3252, and H8 3254), and multiple edge routers (e.g., S1 3260, S2 3262, S3 3264, S4 3266, S5 3268, S6 3270, S7 3272, and S8 3274). Each of the edge routers 3260-3274 represents a set of one or more edge routers located one or more sites. Each of the route reflectors 3210-3224 is connected to a respective edge router (or set of edge routers) 3260-3274, as illustrated. Additionally, each of the route reflectors 3210-3224 is connected to each of the hub router clusters C1 3230 and C2 3235.

In this example, hub router H1 3240 of cluster C1 3230 is connected to the set of edge routers S1 3260, hub router H2 3242 of cluster C1 3230 is connected to the set of edge routers S2 3262, hub router H3 3244 of the cluster C1 3230 is connected to the set of edge routers S3 3264, hub router H4 3246 of the cluster C1 3230 is connected to the set of edge routers S4 3266, and hub router H5 3248 of the cluster C1 3230 is connected to the set of edge routers S5 3268. Additionally, the hub router H6 3250 of the cluster C2 3235 is connected to the set of edge routers S6 3270, the hub router H7 3252 of the cluster C2 3235 is connected to the set of edge routers S7 3272, and the hub router H8 3254 of the cluster C2 3235 is connected to the set of edge routers S8 3274.

As described above, when interconnecting clusters have different numbers of members, for each hub router in the cluster with fewer members, a corresponding amount of hub routers is selected from the cluster with a greater number of members, and one-to-one associations are created between the hub routers in the smaller cluster and the selected hub routers in the larger cluster. For the remaining hub routers of the larger cluster, the smaller cluster (i.e., the responder cluster) is iterated through to assign hub routers having the fewest number of connections to the remaining members of the larger cluster (i.e., the initiator cluster) until each hub router of each cluster has established a connection with at least one other hub router of the other cluster.

For example, the cluster C1 3230 in the diagram 3200 includes five (5) hub routers, while the cluster C2 3235 includes three (3) hub routers. As such, three hub routers 3240-3244 are selected from the cluster C1 3230, and one-to-one associations are created between the hub routers 3240-3244 of cluster C1 3230 and hub routers 3250-3254 of cluster C2 3235. As illustrated, hub router H1 3240 of cluster C1 3230 is connected to hub router H6 3250 of cluster C2 3235, hub router H2 3242 of cluster C1 3230 is connected to hub router H7 3252 of cluster C2 3235, and hub router H3 3244 of cluster C1 3230 is connected to hub router H8 3254 of cluster C2 3235.

For the remaining hub routers H4 3246 and H5 3248 of the cluster C1 3230, the hub routers 3250-3254 of cluster C2 3235 are iterated through and assigned to hub routers H4 3246 and H5 3248. As shown, hub router H4 3246 of cluster C1 3230 is connected to hub router H7 3252 of cluster C2 3235, and hub router H5 3248 of cluster C1 3230 is connected to hub router H8 3254 of cluster C2 3235. As such, hub routers H7 3252 and H8 3254 of cluster C2 3235 each have two connections to two respective hub routers of the cluster C1 3230. In embodiments where one cluster has significantly more hub routers than the other, the hub routers of the smaller cluster are iterated through until all hub routers of the larger cluster have been assigned to hub routers of the smaller cluster to ensure each hub router in the smaller cluster has as few connections as possible.

The hub routers H7 3252 and H8 3254 of the cluster C2 3235 notify the route reflectors 3210-3218 and 3220-3224 of their connections to each hub router in the cluster C1 3230, which, in turn, notify each other hub router in both of the clusters C1 3230 and C2 3235. As a result, the other hub routers in cluster C1 3230 can use either hub router H2 3242 or H4 3246 to reach edge routers S7 3272 via the hub router H7 3252 in the cluster C2 3235, and can use either hub router H3 3244 or H5 3248 to reach edge routers S8 3274 via the hub router H8 3254 of cluster C2 3235.

In some embodiments, since all prefixes are announced with the originator's identifier (i.e., the identifier of the owner of the prefix), dynamic edge-to-edge across multiple regions is made possible. Peer-conn notifications distributed to nodes (e.g., gateways or route reflectors, hub routers, edge routers) carry endpoint information (e.g., number of private links and their network addresses, and number of public links and their addresses) along with profile configurations and VPN configurations. The endpoint information, profile configurations, and VPN configurations included in each peer-conn message allow both dynamic edge-to-edge and profile isolation (e.g., as described above by reference to FIG. 16) to be possible, in some embodiments.

The profile configurations, in some embodiments, are configurations defined for hosts and can be applied to all or some hosts in a cluster or network to ensure consistency in configurations from host-to-host. The VPN configurations of some embodiments can include route-based VPN configurations, policy-based VPN configurations, and layer 2 (L2) A VPN configurations. In some embodiments, route-based VPN configurations create an IPsec tunnel interface and route traffic through it as dictated by a routing table (e.g., SDDC (software-defined datacenter) routing table). Policy-based VPN configurations, in some embodiments, create an IPsec tunnel and a policy that specifies how traffic uses the IPsec tunnel. Lastly, L2 A VPN configurations extend an on-premises network to multiple VLAN-based networks that can be extended with different tunnel identifiers on the same L2VPN tunnel, according to some embodiments. The endpoint information, profile configurations, and VPN configurations included in each peer-conn message allow both dynamic edge-to-edge and profile isolation to be possible, in some embodiments.

Figure 33:
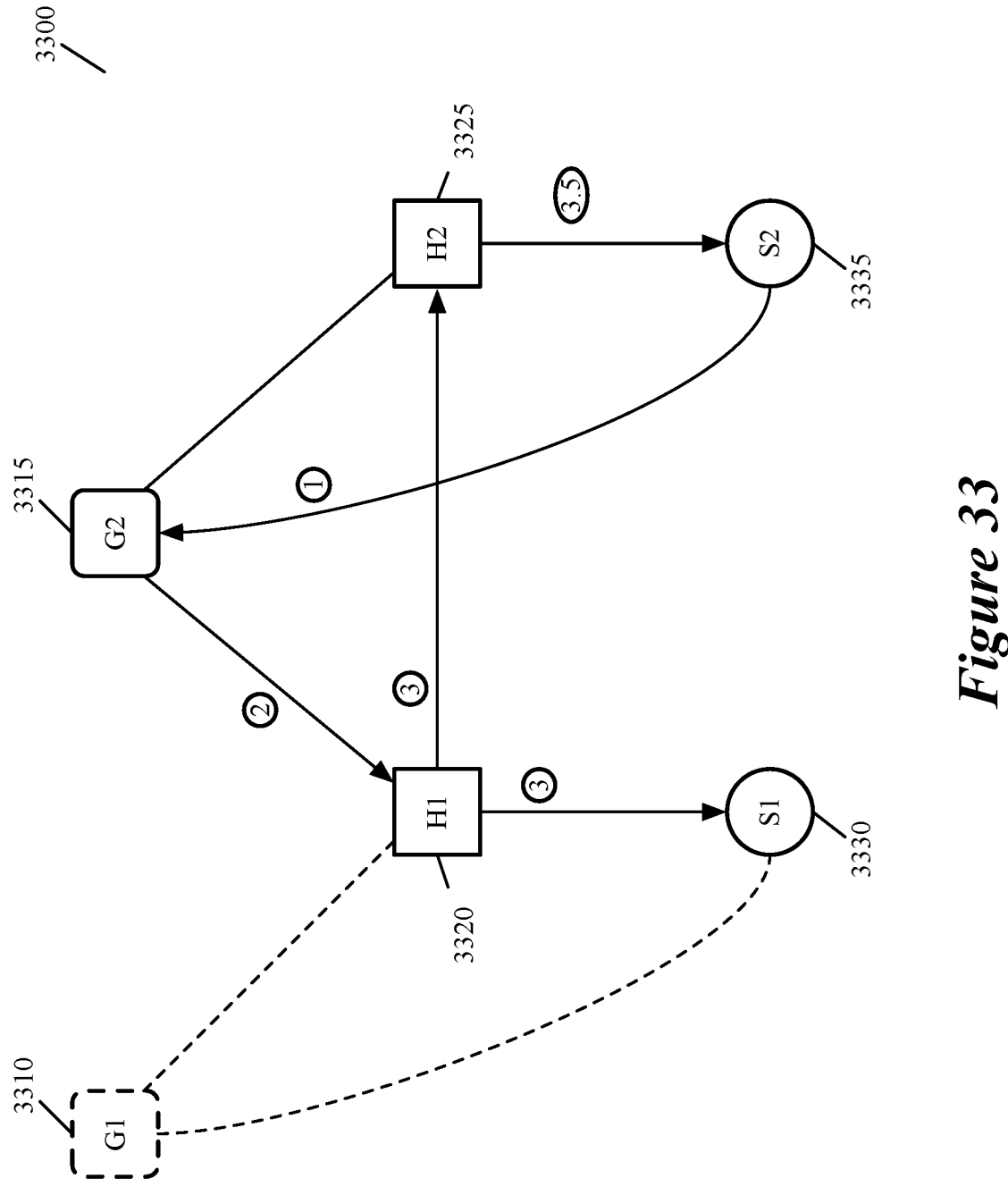
FIG. 33 conceptually illustrates a diagram of some embodiments showing a workflow to achieve dynamic edge-to-edge support.

FIG. 33 conceptually illustrates a diagram 3300 of some embodiments showing a workflow to achieve dynamic edge-to-edge support. As shown, the diagram 3300 includes gateway routers (i.e., route reflectors) G1 3310 and G2 3315, hub routers H1 3320 and H2 3325, and edge routers, or sets of edge routers, S1 3330 and S2 3335. The gateway router G1 3310 is connected to hub router H1 3320 and edge router(s) S1 3330, and the gateway router G2 3315 is connected to hub routers H1 3320 and H2 3325, and to edge router S2 3335. Additionally, hub router H1 3320 is connected to hub router H2 3325.

In some embodiments, to achieve dynamic edge-to-edge, endpoint information is propagated to indirectly connected gateway routers. For example, a destination node of some embodiments is multiple hops away from a node from which an endpoint information request originates, and their nodes do not have a common gateway router. To start, a gateway router receives an endpoint information request, and determines whether the specified destination has a direct connection to the gateway router. For instance, in the diagram 3300, the gateway router G2 3315 receives (at the encircled 1) a request from edge router S2 3335 for endpoint information of edge router S1 3330. When there is no direct connection, the gateway router creates a new control message of type "MH_E2E_INFO_REQUEST" and embeds the requesting node's endpoint information. The gateway router then performs a lookup in its SoR table to identify the transit node for the specified destination.

A new DE2E hash table is maintained with a list of subscribers per-destination. The list of destinations requested by a node is maintained in the PI of the node, according to some embodiments. This is used to clean up the DE2E table entries when the PI is going down, in some embodiments, by iterating the list and performing a lookup in the DE2E hash table and removing the node from the subscribers list, as opposed to iterating the complete DE2E hash table. The requesting node is inserted into the DE2E information subscribers list, and the request is then relayed by the gateway router to the identified transit node. For example, at the encircled 2, the gateway router G2 3315 sends the request to the hub router H1 3320.

When the identified transit node receives the request, the transit node repeats the above-described steps if the destination is not directly connected to the transit node. Otherwise, if the destination is directly connected to the transit node, then the transit node forwards the endpoint information included in the request to the destination, and also creates a response with the endpoint information of the destination and replies to all subscribers included in the DE2E table entry. Doing so, in some embodiments, ensures that the originating node (i.e., the node that initially sent the endpoint information request) will receive the endpoint information of the destination. The hub router H1 3320, for instance, forwards the endpoint information (at each encircled 3) of edge router S1 3330 to hub router H2 3325 for further forwarding to edge router S2 3335 (at the encircled 3.5), and also sends endpoint information of edge router S2 3335 to edge router S1 3330.

In some embodiments, when subsequent endpoint information request on the transit points is received, DE2E table lookups are performed, and responses are sent upon finding the corresponding entries. A special request only flag is sent in some embodiments and the request is relayed to the destination. When the transit node connected to the destination receives the request, the endpoint information of the originating node present in the request is sent to destination and there is no response sent toward the originating node. The DE2E entry is removed once the response is sent to all subscribers, in some embodiments, or as part of periodic stale time every 60 seconds.

Once the edge router S2 3335 receives endpoint information of edge router S1 3330, the edge router S2 3335 can establish the dynamic edge-to-edge connection. This dynamic edge-to-edge connection, flows from the edge router S2 3335 to hub router H2 3325 on an overlay network connection, from hub router H2 3325 to hub router H1 3320 on an underlay network connection, and from hub router H1 3320 to edge router S1 3330 on an overlay network connection. In embodiments where additional hops (e.g., additional hub routers) exist between the hub routers H1 3320 and H2 3325, each additional hop uses an underlay network connection, such that the only overlay connections used are between the source and destination edge routers and their closest hub routers.

FIG. 34 conceptually illustrates a topology 3400 of some embodiments in which sites within a region are summarized under a single prefix. In some embodiments, route summarization is also referred to as route aggregation. Summarized, or aggregated, routes represent aggregates of routes of multiple routers of a region under a single prefix/route. By utilizing route summarization, some embodiments are able to save on memory (e.g., due to smaller routing tables), send smaller packets when advertising routes (e.g., due to fewer routes being advertised), and save on bandwidth.

In some embodiments, for instance, a particular region that includes fifty (50) edge routers would require 50 specific lines in any update packets, which expands the packet size and increases bandwidth utilization. When using route summarization, only one line is needed for the summarized route that represents all 50 routes. Additionally, route summarization reduces the amount of time and CPU cycles required to perform routing table lookups (i.e., due to the reduced number of routes in the routing table), according to some embodiments.

As shown, the topology 3400 includes gateway routers G1 3410 and G2 3415, hub routers H1 3420 and H2 3425, spokes S1 3430 and S2 3435 in a first region R1 3450, and spokes S3 3440 and S4 3445 in a second region R2 3455. Each hub router H1 3420 and H2 3425 is connected to each of the gateway routers G1 3410 and G2 3415, as well as each of the spokes S1 3430, S2 3435, S3 3440, and S4 3445 in each region 3450-3455, as shown. Additionally, the gateway routers G1 3410 and G2 3415 are connected to each of the spokes S1 3430, S2 3435, S3 3440, and S4 3445 in each region 3450-3455.

In this example, the hub router H1 3420 is a first order transit point for the first region R1 3450 and a second order transit point for the second region R2 3455, while the hub router H2 3425 is a first order transit point for the second region R2 3455 and a second order transit point for the first region R1 3450. That is, the spokes S1 3430 and S2 3435 of region R1 3450 use hub router H1 3420 as a next-hop to reach other sites, and the spokes S3 3440 and S4 3445 of region R2 use hub router H2 3425 as a next-hop to reach other sites.

Assuming each spoke S1 3430, S2 3435, S3 3440, and S4 3445 has summarization and edge-to-edge enabled, the workflow for the topology 3400 is as follows. First, hub routers H1 3420 and H2 3425 install prefixes of all spokes S1 3430, S2 3435, S3 3440, and S4 3445 in discrete form. Both hub routers H1 3420 and H2 3425 then notify the gateway routers G1 3410 and G2 3415 of spokes S1 3430, S2 3435, S3 3440, and S4 3445 when the spokes connect to the hub routers H1 3420 and H2 3425.

Based on the configuration, gateway routers G1 3410 and G2 3415 send summarized prefixes to spokes S1 3430, S2 3435, S3 3440, and S4 3445. Summarized prefixes, in some embodiments, are only sent to spokes (e.g., edge routers at branch sites) that have connections to all configured transit points (i.e., are connected to both hub routers H1 3420 and H2 3425). For spokes that do not have connections to all configured transit points, discrete prefixes are sent.

Figure 35:
FIG. 35 conceptually illustrates a connection table of some embodiments generated by a gateway router of the topology illustrated by FIG. 34.

Spokes S1 3430, S2 3435, S3 3440, and S4 3445 install the summarized prefixes with H1 3420 and H2 3425 as next hops according to the order in configuration (i.e., first order transit or second order transit). When the hub router H1 3420 is the primary hub router (i.e., first order transit) for reaching the spokes S3 3440 and S4 3445 in the region R2 3455, the spokes S1 3430 and S2 3435 in the region R1 3450 install the summarized prefixes for R2 3455 with H1 3420 as the next hop. Similarly, when hub router H2 3425 is the primary hub router (i.e., first order transit) for reaching the spokes S1 3430 and S2 3435 in the region R1 3450, the spokes S3 3440 and S4 3445 in the region R2 3455 install the summarized prefixes for R1 3450 with H2 3425 as the next hop. FIG. 35 conceptually illustrates a connection table 3500 of some embodiments generated by a gateway router (e.g., G1 3410) for the topology 3400.

Figure 36:
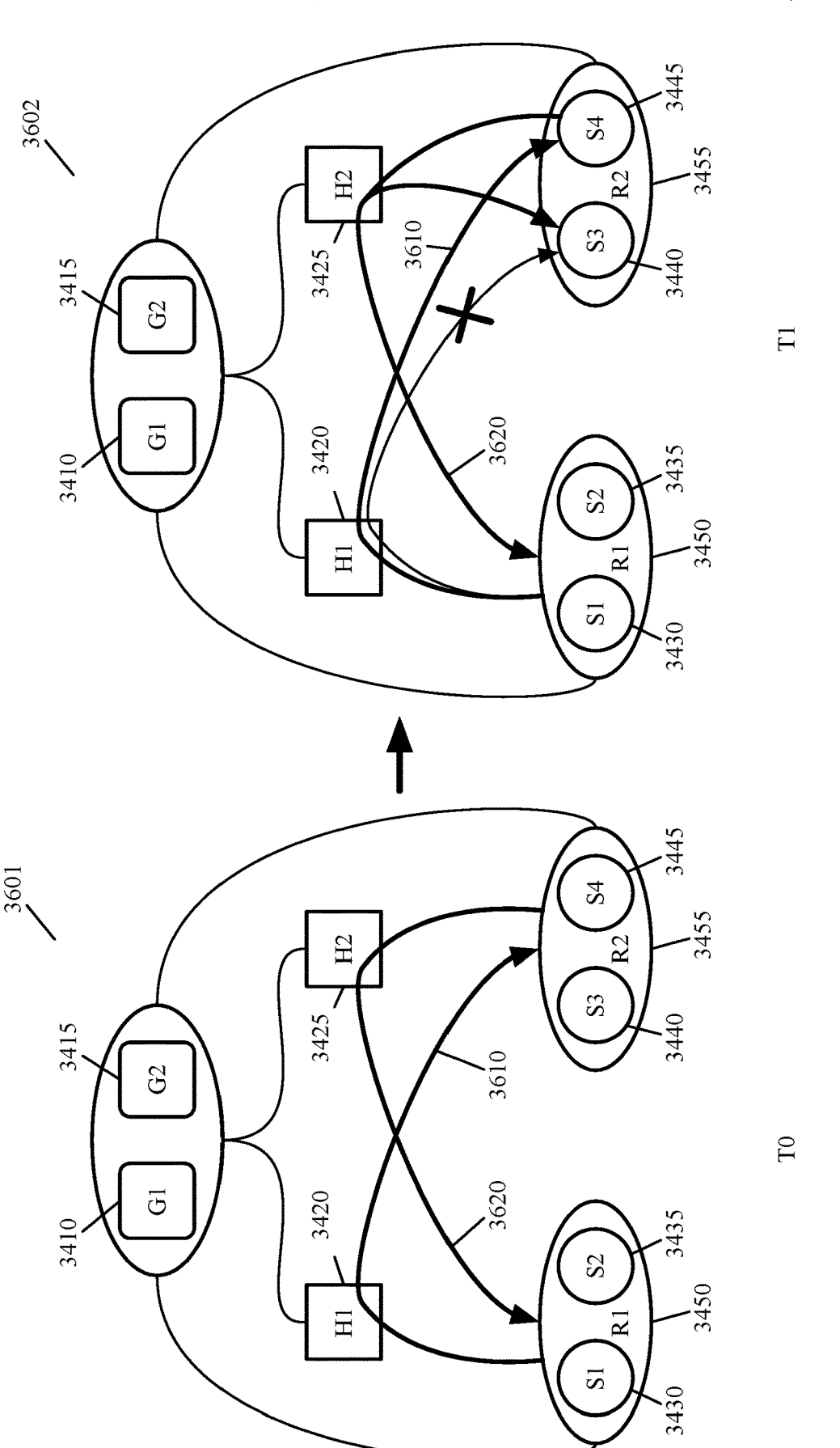
FIG. 36 conceptually illustrates the topology of FIG. 34 at time T0 and time T1 after a spoke loses connectivity to one of the hub routers.

In some embodiments, when a spoke loses connectivity to a hub router, the hub router notifies the gateway routers, which send the identified spoke's prefixes (i.e., as opposed to the summarized prefixes) to all other spokes, with the still-connected hub router identified as the next hop. For example, FIG. 36 conceptually illustrates a topology 3400 at time TO when all spokes have connectivity to all hub routers, and time T1 after a spoke loses connectivity to one of the hub routers.

As shown, in the topology at time T0 3601, all spokes S1 3430, S2 3435, S3 3440, and S4 3445 are connected to both hub routers H1 3420 and H2 3425. When the spokes S1 3430 and S2 3435 are the initiators of communications, the spokes S1 3430 and S2 3435 in region R1 3450 use route 3610 through hub router H1 3420 to reach spokes S3 3440 and S4 3445 in region R2 3455. When the spokes S3 3440 and S4 3445 are the initiators of the communications, the spokes S3 3440 and S4 3445 in region R2 3455 use route 3620 through hub router H2 3425 to reach spokes S1 3430 and S2 3435 in region R1 3450.

The connections between the spokes S1 3430, S2 3435, S3 3440, and S4 3445 and the hub routers H1 3420 and H2 3425 are active connections, regardless of the designations of the hub routers as primary or secondary hub routers for the spokes. As such, when any of the spokes S1 3430 or S2 3435 receive communications initiated by either of the spokes S3 3440 and S4 3445 via the hub router H2 3425, the spokes S1 3430 and S2 3435 use the hub router 3425 to respond to the spokes S3 3440 and S4 3445. Similarly, when any of the spokes S3 3440 and S4 3445 receive communications initiated by either of the spokes S3 3430 or S4 3435 via the hub router H1 3420, the spokes S3 3440 and S4 3445 use the hub router H1 3420 to respond to the spokes S1 3430 or S2 3435.

Between times T0 and T1, spoke S3 3440 loses connectivity to hub router H1 3420. As a result, the hub router H1 3420 sends a "not-reachable-to-S3" notification to gateway routers G1 3410 and G2 3415. In response to receiving the notification, since spoke S3 3440 has lost connectivity to one of the configured transit points (i.e., hub router H1 3420), the gateway routers G1 3410 and G2 3415 send prefixes of spoke S3 3440 to all other spokes.

Following the distribution of the prefixes of spoke S3 3440, spokes S1 3430 and S2 3435 of region R1 3450 use route 3620 through their second order transit point hub router H2 3425 to reach spoke S3 3440. The spokes S1 3430 and S2 3435 of region R1 3450 continue to use the route 3610 through hub router H1 3420 to reach the spoke S4 3445 in region R2 3455 based on the region prefix. Once the connection from spoke S3 3440 to hub router H1 3420 is restored, discrete prefixes of spoke S3 3440 are pulled from other spokes, and the summarized route (i.e., route 3610 from spokes of R1 3450 through hub router H1 3420) will take over.

Figure 37:
FIG. 37 conceptually illustrates a topology of some embodiments in which an asymmetric routing resolution is implemented for interconnecting clusters.

In some embodiments, cluster members that redistribute prefixes of directly connected nodes become the default exit for other members in the cluster to reach the nodes, leading to asymmetric routes between nodes connected to the clusters. FIG. 37 conceptually illustrates a topology 3700 of some embodiments in which an asymmetric routing resolution is implemented for interconnecting clusters.

As shown, the topology 3700 includes two gateway routers G1 3710 and G2 3715, multiple spokes (e.g., S1 3750, S2 3752, S3 3754, S4 3760, S5 3762, and S6 3764), and two hub router clusters C1 3770 and C2 3775. The hub router cluster C1 3770 includes hub routers H1 3730, H2 3732, and H3 3734, while the hub router cluster C2 3775 includes hub routers H4 3740, H5 3742, and H6 3744. Each spoke in the topology 3700 is connected to a hub router of either cluster C1 3770 or C2 3775, as illustrated. For instance, spoke S1 3750 is connected to hub router H1 3730 of cluster C1 3770. Each cluster C1 3770 and C2 3775 is also connected to each gateway router G1 3710 and G2 3715. Additionally, each member of cluster C1 3770 is connected to at least one member of hub cluster C2 3775.

As mentioned above, asymmetric routes are caused in topologies such as the topology 3700 as a result of cluster members that redistribute prefixes of directly connected nodes becoming the default exit for other members in the cluster to reach the nodes. That is, because H3 3734 redistributes the prefixes for S3 3754, H3 becomes the exit for members of each cluster C1 3770 and C2 3775 to reach S3 3754. Because H3 3734 is directly connected to H6 3744 of cluster C2 3775, H6 3744 becomes the exit for H4 3740 and H5 3742 of cluster C2 3775 to reach S3 3754. Similarly, H4 3740 of cluster C2 3775 and H1 3730 of cluster C1 3770 are the exits to reach S4 3760 in clusters C1 3770 and C2 3775, respectively.

As such, a flow from spoke S3 3754 to spoke S4 3760 traverses default route 3780 from the spoke S3 3754 to its directly connected hub router H3 3734 of cluster C1 3770, through hub router H2 3732, to hub router H1 3730, across an overlay connection to hub router H4 3740 of cluster C2 3775, and finally to the spoke S4 3760 which is directly connected to H4 3740. However, a return flow from spoke S4 3760 to spoke S3 3754 follows default return route 3785, which is asymmetric to route 3780. Symmetry is preferred, in some embodiments over asymmetry in cases such as where certain processes and/or policies are enabled. Examples of such policies and processes, in some embodiments, can include stateful firewall processing, intrusion detection policies, intrusion prevention policies, traffic shaping policies, monitoring policies, and resource allocation policies, backhaul policies, debugging, etc.

To resolve the asymmetry inherent to the topology 3700, some embodiments create inbound overlay default routes (IODRs). IODRs are secure default routes that are created for every secure association with hub routers or gateway routers. The IODR is associated with flows received on secure overlays matching the default cloud route/underlay route, in some embodiments. The IODR indicates the sender (e.g., S3 3754) has a valid route pointing to the receiver, but the receiver does not have a corresponding overlay route for the source, according to some embodiments. The IODR of some embodiments is assigned to inbound flows only when the flow comes on secure overlays and the source IP address of the flow matches the source IP address of the default cloud route. In some embodiments, in the return packet, when a flow with IODR is found, the corresponding node is chosen as the next-hop for the return flow.

As such, H4 3740 of cluster C2 3775 creates a flow with IODR that points to hub router H1 3730 of cluster C1 3770 as a source route, which allows H4 3740 to direct return packets to H1 3730 of cluster C1 3770 in the reverse path, thereby ensuring symmetry. In other words, rather than using the default return path 3785, the hub router H4 3740 uses the path 3780 for return packets from S4 3760 to S3 3754.

In the topology 3700, in some embodiments, the cluster members send the overlay tunnel status along with the cluster statistics to the gateway router G1 3710 and G2 3715. In some embodiments, every cluster member is required to have at least one overlay associated with the peer cluster. Receiving a consecutive overlay tunnel count of 0, in some embodiments, triggers the spokes connected to a hub member to rebalance and connect to some other member of the cluster to ensure there is always an overlay connection between cluster members.

Many of the above-described features and applications are implemented as software processes that are specified as a set of instructions recorded on a computer-readable storage medium (also referred to as computer-readable medium).

When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 38:
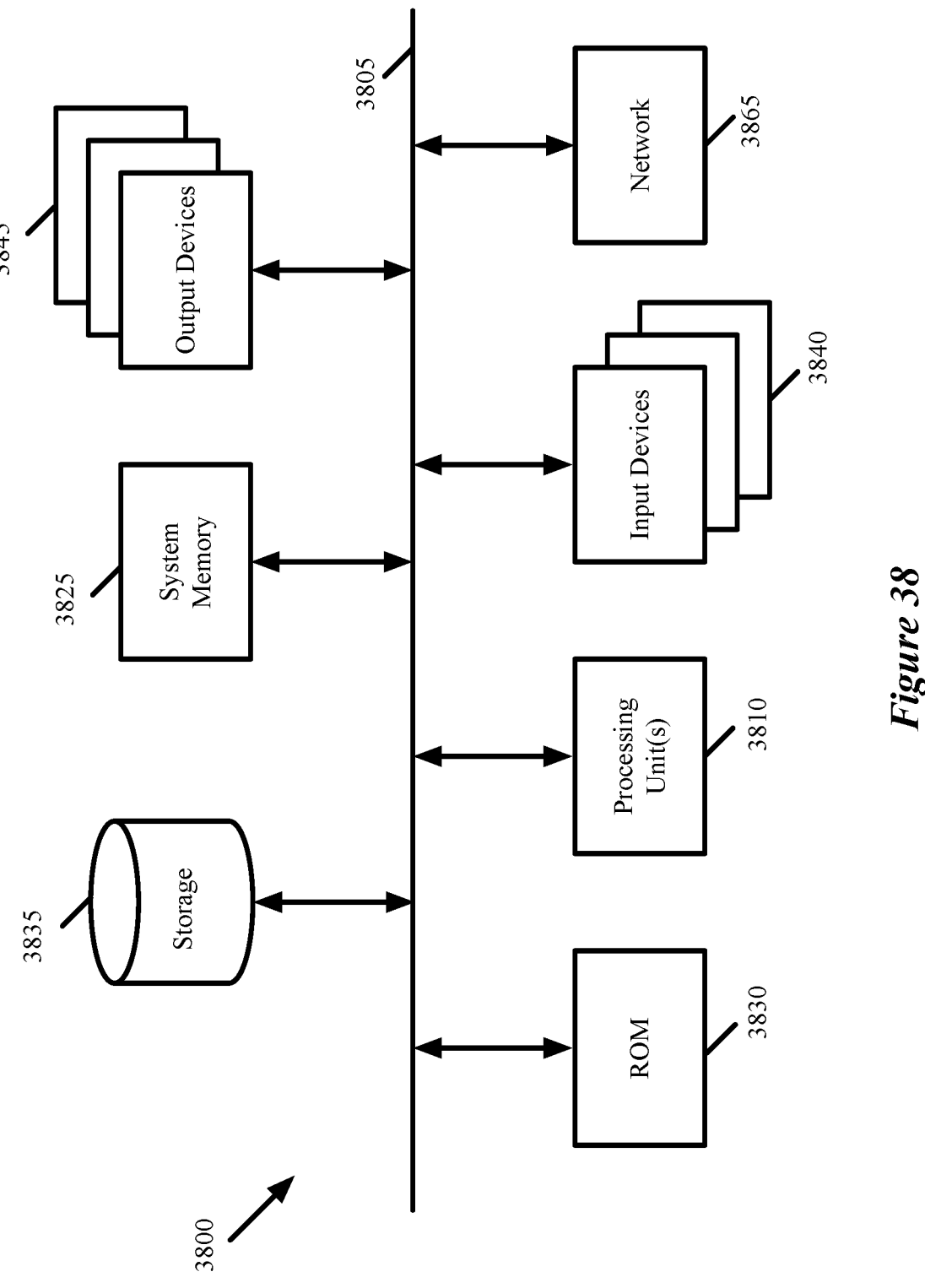
FIG. 38 conceptually illustrates a computer system with which some embodiments of the invention are implemented.

FIG. 38 conceptually illustrates a computer system 3800 with which some embodiments of the invention are implemented. The computer system 3800 can be used to implement any of the above-described hosts, controllers, gateway, and edge forwarding elements. As such, it can be used to execute any of the above described processes. This computer system 3800 includes various types of non-transitory machine-readable media and interfaces for various other types of machine-readable media. Computer system 3800 includes a bus 3805, processing unit(s) 3810, a system memory 3825, a read-only memory 3830, a permanent storage device 3835, input devices 3840, and output devices 3845.

The bus 3805 collectively represents all system, peripheral, and chipset buses that communicatively connect the numerous internal devices of the computer system 3800. For instance, the bus 3805 communicatively connects the processing unit(s) 3810 with the read-only memory 3830, the system memory 3825, and the permanent storage device 3835.

From these various memory units, the processing unit(s) 3810 retrieve instructions to execute and data to process in order to execute the processes of the invention. The processing unit(s) 3810 may be a single processor or a multi-core processor in different embodiments. The read-only-memory (ROM) 3830 stores static data and instructions that are needed by the processing unit(s) 3810 and other modules of the computer system 3800. The permanent storage device 3835, on the other hand, is a read-and-write memory device. This device 3835 is a non-volatile memory unit that stores instructions and data even when the computer system 3800 is off. Some embodiments of the invention use a mass-storage device (such as a magnetic or optical disk and its corresponding disk drive) as the permanent storage device 3835.

Other embodiments use a removable storage device (such as a floppy disk, flash drive, etc.) as the permanent storage device. Like the permanent storage device 3835, the system memory 3825 is a read-and-write memory device. However, unlike storage device 3835, the system memory 3825 is a volatile read-and-write memory, such as random access memory. The system memory 3825 stores some of the instructions and data that the processor needs at runtime. In some embodiments, the invention's processes are stored in the system memory 3825, the permanent storage device 3835, and/or the read-only memory 3830. From these various memory units, the processing unit(s) 3810 retrieve instructions to execute and data to process in order to execute the processes of some embodiments.

The bus 3805 also connects to the input and output devices 3840 and 3845. The input devices 3840 enable the user to communicate information and select commands to the computer system 3800. The input devices 3840 include alphanumeric keyboards and pointing devices (also called "cursor control devices"). The output devices 3845 display images generated by the computer system 3800. The output devices 3845 include printers and display devices, such as cathode ray tubes (CRT) or liquid crystal displays (LCD). Some embodiments include devices such as touchscreens that function as both input and output devices 3840 and 3845.

Finally, as shown in FIG. 38, bus 3805 also couples computer system 3800 to a network 3865 through a network adapter (not shown). In this manner, the computer 3800 can be a part of a network of computers (such as a local area network ("LAN"), a wide area network ("WAN"), or an Intranet), or a network of networks (such as the Internet). Any or all components of computer system 3800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method for implementing an SD-WAN (software-defined wide area network) connecting a plurality of sites at a plurality of physical locations, the method comprising:

at a first hub router of the SD-WAN that comprises (i) a plurality of edge routers at the plurality of sites, (ii) a plurality of route reflectors for a plurality of regions, each region comprising one or more sites, and (iii) a plurality of hub routers for the plurality of regions, each particular hub router of each particular region forwarding packets between the edge routers of the sites of the particular region and between the regions:

establishing, with a first edge router located at a first site in a first region, a new connection for the first hub router to use to connect the first edge router to a second edge router of a second site in the first region;

determining that a peer-connection notification regarding the newly connected first edge router has to be sent to a first route reflector that does not connect directly with the first edge router but connects to one or more routers in a second region;

sending the peer-connection notification to the first route reflector for the first route reflector to analyze in order to determine whether the first route reflector needs to obtain routes associated with the first edge router for advertising to the one or more routers in the second region.

2. The method of claim 1, wherein the one or more routers comprise a third edge router at a third site in the second region.

3. The method of claim 1, wherein the peer-connection notification comprises at least an identifier associated with the first edge router, wherein the first route reflector analyzes the peer-connection notification to determine whether the first route reflector needs to obtain routes associated with the first edge router by using the identifier associated with the first edge router to perform a lookup in a routing table maintained by the first route reflector to determine whether the first route reflector has already obtained routes associated with the first edge router.

4. The method of claim 3, wherein when the first route reflector determines that the first route reflector has not already obtained routes associated with the first edge router, the first route reflector sends a request to the first hub router for routes of the first edge router and after receiving the routes of the first edge router from the first hub router, the first route reflector (i) updates the routing table with the routes and (ii) advertises the routes to the one or more routers in the second region.

5. The method of claim 4, wherein the first route reflector also connects directly with a second hub router in a third region, and advertises the routes to the second hub router, wherein the second hub router advertises the routes to a second route reflector of the third region.

6. The method of claim 1, wherein the peer-connection notification comprises at least an identifier associated with the first edge router, a metric value that indicates the first hub router has a direct connection to the first edge router, and one or more of PMTU (path maximum transmission unit) associated with the first edge router, a current connection status of the first edge router, a profile associated with the first edge router, a set of configuration parameters defined for the first edge router, and endpoint information associated with the first edge router.

7. The method of claim 6, wherein the endpoint information comprises (i) a number of private links of the first edge router, (ii) network addresses for each private link of the first edge router, (iii) a number of public links of the first edge router, and (iv) network addresses for each public link of the first edge router.

8. The method of claim 6, wherein the identifier comprises a logical identifier assigned to the first edge router.

9. The method of claim 6, wherein the metric value is a metric value of 1 for direct connections and incremented for each additional hop.

10. The method of claim 6, wherein the peer-connection notification further comprises a flag that indicates the direct connection between the first hub router and the first edge router.

11. The method of claim 1, wherein the first route reflector belongs to a set of route reflectors to which the first hub router has direct connections, wherein determining that the peer-connection notification regarding the newly connected first edge router has to be sent to the first route reflector further comprises determining that the peer-connection notification regarding the newly connected first edge router has to be sent to the set of route reflectors to which the first hub router has a direct connection.

12. The method of claim 11, wherein sending the peer-connection notification to the first route reflector further comprises sending the peer-connection notification to each route reflector in the identified set of route reflectors.

13. The method of claim 11, wherein the set of route reflectors comprises at least the first route reflector and a second route reflector, wherein the second route reflector has a direct connection to the first edge router but does not have direct connections to the one or more routers in the second region.

14. A method for implementing an SD-WAN (software-defined wide area network) connecting a plurality of sites at a plurality of physical locations, the method comprising:
at a first hub router of a first region of the SD-WAN that comprises (i) a plurality of edge routers at the plurality of sites, (ii) a plurality of route reflectors for a plurality of regions, each region comprising one or more sites, and (iii) a plurality of hub routers for the plurality of regions, each particular hub router of each particular region forwarding packets between the edge routers of the sites of the particular region and between the regions:
establishing, with a first edge router located at a first site in the first region, a new connection for the first hub router to use to connect the first edge router to a second edge router of a second site in the first region;
determining that a peer-connection notification regarding the newly connected first edge router has to be sent to a second hub router of a second region that does not directly connect with the first edge router but connects to (i) one or more routers in a second region and (ii) a third hub router of a third region; and sending the peer-connection notification to the second hub router for the second hub router to distribute the peer-connection notification to the one or more routers in the second region and the third hub router of the third region.

15. The method of claim 14, wherein:
the peer-connection notification sent to the second hub router identifies the newly connected first edge router as being one hop away from the first hub router; and
the peer-connection notification distributed by the second hub router to the one or more other routers in the second region and the third hub router of the third region identifies the newly connected first edge router as being two hops away from the second hub router.

16. The method of claim 14, wherein the peer-connection notification comprises at least an identifier associated with the first edge router, a metric value that indicates the first hub router has a direct connection to the first edge router, and one or more of PMTU (path maximum transmission unit) associated with the first edge router, a current connection status of the first edge router, a profile associated with the first edge router, a set of configuration parameters defined for the first edge router, and endpoint information associated with the first edge router.

17. The method of claim 16, wherein the endpoint information comprises (i) a number of private links of the first edge router (ii) network addresses for each private link of the first edge router, (iii) a number of public links of the first edge router, and (iv) network addresses for each public link of the first edge router.

18. The method of claim 16, wherein the metric value is a metric value of 1 to indicate the direct connection between the first hub router and the first edge router, wherein before the second hub router distributes the peer-connection notification to the one or more routers in the second region and the third hub router of the third region, the second hub router increments the metric value by one to reflect the first hub router as an additional hop between the second hub router and the first edge router.

19. The method of claim 18, wherein the peer-connection notification further comprises a direct connection flag that indicates the first hub router has the direct connection to the first edge router, wherein in addition to incrementing the metric value by one before distributing the peer-connection notification, the second hub router removes the direct connection flag and sets a relayed connection flag to indicate the second hub router has a relayed connection to the first edge router.

20. The method of claim 18, wherein the third hub router distributes the peer-connection notification to at least one router in the third region after incrementing the metric value by one to reflect the second hub router as another additional hop between the third hub router and the first edge router.

21. The method of claim 14 further comprising:
receiving, from the first edge router, a set of routes of the first edge router; and
distributing the set of routes of the first edge router to a first route reflector and not to the second hub router.

22. The method of claim 21, wherein the first and second hub routers have direct connections to the first route reflector, wherein the second hub router receives the set of routes of the first edge router from the first route reflector.

23. The method of claim 22, wherein the first route reflector has direct connections to the one or more routers in the second region, wherein the one or more routers in the second region receive the set of routes of the first edge router from the first route reflector and not from the second hub router.

24. The method of claim 22, wherein:

the second hub router and the third hub router are directly connected to a second route reflector;

after the second hub router receives the set of routes of the first edge router from the first route reflector, the second hub router distributes the routes to the second route reflector; and the third hub router receives the set of routes of the first edge router from the second route reflector and does not receive the set of routes of the first edge router from the second hub router.

25. The method of claim 24, wherein the first route reflector does not have a direct connection to the second route reflector.

\*   \*   \*   \*   \*